(12) United States Patent
Riel-Dalpe et al.

(10) Patent No.: US 10,026,055 B2
(45) Date of Patent: Jul. 17, 2018

(54) ORDER DELIVERY SYSTEM AND METHOD

(71) Applicant: 8242186 CANADA INC., Québec (CA)

(72) Inventors: Mathieu Riel-Dalpe, Granby (CA); Randall Rolph, Québec (CA); Annie Deguire, Québec (CA); Raymond Boisvert, Québec (CA); Michael Depault, Acton Vale (CA)

(73) Assignee: 8242186 Canada Inc. (CA)

( * ) Notice: Subject to any disclaimer, the term of this patent is extended or adjusted under 35 U.S.C. 154(b) by 337 days.

(21) Appl. No.: 14/423,563

(22) PCT Filed: Mar. 19, 2013

(86) PCT No.: PCT/IB2013/052185
§ 371 (c)(1),
(2) Date: Feb. 24, 2015

(87) PCT Pub. No.: WO2014/033559
PCT Pub. Date: Mar. 6, 2014

(65) Prior Publication Data
US 2015/0262121 A1 Sep. 17, 2015

Related U.S. Application Data

(60) Provisional application No. 61/757,152, filed on Jan. 27, 2013.

(30) Foreign Application Priority Data

Aug. 25, 2012 (GB) .................................. 1215193.2

(51) Int. Cl.
*G06Q 10/00* (2012.01)
*G06Q 10/08* (2012.01)
*G06Q 50/12* (2012.01)

(52) U.S. Cl.
CPC ......... *G06Q 10/0833* (2013.01); *G06Q 10/08* (2013.01); *G06Q 50/12* (2013.01)

(58) Field of Classification Search
CPC ......... G06Q 30/06; G06Q 20/20; G06Q 10/00
(Continued)

(56) References Cited

U.S. PATENT DOCUMENTS 5,991,739 A 11/1999 Cupps et al.
6,463,420 B1 10/2002 Guidice et al.
(Continued)

FOREIGN PATENT DOCUMENTS

GB          2434010 A     7/2007
WO          97/18521 A1   5/1997
(Continued)

OTHER PUBLICATIONS

Idoughi et al., "Design of a GPS-Web fleet tracking application", International Congress on Telecommunication and Application'12, Apr. 11-12, 2012, 6 pages, University of A. Mira, Algeria. Available at: http://works.bepress.com/djilali_idoughi/15.

*Primary Examiner* — Oluseye Iwarere
(74) *Attorney, Agent, or Firm* — Blueshift IP, LLC; Robert Plotkin

(57) ABSTRACT

A method and system for tracking of a delivery of a menu item. The method includes receiving an order for the menu item from a customer interface, the order identifying a selected menu item and an address for the delivery; sending a request for preparation of the menu item; identifying an available delivery vehicle among a plurality of delivery vehicles; receiving a preparation completion notification indicating that preparation of the menu item has ended; dispatching the order for delivery, including an identification of the available delivery vehicle and the address; receiving a displacement notification indicating that the menu item is
(Continued)

being displaced by the available delivery vehicle; retrieving geopositional data representing a geographical position of the available delivery vehicle; sending a displacement notification to the customer interface including an indication of the geographical position of the available delivery vehicle.

28 Claims, 56 Drawing Sheets

(58) Field of Classification Search
USPC .......................................... 705/15, 28, 7.15
See application file for complete search history.

(56) References Cited

U.S. PATENT DOCUMENTS

| | | | | |
|---|---|---|---|---|
| 7,110,964 B2* | 9/2006 | Tengler | ................ | G06Q 10/087 705/15 |
| 9,009,067 B1* | 4/2015 | Scotto | ................ | G06Q 30/0207 705/15 |
| 2002/0013734 A1* | 1/2002 | Bueno | ................ | G06Q 30/06 705/15 |
| 2004/0153357 A1 | 8/2004 | De Sylva | | |
| 2004/0210621 A1* | 10/2004 | Antonellis | ........... | G06Q 10/087 709/200 |
| 2004/0243430 A1* | 12/2004 | Horstemeyer | ........ | B60R 25/102 340/928 |
| 2005/0004843 A1* | 1/2005 | Heflin | ................ | G06Q 50/12 705/15 |
| 2005/0080686 A1* | 4/2005 | Fallon | ................ | G06Q 30/0603 705/26.81 |
| 2005/0144127 A1* | 6/2005 | Miller | ................ | G06Q 20/102 705/40 |
| 2006/0010037 A1* | 1/2006 | Angert | ................ | G06Q 10/087 705/15 |
| 2006/0178943 A1* | 8/2006 | Rollinson | ........... | G06Q 30/0601 705/26.1 |
| 2007/0052586 A1* | 3/2007 | Horstemeyer | ... | G06Q 10/06311 342/457 |
| 2007/0106543 A1* | 5/2007 | Baughman | ....... | G06Q 10/06311 705/7.21 |
| 2007/0150375 A1* | 6/2007 | Yang | ...................... | G06Q 10/08 705/339 |
| 2007/0187183 A1* | 8/2007 | Saigh | ...................... | E04H 14/00 186/53 |
| 2008/0217108 A1* | 9/2008 | Curt | ...................... | G06Q 10/087 186/61 |
| 2009/0031006 A1* | 1/2009 | Johnson | .............. | H04W 76/021 709/218 |
| 2009/0048890 A1* | 2/2009 | Burgh | .................... | G06Q 10/04 705/7.15 |
| 2009/0049057 A1* | 2/2009 | Ghani | .................... | G06Q 30/02 |
| 2009/0106124 A1* | 4/2009 | Yang | ...................... | G06Q 10/08 705/26.1 |
| 2009/0313072 A1* | 12/2009 | Balok | .................... | G06Q 10/06 705/333 |
| 2011/0055046 A1* | 3/2011 | Bowen | .................... | G06Q 10/08 705/26.41 |
| 2011/0125566 A1* | 5/2011 | McLaughlin | .......... | G06Q 20/20 705/14.23 |
| 2012/0253867 A1* | 10/2012 | Davidson | ................ | G06Q 10/08 705/7.12 |
| 2012/0290390 A1* | 11/2012 | Harman | ................. | G06Q 30/06 705/14.53 |
| 2012/0290413 A1* | 11/2012 | Harman | ................. | G06Q 30/06 705/15 |
| 2012/0290414 A1* | 11/2012 | Harman | ................. | G06Q 50/01 705/15 |
| 2013/0091070 A1* | 4/2013 | Barron | .................... | G06Q 10/00 705/333 |
| 2013/0226758 A1* | 8/2013 | Reitan | .................... | G06Q 40/00 705/35 |
| 2013/0288692 A1* | 10/2013 | Dupray | ................. | G01C 21/206 455/450 |
| 2014/0040043 A1* | 2/2014 | Barron | .................... | G06Q 10/00 705/14.66 |
| 2014/0058902 A1* | 2/2014 | Taylor | ................ | G06Q 30/0635 705/26.81 |
| 2014/0074743 A1* | 3/2014 | Rademaker | ............ | G06Q 50/28 705/334 |
| 2014/0136414 A1* | 5/2014 | Abhyanker | ............ | G06Q 50/28 705/44 |
| 2014/0180914 A1* | 6/2014 | Abhyanker | .............. | G01C 1/00 705/39 |
| 2014/0214465 A1* | 7/2014 | L'Heureux et al. | ... | G06Q 50/12 705/7.13 |
| 2014/0257877 A1* | 9/2014 | L'Heureux et al. | ... | G06Q 30/06 705/5 |
| 2015/0262121 A1* | 9/2015 | Riel-Dalpe | ............ | G06Q 10/08 705/15 |
| 2015/0278759 A1* | 10/2015 | Harris | .............. | G06Q 10/08355 705/338 |
| 2016/0300217 A1* | 10/2016 | Grabovski | ............. | G06Q 20/00 |

FOREIGN PATENT DOCUMENTS

| | | |
|---|---|---|
| WO | 2006/133713 A2 | 12/2006 |
| WO | 2010/037394 A1 | 4/2010 |
| WO | 2012/129327 A2 | 9/2012 |

* cited by examiner

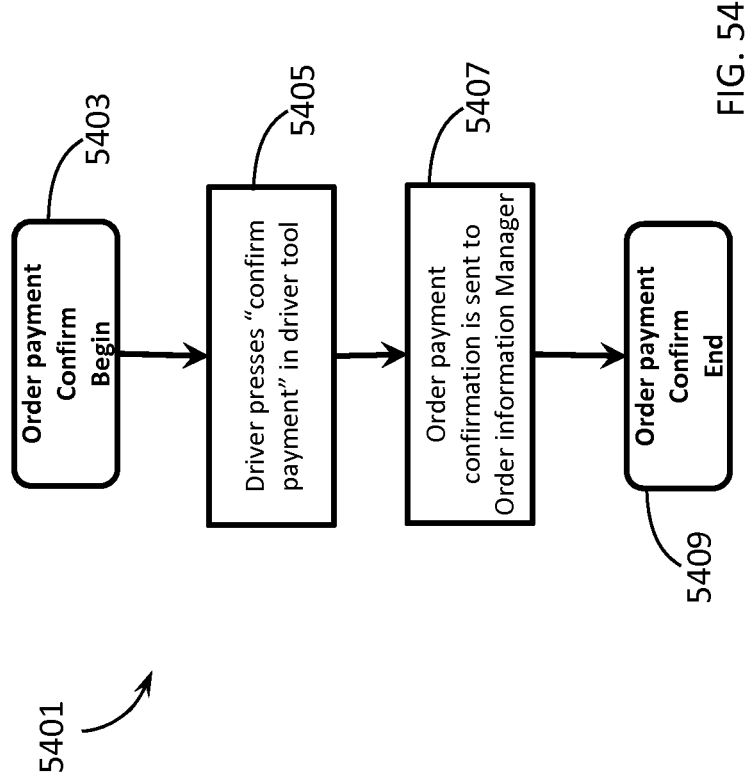

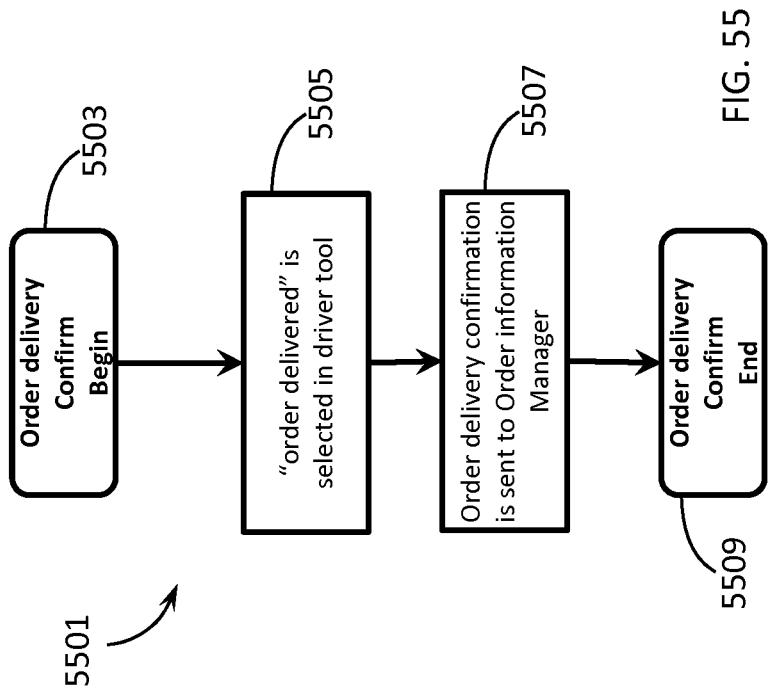

ORDER DELIVERY SYSTEM AND METHOD

TECHNICAL FIELD

This invention relates to the field of order delivery more particularly to the tracking and management of the delivery of an order.

BACKGROUND OF THE ART

As computers and electronic mobile devices become more connected and more capable, new opportunities for innovative ways of creating an efficient delivery management system emerge. The prior art systems and methods for the delivery of goods from the distribution points to the customer rely heavily on human intervention and older technology such as conventional telephones and fax machines. There is a need for data-rich, easy to use and more efficient Delivery Management System.

SUMMARY

According to one broad aspect of the present invention, there is provided a method for tracking of a delivery of a menu item. The method includes receiving an order for the menu item from a customer interface, the order identifying a selected menu item and an address for the delivery; sending a request for preparation of the menu item; identifying an available delivery vehicle among a plurality of delivery vehicles; receiving a preparation completion notification indicating that preparation of the menu item has ended; dispatching the order for delivery, including an identification of the available delivery vehicle and the address; receiving a displacement notification indicating that the menu item is being displaced by the available delivery vehicle; retrieving geopositional data representing a geographical position of the available delivery vehicle; sending a displacement notification to the customer interface including an indication of the geographical position of the available delivery vehicle.

According to another broad aspect of the present invention, there is provided a system for tracking of a delivery of a menu item. The system includes a customer order receiver for receiving an order for the menu item from a customer interface, the order identifying a selected menu item and an address for the delivery; a restaurant order dispatcher for sending a request for preparation of the menu item and receiving a preparation completion notification indicating that preparation of the menu item has ended; a driver assignment dispatcher for identifying an available delivery vehicle among a plurality of delivery vehicles, dispatching the order for delivery, including an identification of the available delivery vehicle and the address and receiving a displacement notification indicating that the menu item is being displaced by the available delivery vehicle; a driver geoposition reporter for retrieving geopositional data representing a geographical position of the available delivery vehicle; a customer feedback provider for sending a displacement notification to the customer interface including an indication of the geographical position of the available delivery vehicle.

In the present specification, the acronym "DMS" stands for Delivery Management System. The term "mobile device" designates either a smart phone, a tablet or any similar electronic device. The term "resto" is a shot form for the word restaurant. The terms "customer" and "client" are used interchangeably.

BRIEF DESCRIPTION OF THE DRAWINGS

Having thus generally described the nature of the invention, reference will now be made to the accompanying drawings, showing by way of illustration example embodiments thereof and in which:

FIG. 7 is an example user interface of the main delivery management system software tool, showing an information list for an order in the "Order" state;

FIG. 8 is an example user interface of the main delivery management system software tool, showing an information list for an order in the "Cooking" state;

FIG. 10 is an example user interface of the main delivery management system software tool, showing an information list for an order in the "Cooking" state at a later time;

FIG. 12 is an example user interface of the main delivery management system software tool, showing an information list for an order in the "Delivery" state;

FIG. 15 is an example user interface of the main delivery management system software tool, showing an information list for an order in the "Delivery" state at a later time;

FIG. 16 is an example user interface of the main delivery management system software tool, showing an information list for an order in the "Completed" state;

FIG. 17 is an example user interface of the main delivery management system software tool, showing a list of orders in the "Completed" state;

FIG. 27 is an example user interface of the delivery management system software tool used by the customer, showing the check-out page and a shopping cart with several items;

Figure 36:
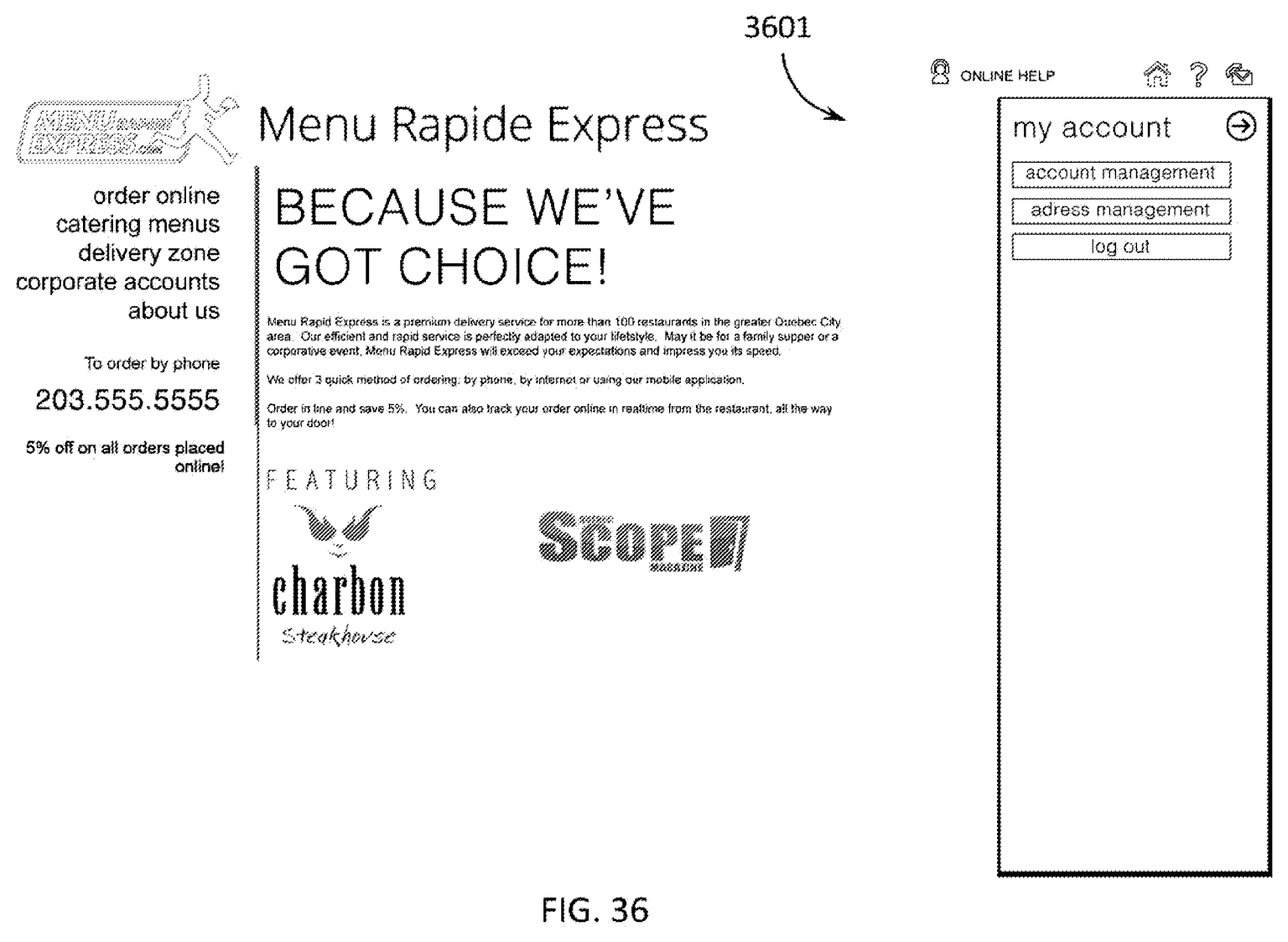

FIG. 36 is an example user interface of the delivery management system software tool used by the customer, showing the management panel;

Figure 37:
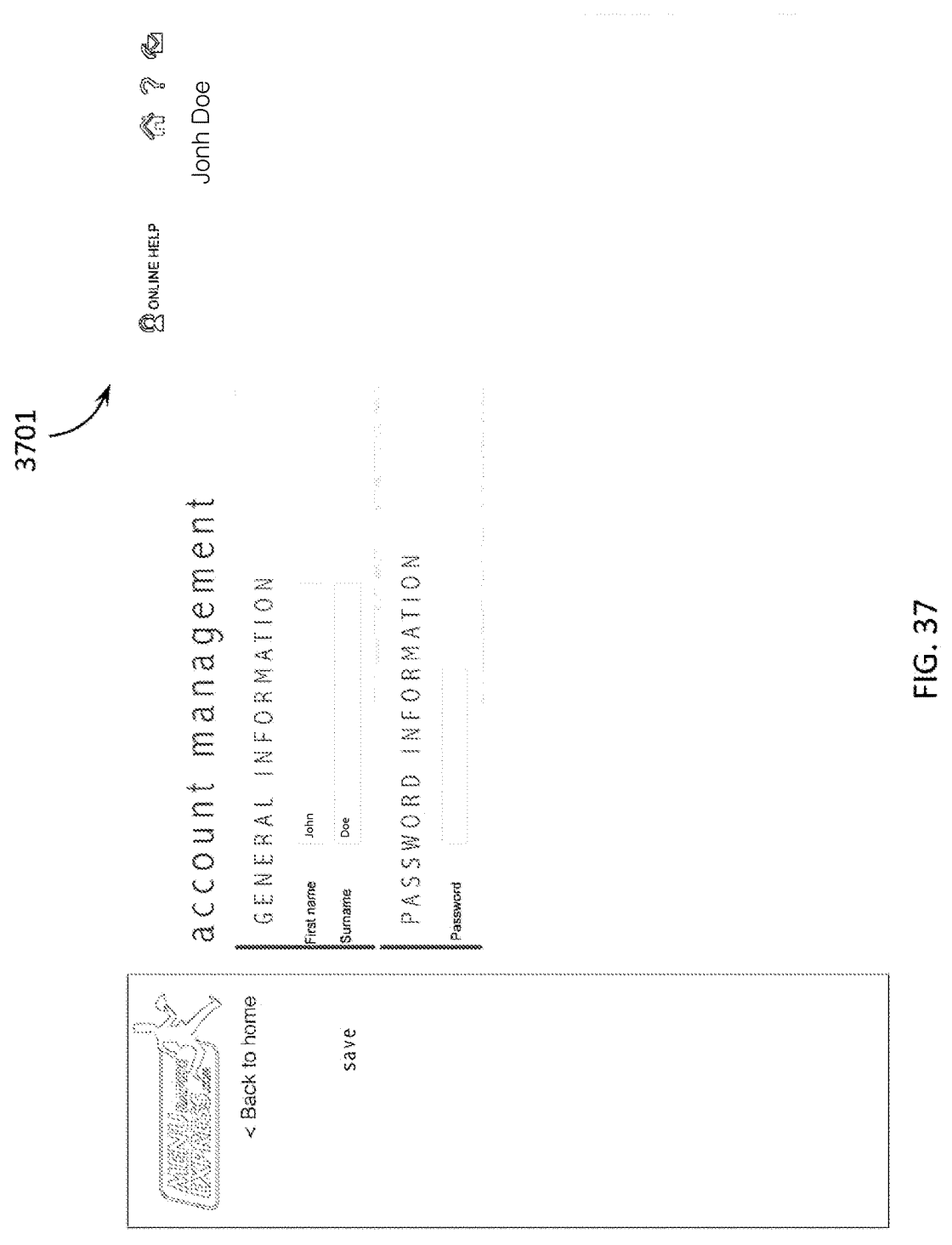

FIG. 37 is an example user interface of the delivery management system software tool used by the customer, showing the generic information of the management panel;

FIG. 54 shows a flow chart of example steps for the Order payment confirmer; and FIG. 55 shows a flow chart of example steps for the order delivery confirmer.

DETAILED DESCRIPTION

Figure 1:
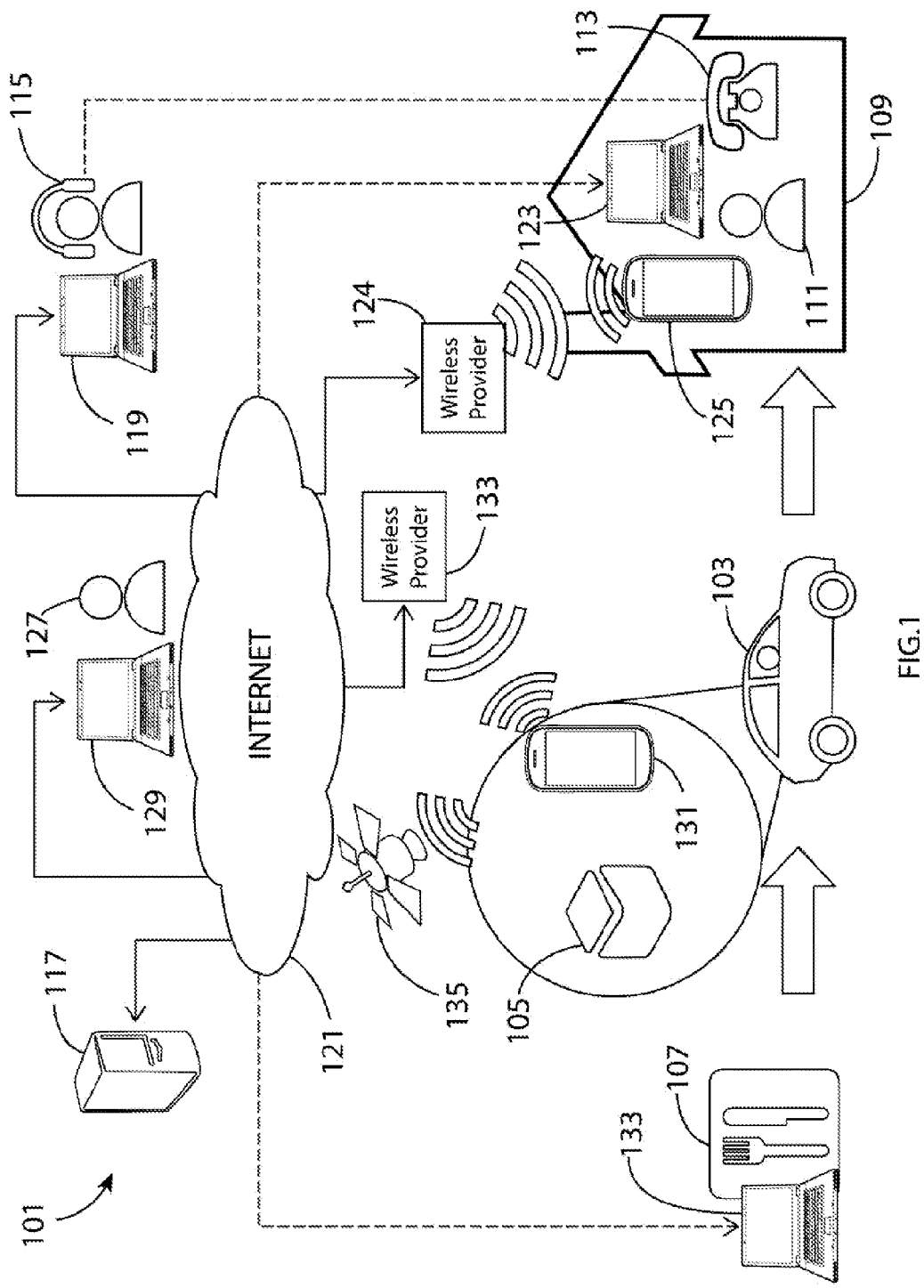
FIG. 1 is an example block diagram of the example system showing the various tools used to communicate the relevant information between the players and a central database.

A system and method for the delivery of orders is presented herein. FIG. 1 shows a block diagram of an example embodiment of a system 101 for intelligent Delivery Management System (DMS) using networked computers and mobile devices. In this example the delivery person 103 is transporting a food order 105, from the restaurant 107 that prepared the order 105 to the dwelling 109 of the customer 111 that placed the order 105.

FIG. 1 illustrates an example of an order 105 delivered to a customer 111. The customer 111 has three methods to place an order. The customer can use a conventional landline telephone 113 in order to call an operator 115 who takes the order and enters it into the central server 117 using a computer 119. Both the central server 117 and the operator's computer 119 are interconnected via the Internet 121. Alternatively, the customer can use a personal computer 123, also connected to the Internet 121, to place the order directly using an appropriate software tool. This tool can be a standalone application or a web-based application. A third alternative method consists in using a mobile device 125 to place an order using a specialized application or an appropriate web-based tool. The mobile device 125 can also be used to place an order by calling the operator 115. The system can be configured so that the orders appear in a database residing in the central server 117.

The orders may be reviewed and accepted by a dispatcher 127. The dispatcher 127 can access and review the orders located in the central server 117 using a computer 129, which is also connected to the Internet 121. Note that a single properly trained person can perform both the roles of the dispatcher 127 and the operator 115. Inversely, several persons can simultaneously be performing dispatcher and operator roles in order to process a large volume of orders. If the system is using the Internet or a similar network, dispatchers 127 and operators 115 can be located at different locations. As will be readily understood, the dispatcher 127 need not be a person carrying out human intervention steps and can be an automated process which makes decisions on the orders based on predetermined rules of operation detailed below.

Once accepted, an order can be sent to the appropriate restaurant 107, and this order can appear on a restaurant operator interface using a computer 133 also connected to the Internet 121.

Next, the dispatcher 127 can consult the relevant information available on the central server 117 and can assign a driver 103 to the order being prepared at the restaurant 131. A short amount of time before the order is ready for delivery, the driver 103 can travel to the restaurant 107. After he arrives to the restaurant 107, the driver 103 picks-up the order 105 and can transport it to the customer's dwelling or location 109.

Figure 2A:
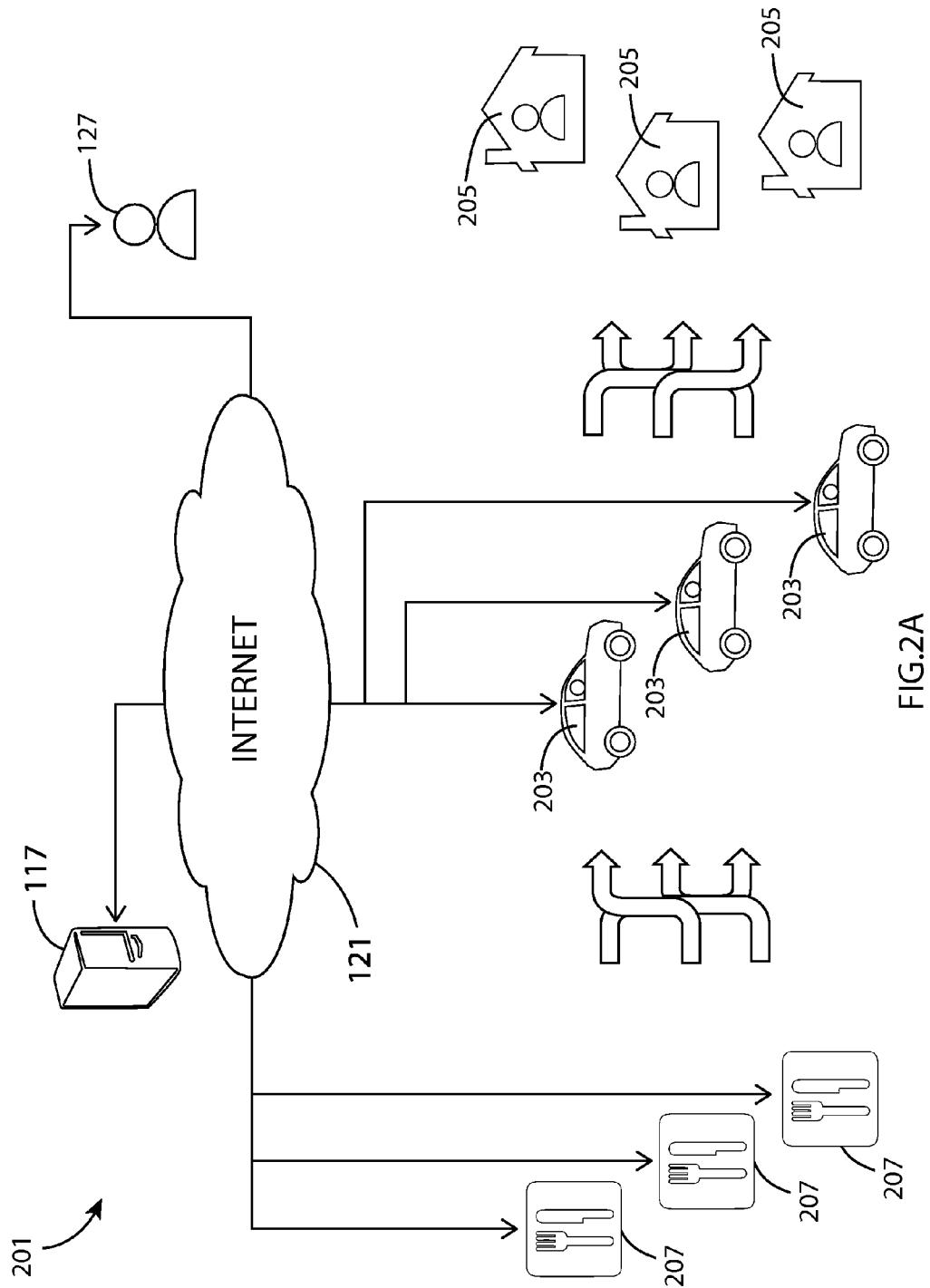
FIG. 2A is an example block diagram of the example system showing several restaurants, several delivery cars and several customers.

As illustrated in FIG. 2A, it is understood that Delivery Management System 201 can use multiple delivery vehicles 203, can serve multiple customers 205 who can order items from multiple suppliers 207. By using information from the central server 117, in the example restaurant order management system, the dispatcher 127 is able to efficiently submit orders to restaurants and efficiently assign delivery vehicles 203 and drivers to bring the prepared food to customers 205.

Figure 2B:
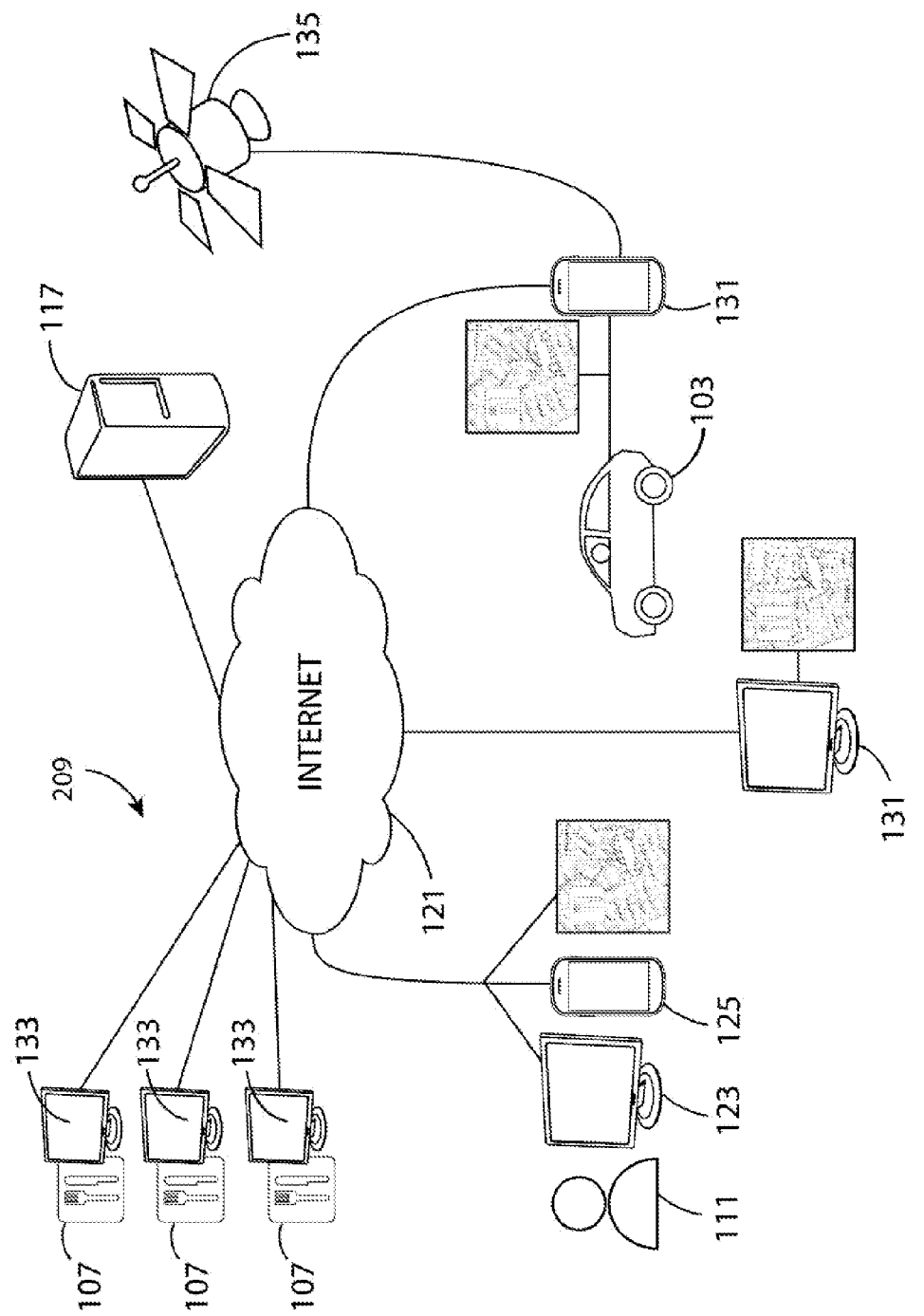
FIG. 2B is an example block diagram of the example system showing a system architecture.

FIG. 2B shows a block diagram of an example Delivery Management System.

Figure 39:
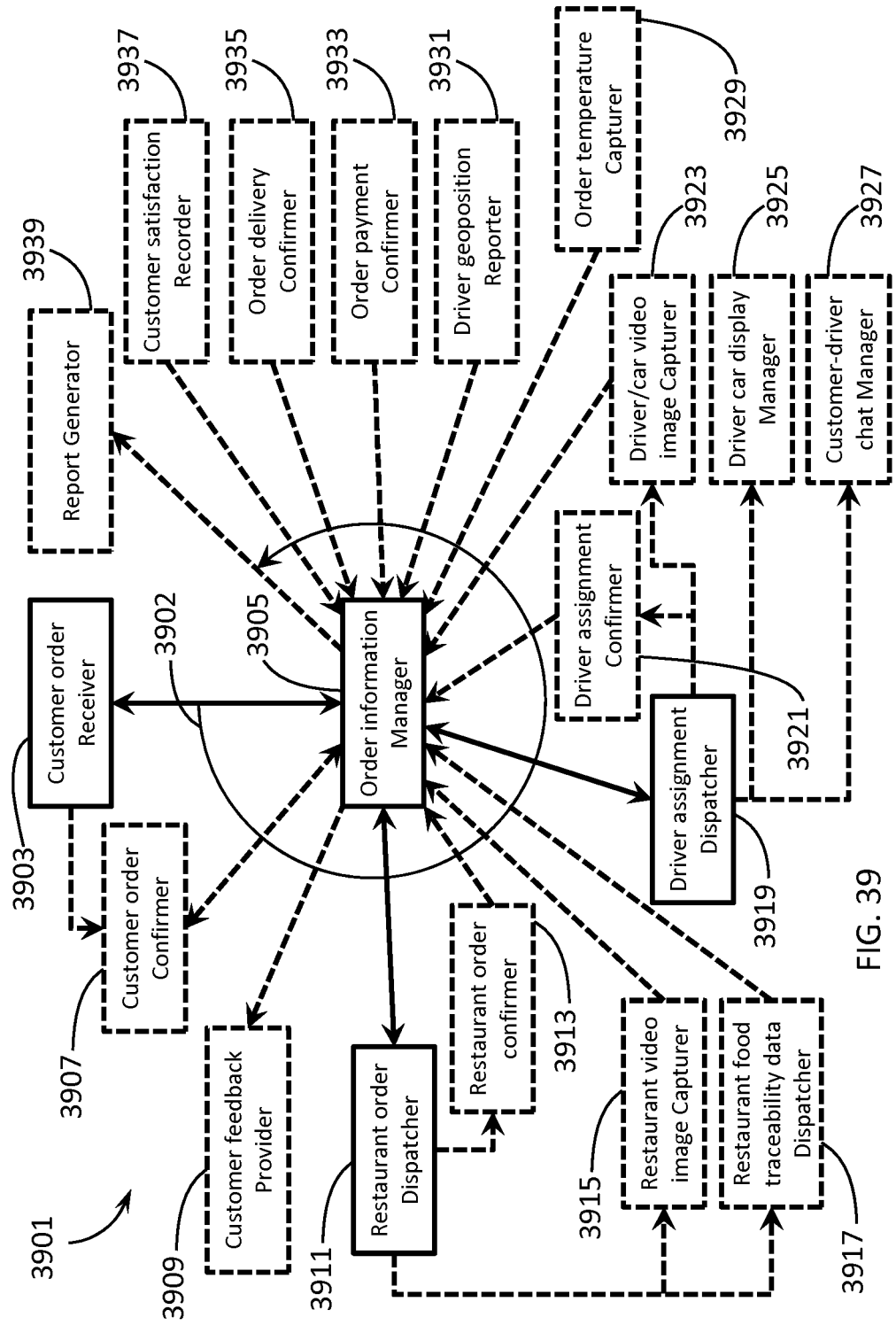
FIG. 39 shows a functional block diagram of an example embodiment of a system 3901 for intelligent Delivery Management System (DMS)

FIG. 39 shows a functional block diagram of an example embodiment of a system 3901 for intelligent Delivery Management System (DMS). In this example the normal flow of operations is illustrated by the circular arrow 3902.

Figure 40:
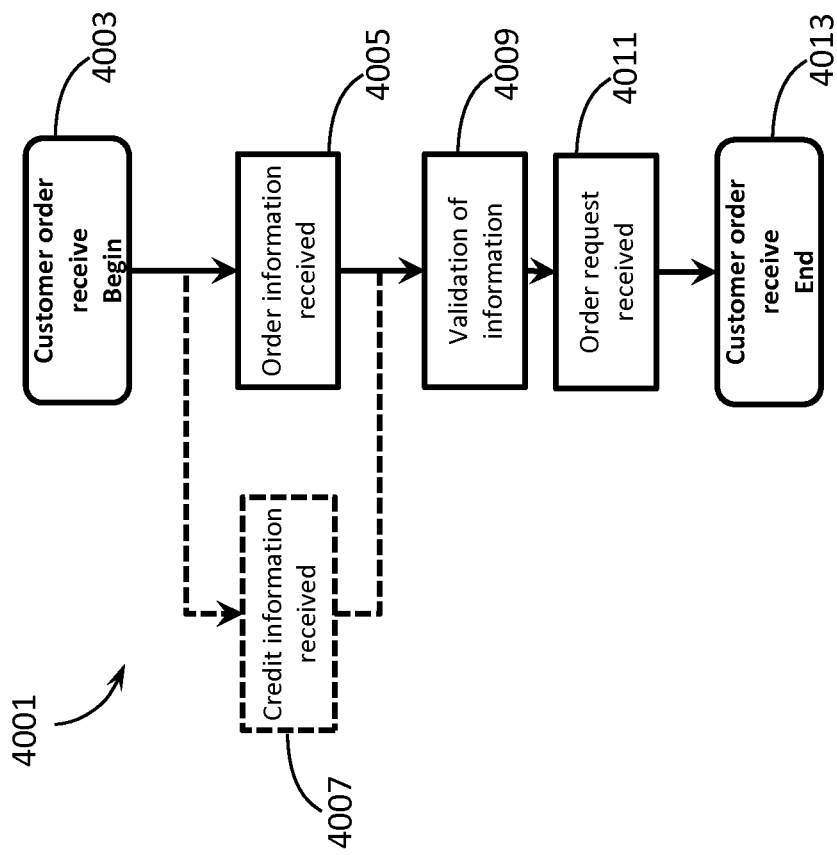
FIG. 40 shows a flow chart of example steps for the Customer order receiver.

The task of the Customer order receiver 3903 is illustrated in FIG. 40. In the first step 4005, the information about the order content (customer and address, restaurant, menu items, special instructions, etc.) is received. In the case of a credit card order, the credit card information can also be received 4005. In the next step, the information received is validated 4009. In the last step, the confirmation of the order (Order request) is received 4011 and the order is considered complete.

Figure 41:
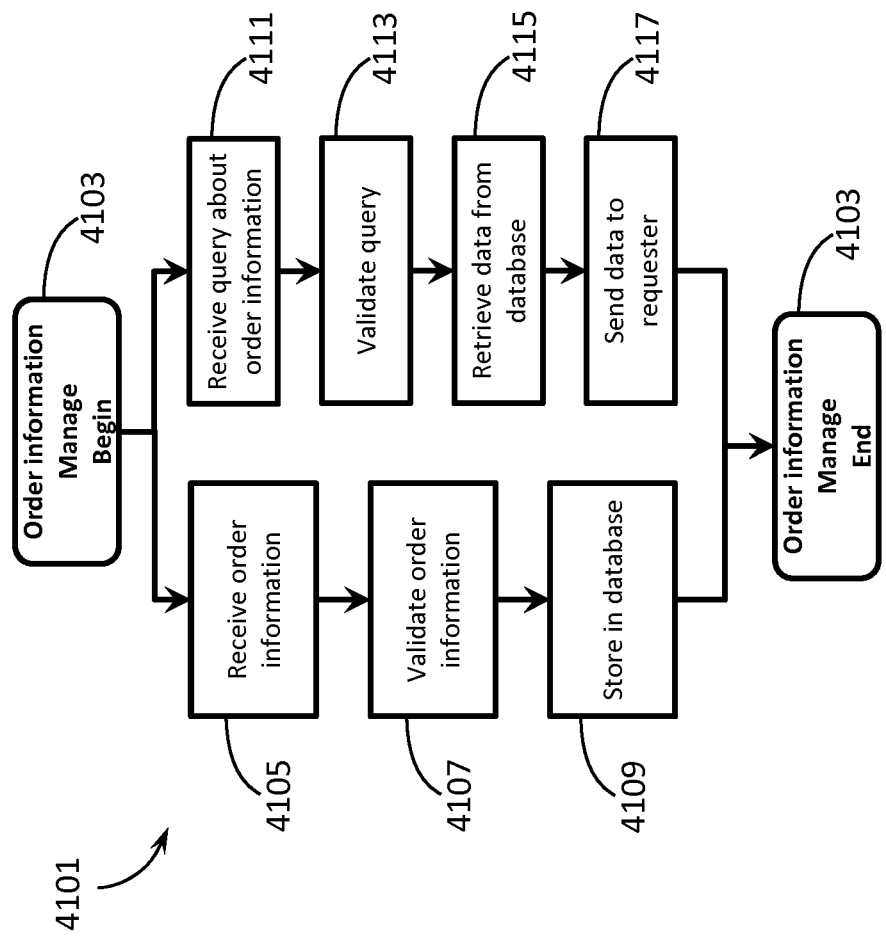
FIG. 41 shows a flow chart of example steps for the Order information manager.

The order information is received by the Order information manager 3905 whose purpose is to receive, store and make available all order-related information. The task of the Order information manager 3905 is illustrated in FIG. 41. The Order information manager 3905 can either receive data to store (4105-4109 branch) or receive a query about stored data (4111-4117 branch). After order information is received 4105 by Order information manager, it may be validated 4107 according to data specific validity tests and if correct, it is stored in a database 4109. On the query side, after the Order information manager receives a query 4111, the query is validated 4113 and order information is retrieved from the database 4115. In the last step, the order information is sent to the requester 4117.

In an example embodiment, a Customer order confirmer function 3907 can be used to further validate the order. This function can be useful for customers ordering for the first time or to make sure that the order is not a prank. The Customer order confirmer 3907 can be called at every new order by the Customer order receiver 3903. Based on order information it receives from the Order information manager 3905, the Customer order confirmer 3907 determines if further steps need to be taken. If no further steps are required, the order is released immediately. If not, the function can performed financial checks or can place a task request for a receptionist to call the customer back to ensure that there is no problem with the order.

Figure 42:
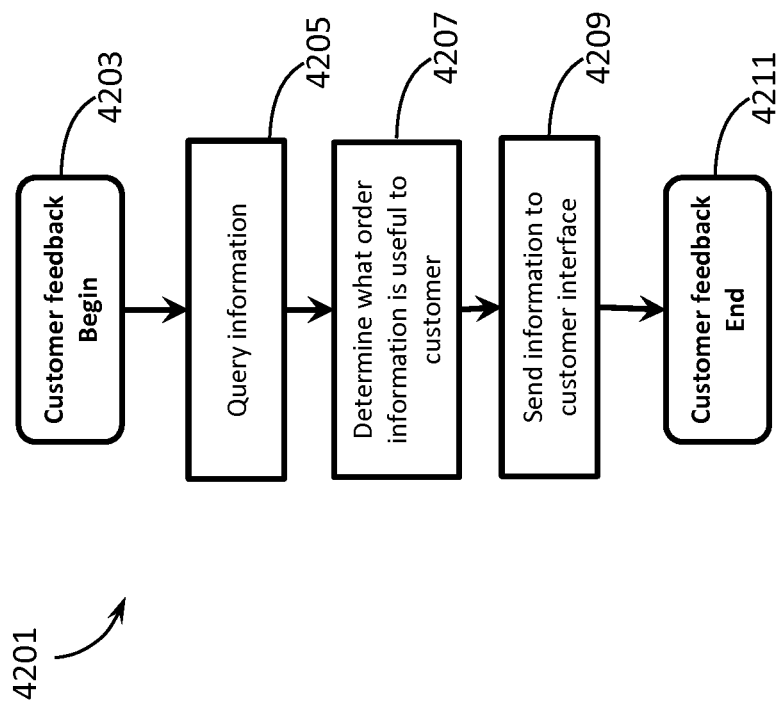
FIG. 42 shows a flow chart of example steps for the Customer feedback provider.

The Customer feedback provider 3909 is illustrated in FIG. 42. This function performs queries 4205 about on-going orders. Next the function determines which information is useful to the customer 4207 and this information is sent to the user interface 4209. During the complete order and delivery process, the Customer feedback provider 3909 keeps the customer informed about information on his/her order.

Figure 43:
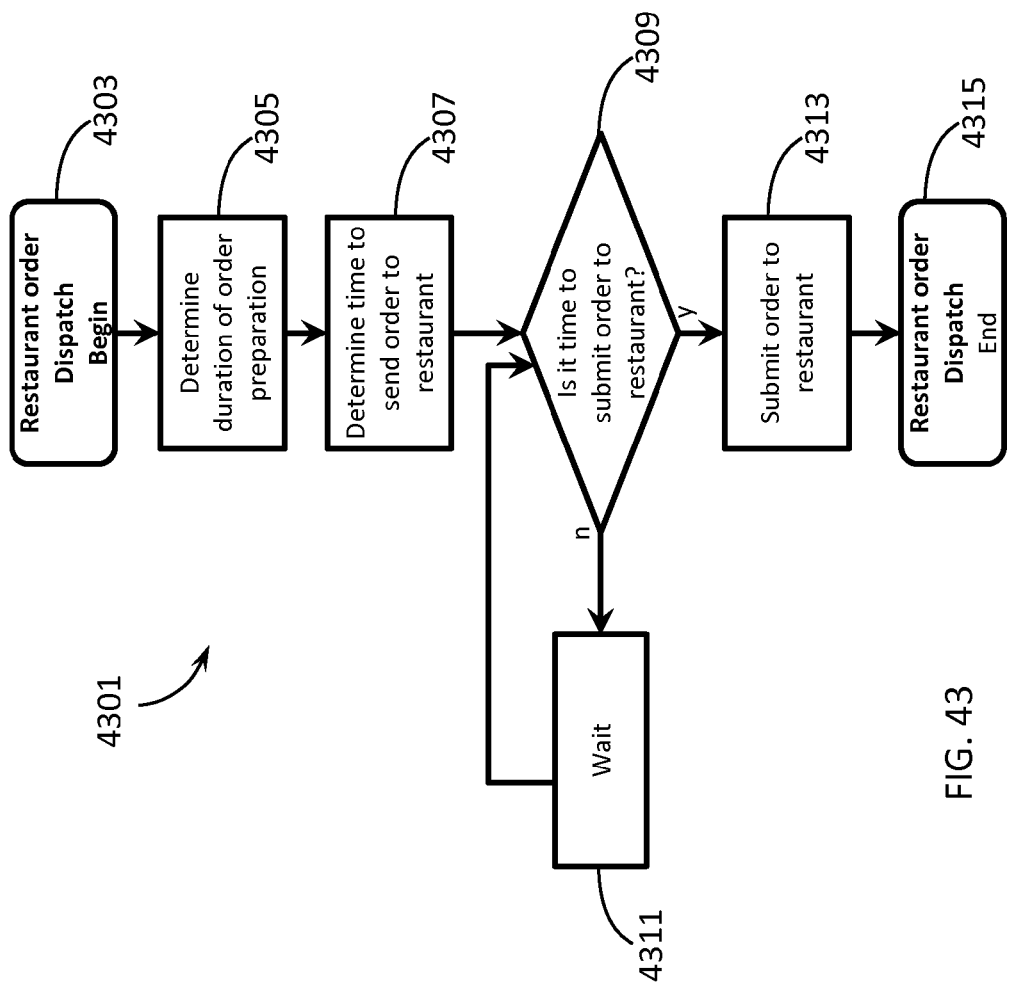
FIG. 43 shows a flow chart of example steps for the restaurant order dispatcher.

The restaurant order dispatcher 3911 is a function used to send the customer order to the restaurant he/she has selected. In an example embodiment, the customer can place orders a long time before the desired delivery time. In this case, it can be more productive to dispatch orders to the restaurants at the optimum time. This time must sufficiently in advance to enable food preparation but must not be too early, otherwise the order list may become cluttered and hard to manage at the restaurant. The restaurant order dispatcher 3911 is illustrated in FIG. 43. In the first step 4305, the function determines the standard time for order preparation. Next based on this time and the requested time of delivery, the function determines the optimum time 4307 to send the order to the restaurant. Next the function waits (4309-4311) for the optimum time and then sends the order to the restaurant 4313.

Figure 44:
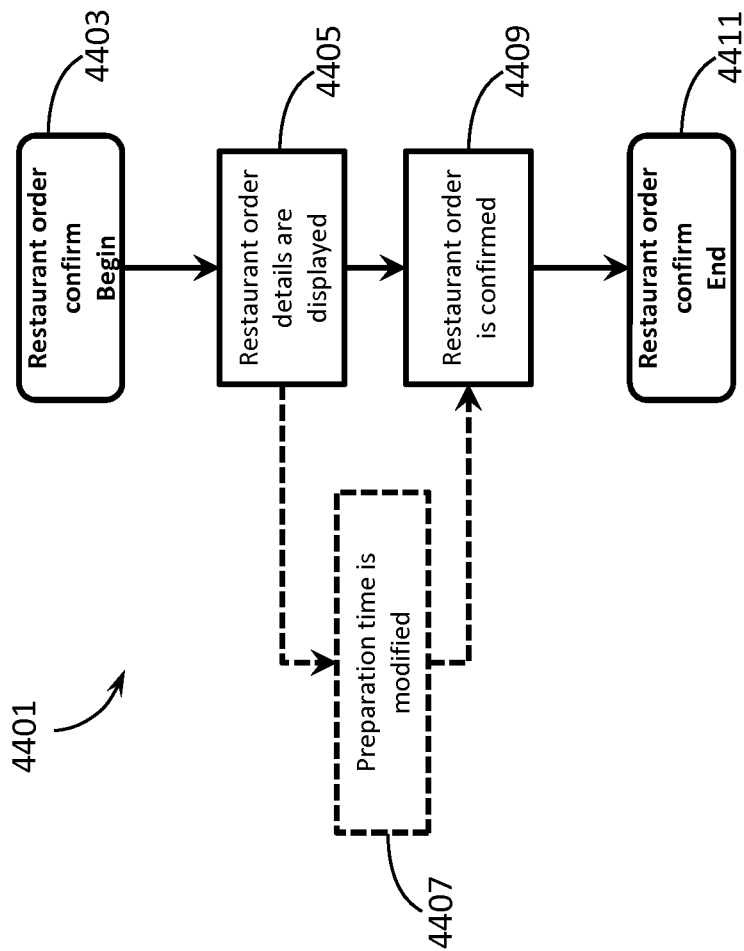
FIG. 44 shows a flow chart of example steps for the Restaurant order confirmer.

A Restaurant order confirmer 3913 is an optional function enabling an acknowledgment from the restaurant regarding a given order, as illustrated in FIG. 44. First the order information is displayed 4405. The preparation time may be altered 4407 based on the existing productivity limitations at the restaurant, including missing ingredients or an unusual level of orders in preparation. Last the restaurant order is confirmed 4409 and sent back to the Order information manager 3905.

Figure 45:
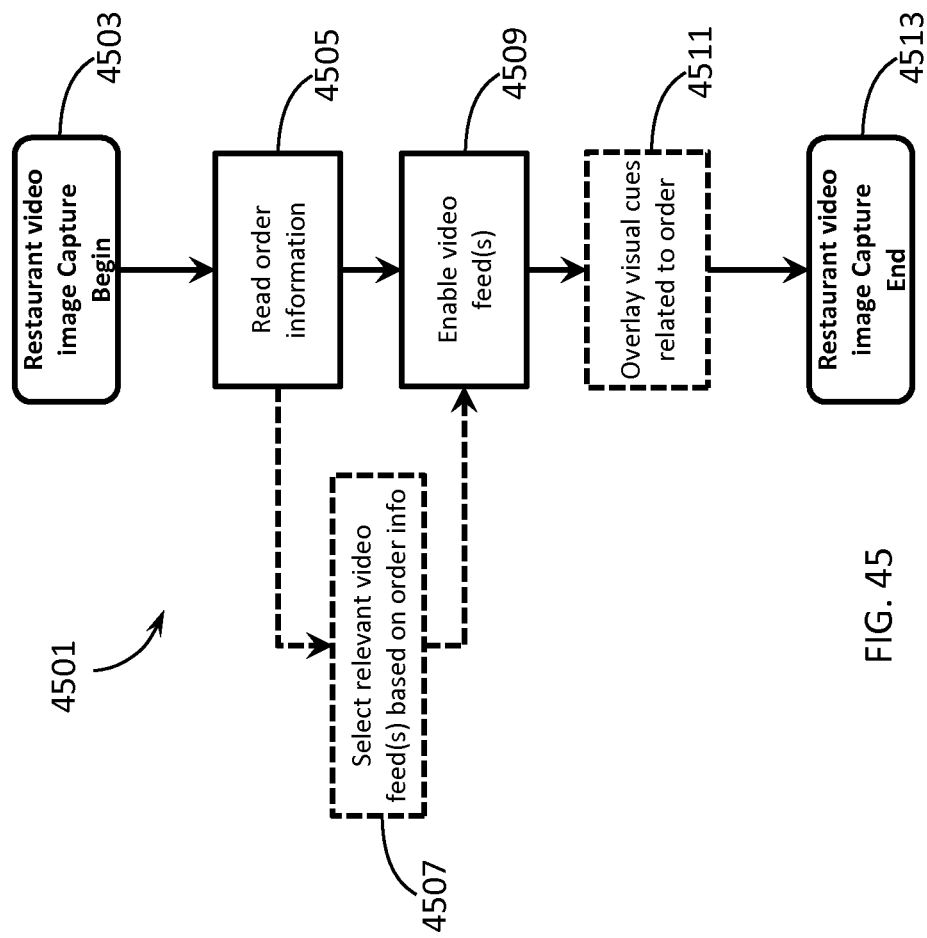
FIG. 45 shows a flow chart of example steps for the Restaurant video image capturer.

A Restaurant video image capturer function 3915 is illustrated in FIG. 45. In the first step, the order information is read 4505 to determine whether the customer wants video images and regarding the content of his/her order. Next, depending on whether or not the restaurant has many cameras to select feeds from, the function determines which camera feeds are relevant with the customer order 4507. Next these video feeds are made available 4509 for customer viewing. In some embodiments, relevant information can be highlighted 4511 within a scene (for example one plate among tens of plates on a kitchen table) for the customer to draw his/her attention by using visual cues (for example a red rectangle) overlaid on a video feed.

Figure 46:
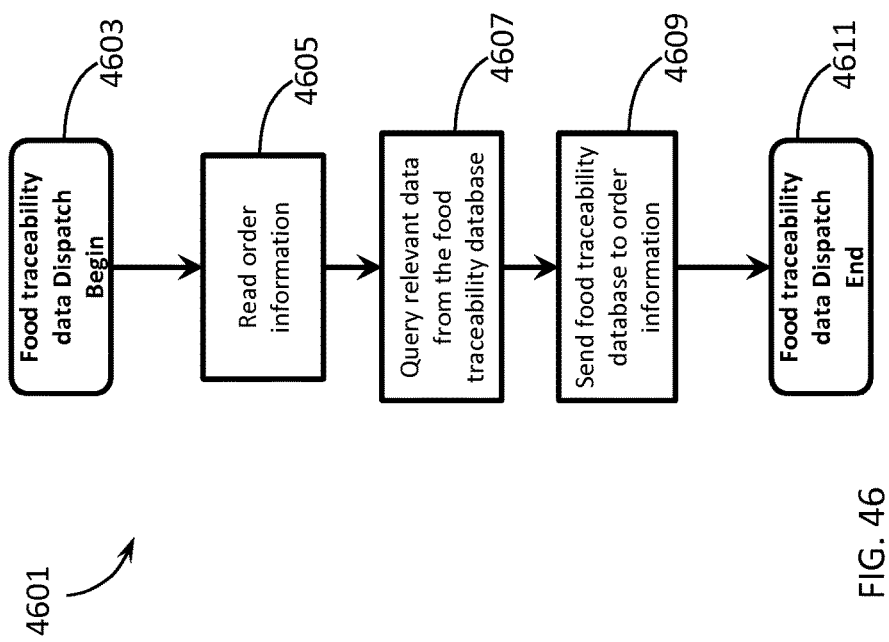
FIG. 46 shows a flow chart of example steps for the Food traceability data dispatcher.

A Food traceability data dispatcher function 3917 is illustrated in FIG. 46. In the first step, the order information is read 4605 to determine whether the customer wants to obtain food traceability data related to his/her order. Next a query is performed 4607 on a food traceability database that includes the ingredients used by the restaurant. Last, the information is send to the customer interface for information.

Another function pertains to the assignment of a driver for a particular order. The driver assignment dispatcher 3919, can be implemented in various ways and two examples are provided in FIG. 47 and FIG. 48.

Figure 47:
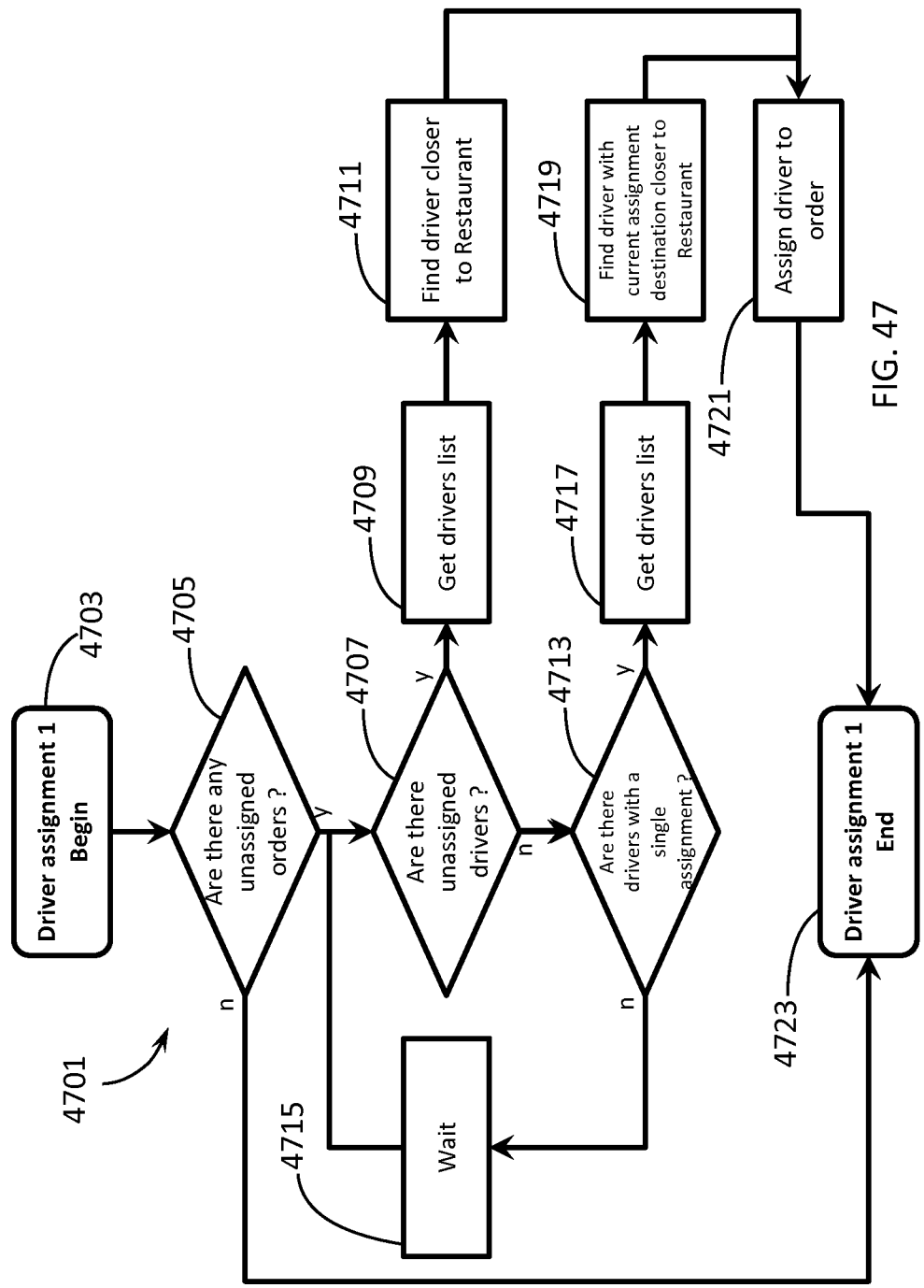
FIG. 47 shows a flow chart of example steps for a first version of the assignment of a driver for a particular order.

In the first version, FIG. 47, the list of orders is read to find if there are unassigned order 4705. If all orders are assigned to drivers, the function can end 4723. If there is one or more unassigned orders, the next step 4707 is to find if there are unassigned drivers. If there is one or more unassigned drivers, then the list of unassigned drivers is obtained 4709. The next step 4711 is to find the driver the closest to the restaurant and to assign 4721 this driver to the order.

If there is no unassigned drivers, we move to the list of drivers with a single currently assigned order. If there are no drivers with a single assignment 4713, we wait a predetermined amount of time 4715 and return to step 4707. If there are drivers with a single assignment, then the list of drivers with a single assignment is obtained 4717. The next step 4719 is to find the driver which destination of his/her current assignment is the closest to the restaurant of the new order and to assign 4721 this driver to the order.

Figure 48:
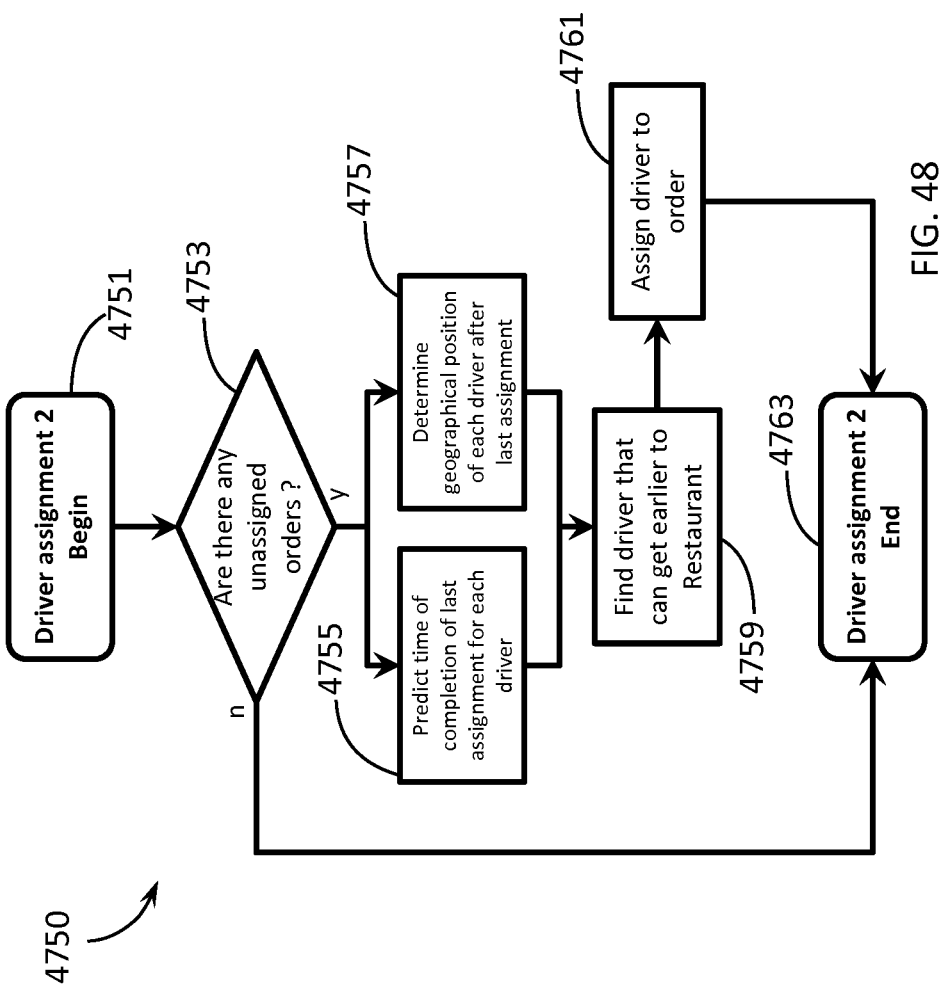
FIG. 48 shows a flow chart of example steps for a second version of the assignment of a driver for a particular order.

The second version of the driver assignment dispatcher 3919 is illustrated in FIG. 48. First, the list of orders is read to find if there are unassigned order 4753. If all orders are assigned to drivers, the function can end 4763. If there are unassigned orders, two steps can be undertaken in any order. For each driver, the function predicts 4755 the time of completion of all his/her assignments. For each driver also, the function determines 4757 the geographical position of the driver after completion his/her last assignment. Next the function determines 4759 the arrival time each driver at restaurant of the new order based on the two previous information. Finally the driver that can get the earliest to the restaurant of the new order is assigned to this order 4761.

Figure 49:
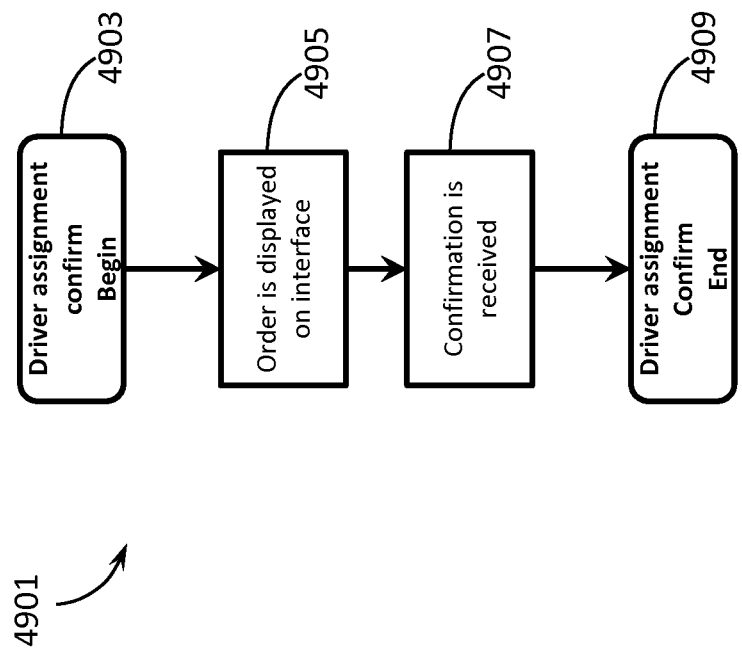
FIG. 49 shows a flow chart of example steps for the Driver assignment confirmer.

A Driver assignment confirmer 3921 is in an optional function enabling an acknowledgment from the driver regarding a given order, as illustrated in FIG. 49. First the order information is displayed on a tool used by the driver 4905. Last the driver assignment is confirmed 4907 and sent back to the Order information manager 3905.

Figure 50:
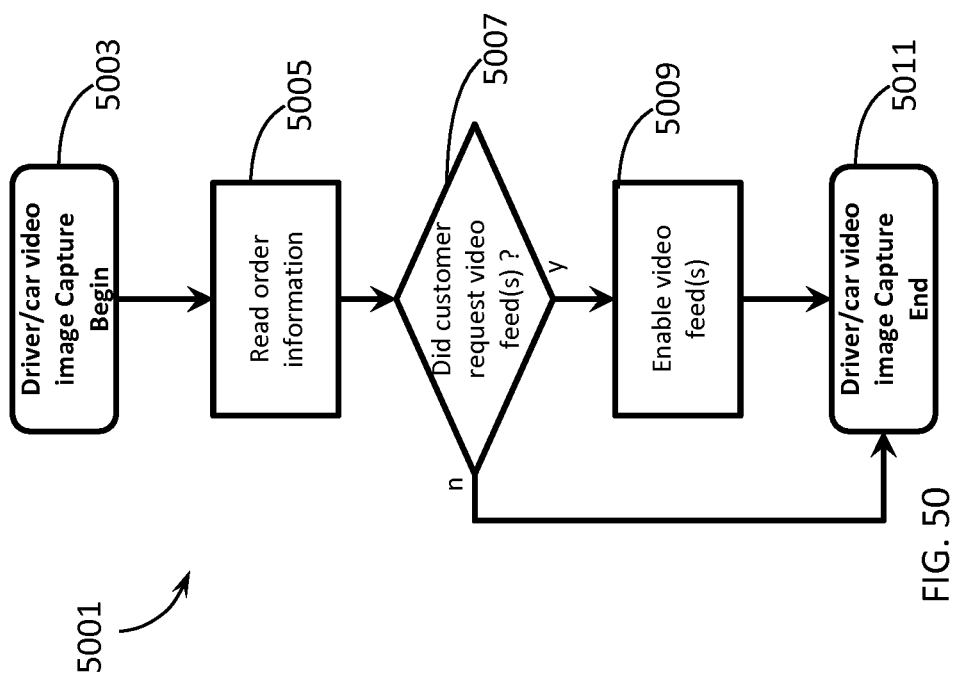
FIG. 50 shows a flow chart of example steps for the Driver/car video image capturer.

A Driver/car video image capturer function 3923 is illustrated in FIG. 50. In the first step, the order information is read 5005 to determine whether the customer wants video images of the delivery process. According to the answer the function determines if camera feeds are enabled 5009.

Figure 51:
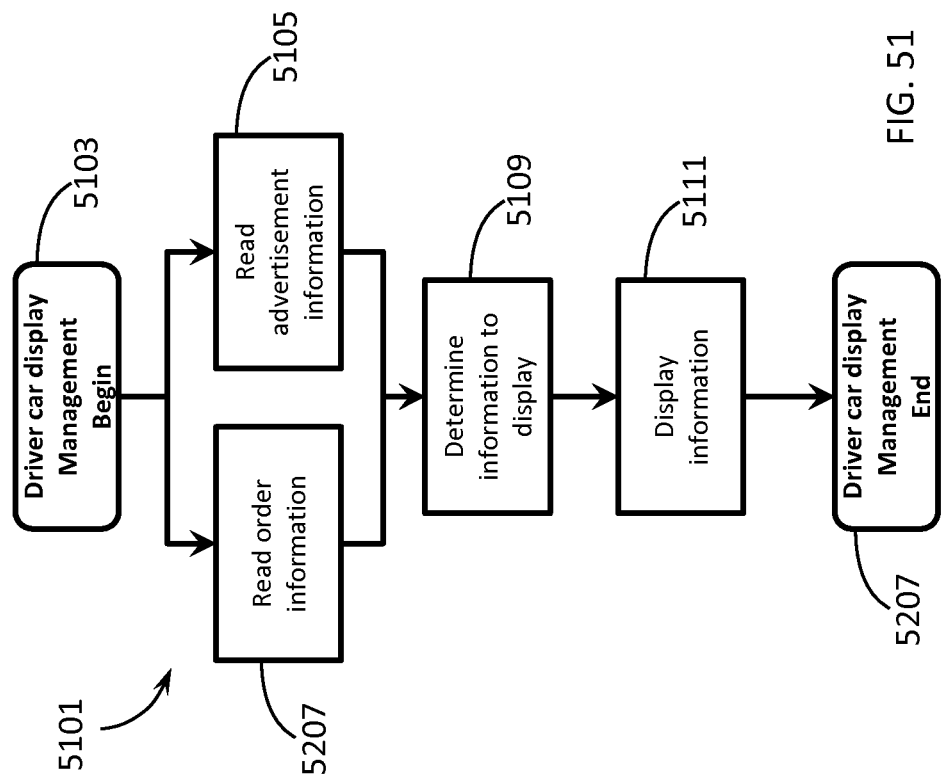
FIG. 51 shows a flow chart of example steps for the Driver car display management.

A Driver car display management 5207 provides publicity on the outside of the delivery car as shown in FIG. 51. The order information is read 5207 to collect relevant information to display (for example the Restaurant name). An advertisement database can also be read 5105 to upload relevant advertisement material (for example a Video file). The function then determines what to display 5109. Finally, the information is shown on the display 5111.

Figure 52:
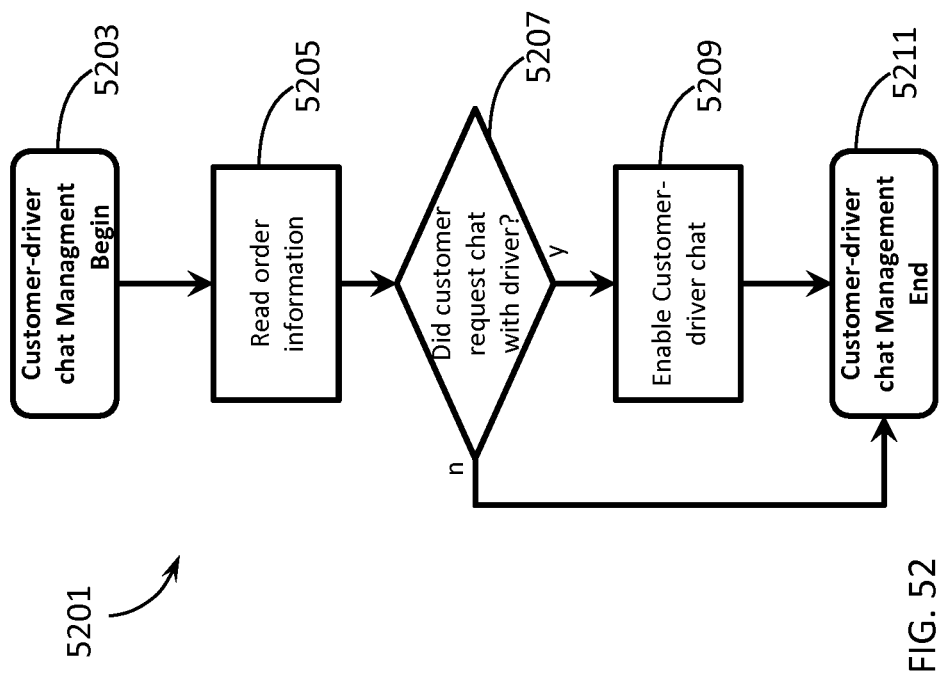
FIG. 52 shows a flow chart of example steps for the Customer-Driver chat management.

A Customer-Driver chat management 3927 enables Customer-Driver communication as illustrated in FIG. 52.

Figure 53:
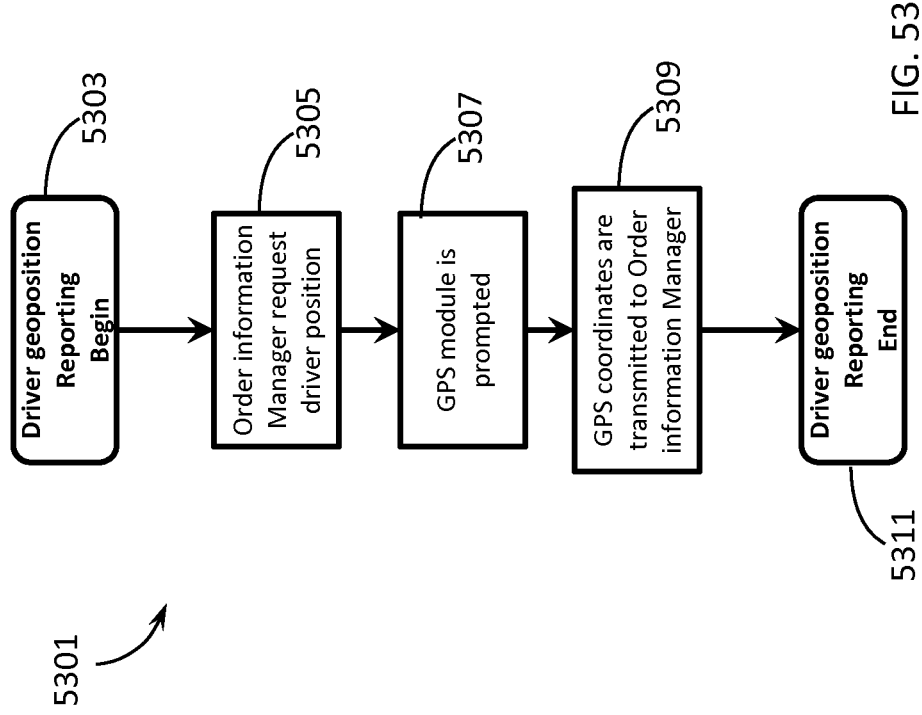
FIG. 53 shows a flow chart of example steps for the Driver geoposition reporter.

A Driver geoposition reporter 3931 enables tracking of the driver during delivery as illustrated in FIG. 53.

An Order payment confirmer 3933 enables confirming receipt of payment as illustrated in FIG. 54.

An order delivery confirmer 3935 enables confirming delivery as illustrated in FIG. 55.

Figure 3:
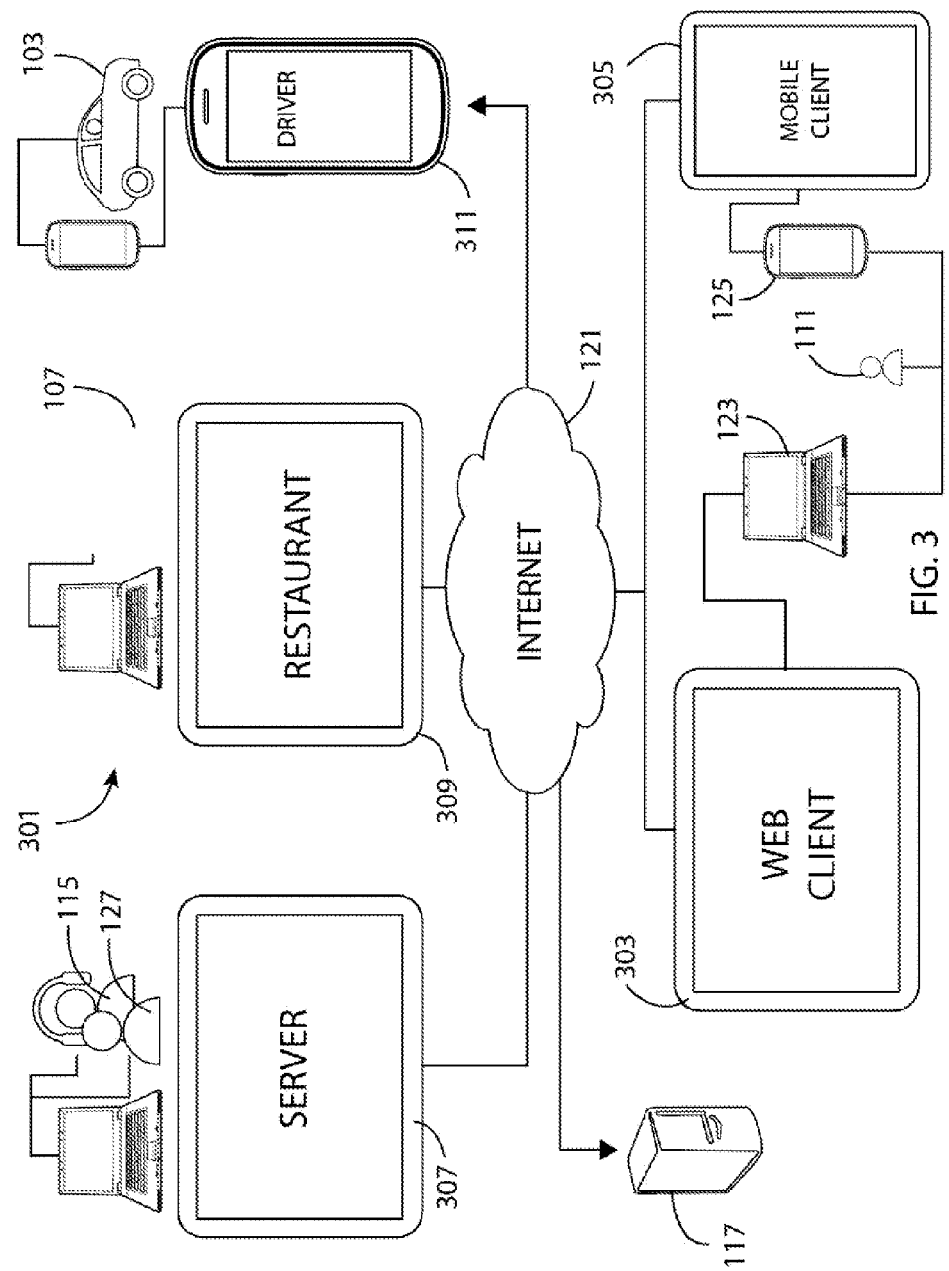
FIG. 3 is a diagram of the software tools comprising an example embodiment.

In an example embodiment, specialized tools are provided in order to improve efficiency. One example of the specialized software user interfaces 301 is provided in FIG. 3.

The customer 111 can be provided with two ordering interfaces. First, a web interface 303 can be used on a computer 123. This interface allows the user to quickly browse and select a restaurant, and then choose dishes from the restaurant menu. More information on the customer Delivery Management System web interface is provided in FIG. 21 to FIG. 38.

Secondly, for convenience the customer can also use an ordering interface 305 using a mobile device 125 (for example a smart phone or tablet). The mobile device ordering interface 305 can provide similar capabilities as the web interface 303.

Both the customer web interface 303 and the customer mobile device interface 305 can allow the generation of orders directly in the central server 117 via the Internet 121.

Operators 115 and Dispatchers 127 can both use the Delivery Management System main interface 307, providing a full and configurable access to information residing in the central server 117. The Delivery Management System interface 307 can enable monitoring of pending and past orders, in addition to information on restaurants, customers, drivers, and of course the menu items composing orders. More information on the Delivery Management System main interface is provided in FIG. 4 and in FIG. 6 to FIG. 17.

Restaurant 107 can use the restaurant operator DMS interface 309 that provides a list of submitted orders and corresponding timers. The restaurant operator can consult and print the orders. Fields are provided for special instructions regarding customer preferences for cooking, seasoning, and allergy information. More information on the Delivery Management System restaurant operator interface is provided in FIG. 20.

The delivery vehicle driver 103 also benefits from an optimized driver DMS interface 311. More information on the Delivery Management System driver interface is provided in FIG. 18 and FIG. 19.

Figure 4:
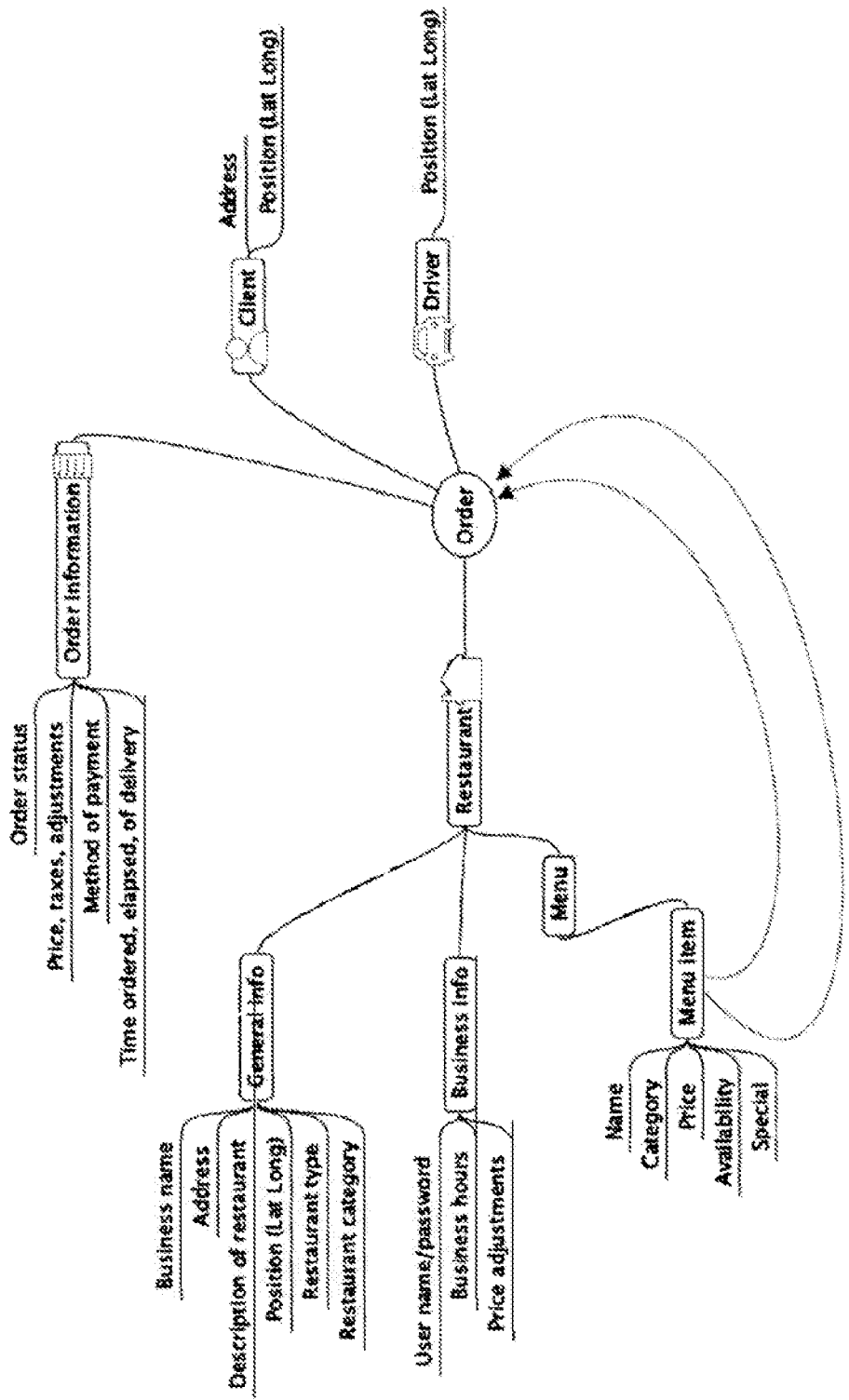
FIG. 4 is an example data architecture of the database used in an example embodiment.

FIG. 4 shows an example simplified structure of a Delivery Management System database. The main entities include the order 403, restaurant 405, customer 407, driver 409, and the menu items 411 composing the order. A number of parameters are shown in FIG. 4 for each entity. In this example, the order is the central entity.

Figure 5:
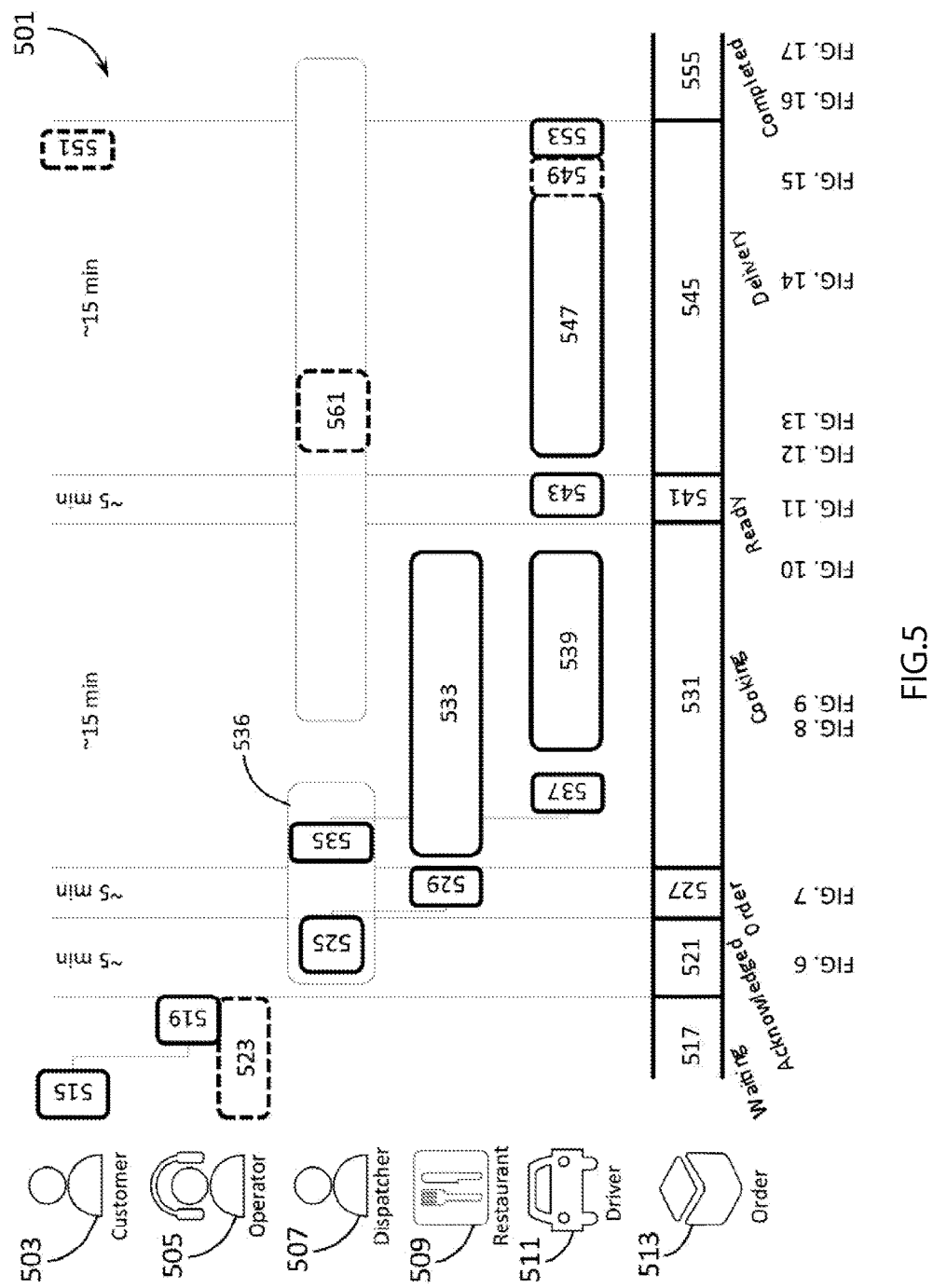
FIG. 5 is an example timing diagram describing the various tasks and actions undertaken by the several actors of an example embodiment.

FIG. 5 shows a time diagram 501 of an example embodiment used for restaurant order Delivery Management System. The left column displays five actors: the customer 503, operator 505, dispatcher 507, restaurant operator 509 and delivery car driver 511. The rounded boxes to the right of the actor column are the action performed by the actors 503-511. The bottom bar displays the corresponding order status 513. Names of figures under the order status appear at the appropriate times for reference.

The order can be initiated either by the customer 503 or by the operator 505. In the first case, the customer 503 places 515 the order using the DMS ordering tool, either on a personal computer or a mobile device such as a smart telephone or a tablet. In one embodiment, the order thus created is in the "waiting" status 517. It awaits a confirmation action 519 by the operator 505. The delivery management system can for example require the operator 505 to call a first-time customer who submitted a cash-payment-upon-delivery order to verify the content of the order and call the customer 503 to ensure that the order is not a prank call. After verification by the operator 505, the order can be promoted to the "Acknowledged" status 521. This confirmation action 519 can also be undertaken by the dispatcher 507.

Alternatively, the operator 505 can take 523 the order from the customer 503 over the phone and can enter the order in the system using the delivery management system main tool. In this case the order can enter the system directly in the "Acknowledged" status 521.

In an example embodiment, orders can be placed a long time in advance, for example more than one hour before the time of delivery. In this case the orders can be placed in a special "Pre-order" list. The separate list helps to avoid cluttering the working order lists and facilitate the job of the dispatcher 507. When the orders located in the "Pre-order" list are within a pre-selected time interval of delivery, for example 1 hour, they can be automatically promoted to the "Acknowledged" status 521 where they can draw the attention of the dispatcher 507.

In an example embodiment, "Acknowledged" orders are under the responsibility of the dispatcher 507. In particular for multi-restaurants and multi-driver systems, the dispatcher 507 uses his/her judgment in processing the orders in order to globally optimize the order process. The dispatcher 507 has two main tasks to accomplish 1) submit the orders to the restaurants and 2) assign drivers to deliver the prepared orders to the customers.

First the dispatcher 507 submits 525 the order to the associated restaurant 509 at the right moment. In an example embodiment, this can be performed by simply promoting an order to the "Order" status 527, since the association with a particular restaurant is already part of the order information. The timing of this action can help in creating a more efficient delivery. Sending an order too soon may result in the food waiting for pick-up by the driver 511, leading to a lower quality experience by the customer. Likewise sending an order too late may result in time wasted by the driver 511 waiting for the order and lower customer satisfaction because of long waiting time.

The submitting 525 of orders to the associated restaurants 509 can be performed by a trained dispatcher 507 or by automated decision algorithms or by a combination of both. An interesting combination is to have the Delivery Management System automated algorithm propose a submittal and have the dispatcher 507 approve the action.

The system includes other similar DMS algorithms using order lists, driver assignments and geographical information to automatically assign orders to drivers and manage the submittal of orders to the restaurants.

Figure 20:
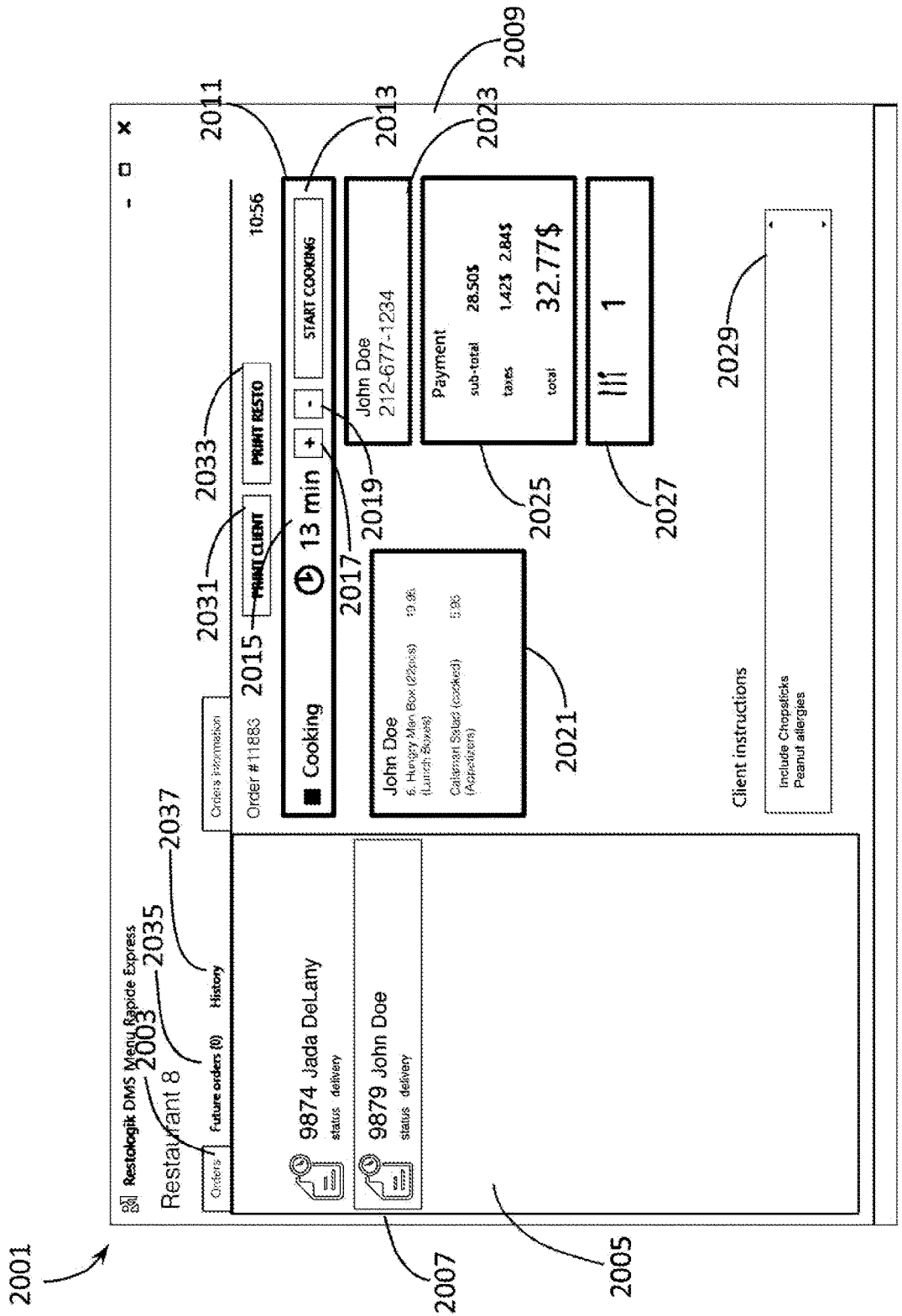
FIG. 20 is an example user interface of the delivery management system software tool used by the restaurant operator.

Orders promoted to the "Order" status can appear on the screen of the DMS restaurant operator tool at the restaurant 509 site as illustrated in FIG. 20. As illustrated in FIG. 5, in an example embodiment, the restaurant operator is asked to acknowledge 529 the receipt of the order, causing the order to be promoted to the "Cooking" status 531. The restaurant is presented with a timer for each order. As mentioned previously, the restaurant operator tries to respect the allotted time for the order because the delivery person will be arriving at a time close to the end of the "Cooking" cycle.

The second responsibility of the dispatcher 507 is to assign 535 a driver 511 to an order 513. In an example embodiment, the assignment 535 can be performed at any time while the order 513 is in the "Acknowledged" 521, "Order" 527 or "Cooking" 531 status as represented by the gray rounded box 536 behind the assignment task 535.

In an example embodiment, the driver 511 receives his assignment on his mobile device 131 and can acknowledge receipt 537 by pressing a button on the Delivery Management System driver tool 311. In the example embodiment shown in FIG. 5, neither the assignment 535 of the driver 511 nor the receipt acknowledgement by the driver changes the status of the order (it remains in the "Cooking" state). However some visual cues (such as the green check mark 703 shown in FIG. 7), may be featured in the main Delivery Management System tool 307 to help dispatchers 127 know that the driver has received their assignments and better manage the delivery process in general.

Based on his current position, the location of his destination (restaurant) and time constraints, the driver 511 manages his actions and when appropriate, drives 539 to the restaurant 509. In an example embodiment, the driver can also receive optimized driving directions on his mobile device 131, according to his current location and destination (restaurant) using a Global Positioning System that can be part of his mobile device 131 or car appliances. In some cases, the traffic information can also be added to the GPS information to identify the optimized itinerary. This is illustrated in FIG. 18C and FIG. 19A.

In an example embodiment, the cooking cycle is solely based on the cooking timer, which upon completion, triggers a transition to the "Ready" status 541. Alternatively, the restaurant operator can inform the system that the food is ready by pressing a button on his restaurant Delivery Management System tool.

Ideally, the driver's arrival at the restaurant is synchronized with the food being ready for pickup. The driver 511 arrives at the restaurant 107 and picks-up the order. He can verify the content of the order and confirm 543 pickup on his driver Delivery Management System mobile device 131, causing the status of the order to be promoted to "Delivery" 545. The verification of the order can be performed using several methods. One method consists in visually comparing of the content of the order with a list of selected menu items.

Alternatively, the driver can scan a code on the order container, which can automatically promote the status of the order to "Delivery" 545. This can be achieved using an optical bar code, a QR code, a RFID tag or any other suitable identification technology.

Next, the driver 511 drives 547 to the customer location 109. He physically brings the order to the customer and requests payment 549 if applicable (cash, check transaction or any other payment method that was not completed during the ordering step). In this case, the customer 503 pays 551 for the order. The driver 511 gives the order to the customer 503 and enters the transaction as completed 553 using the driver Delivery Management System tool. This is illustrated in FIG. 19B. The status of the order is thus promoted to "Completed" 555.

In an example embodiment, the driver DMS tool integrates a payment method that allows the customer and the driver to perform a direct person-to-person transaction for the payment of the drive tip or gratuity. In this case, the delivery company does not have to take charge of this transaction.

In an example embodiment, the driver DMS tool integrates a payment method that performs a realtime salary deposit into the driver bank account (or similar monetary reserve) after each delivery or after predetermined work time intervals. This instant payment provides immediate reward and can incentivize the employee to work harder or perform better. Alternatively, the driver DMS tool can show the salary due in realtime according to his/her deliveries and work, even if the salary is paid at the end of the day, week or any other agreed time interval.

The advanced DMS allows the simplification of discounting often offered in the retail business. Indeed it is possible for the DMS to accept coupons during the payment stage using the driver mobile device. In this manner, the driver can scan the customer coupon (featuring a QR code or any other suitable code) and the central database can instantly update the bills and amounts due, eliminating any tedious management and accounting of rebates and coupons.

Order final statuses other than "Completed" 555 are possible to indicate an order that was cancelled ("Cancel"). In an example embodiment a "Cancel" order designates an order that was cancelled early and thus that was credited by the restaurant and a "Lost" order is an order that cancelled too late so the restaurant refused to credit it. It is case, the delivery company may incur this loss of revenue.

Figure 18:
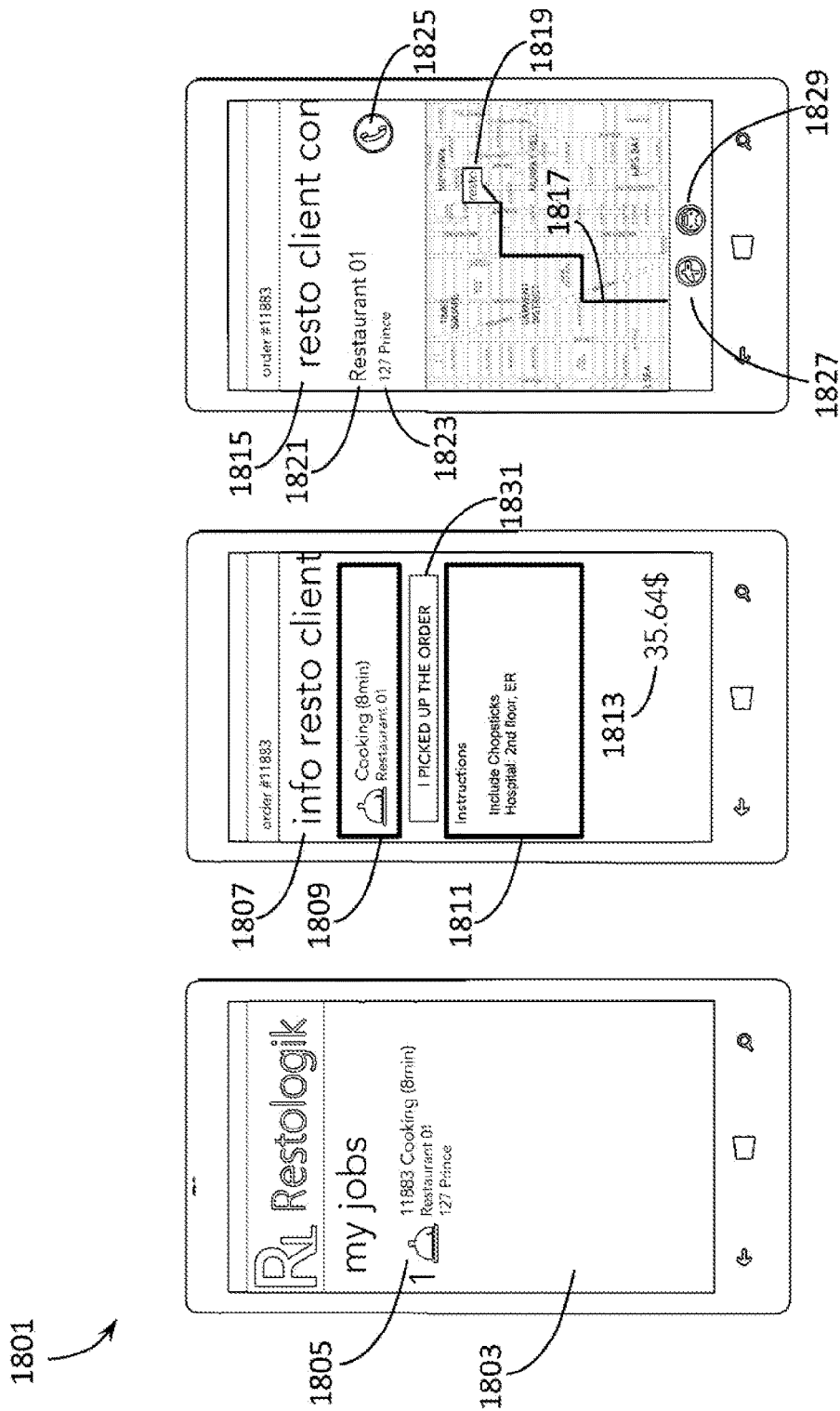
FIG. 18A is an example user interface of the delivery management system software tool used by the delivery driver, showing a list of orders assigned to him.
FIG. 18B is an example user interface of the delivery management system software tool used by the delivery driver, showing an information list for a selected order.
FIG. 18C is an example user interface of the delivery management system software tool used by the delivery driver, showing a geographical map of the restaurant for a selected order.
Figure 19:
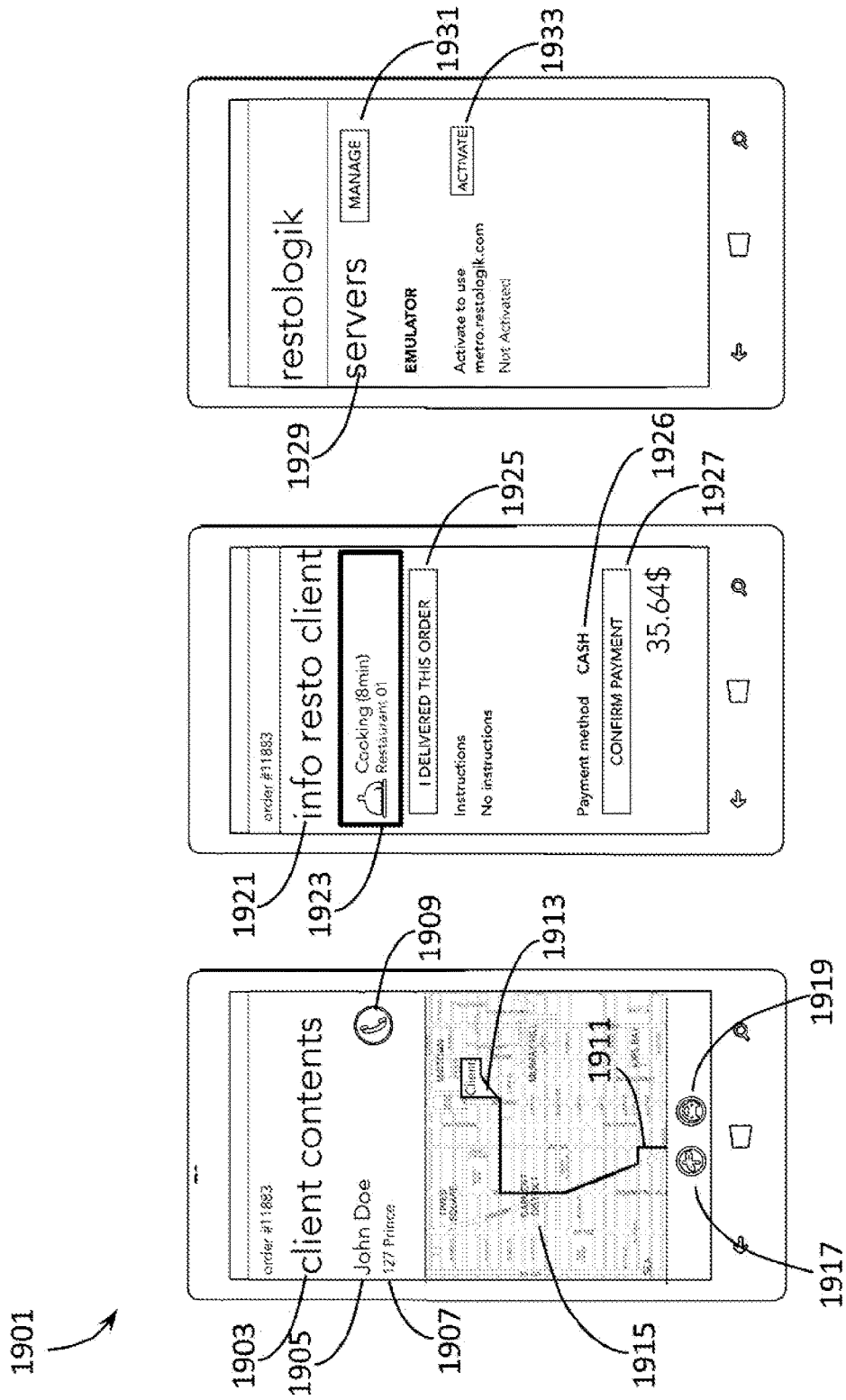
FIG. 19A is an example user interface of the delivery management system software tool used by the delivery driver, showing a geographical map of the customer for a selected order.
FIG. 19B is an example user interface of the delivery management system software tool used by the delivery driver, showing an information list for a selected order at a later time.
FIG. 19C is an example user interface of the delivery management system software tool used by the delivery driver, showing a configuration page.

At any time in the delivery process a dispatcher 507 can assign 561 another order to a driver, even before he has completed the currently assigned delivery. In this case the driver sees two orders in the DMS driver tool 311, which is illustrated in FIG. 18.

Figure 14:
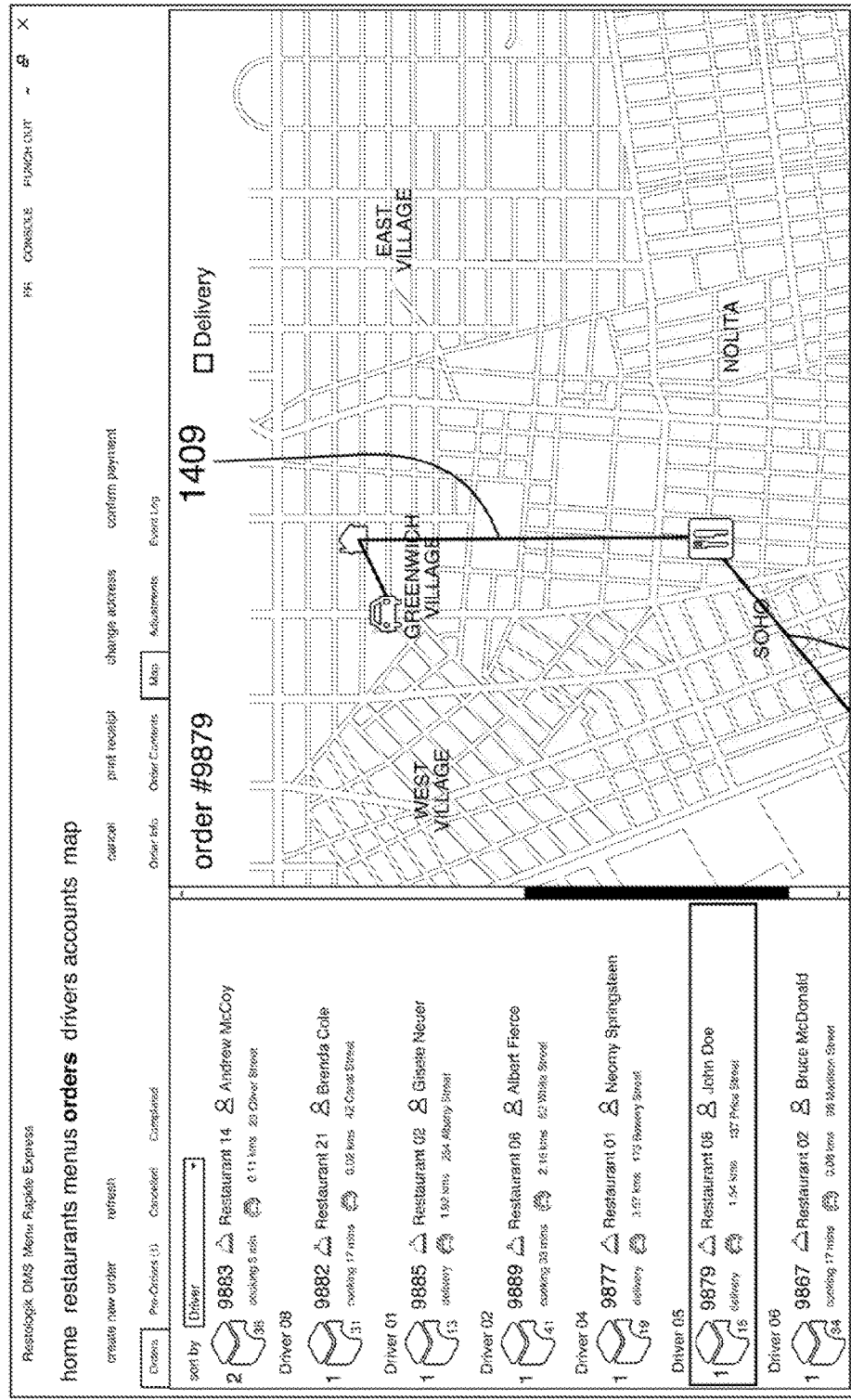
FIG. 14 is an example user interface of the main delivery management system software tool, showing a geographical map for an order in the "Delivery" state and showing a second order being assigned to a driver.

This multiple order assignment can also be visible in the main Delivery Management System interface 307. This is shown in FIG. 14 where a second order 1403 appears in the order list of one driver. In the case of multiple orders being assigned to a driver, a priority ranking can be established to help the timing sequence of the orders. In the example interface shown in FIG. 14, the numbers "1" and "2" 1405 indicate the priority ranking and delivery order. This ordering can be established and modified by the dispatcher 507 using the main Delivery Management System interface 307. Optionally, the driver 511 can also change the ordering based on his judgment. This action could be reflected in the central database so as to inform the dispatcher 507 of the change of plan. Alternatively this priority establishment process can be performed automatically using algorithms, or a combination of these alternate methods.

FIG. 6 to FIG. 17 show a sequence of views from an example Delivery Management System main tool 307, during a delivery cycle. Each corresponding Figure is referred in the time diagram 501 shown in FIG. 5.

Figure 6:
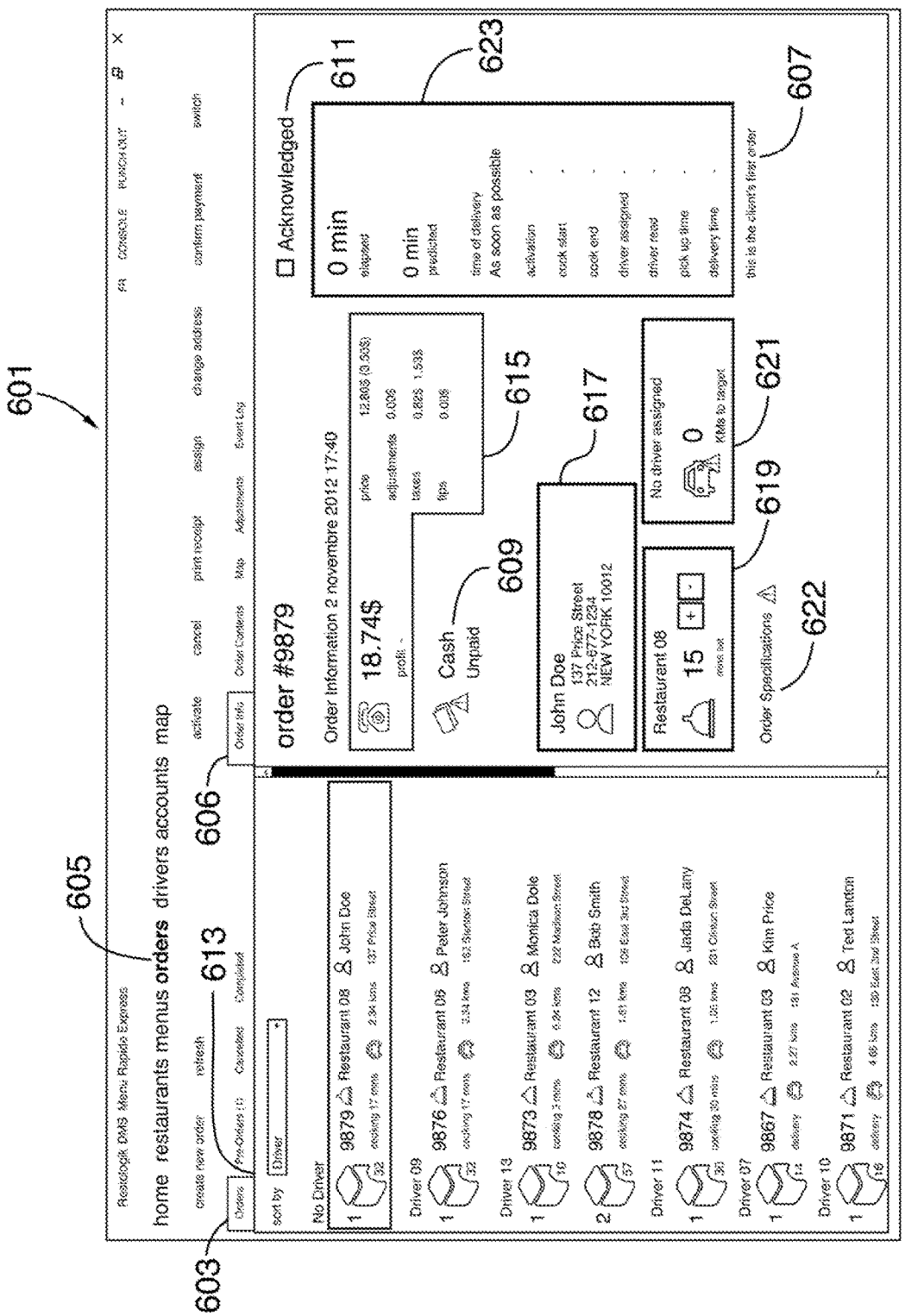
FIG. 6 is an example user interface of the main delivery management system software tool, showing an information list for an order in the "Acknowledged" state.

FIG. 6 shows the "Orders" tab 603 and the "Order info" subtab 606 in the "Orders" menu item 605 from an example main Delivery Management System interface 601. Order number 9879 has been placed via internet by Mr. Doe, a first time customer 607 who indicated "cash on delivery" as method of payment 609. An operator contacted Mr. Doe and subsequently approved the order at 5:40 PM, thereby promoting the order to the "Acknowledged" status 611. The order appears in the list under the "No driver" category since it is unassigned at this moment.

Other information provided in the example main Delivery Management System interface 601 includes the order price and details 615, the customer and address 617, the restaurant name and order cooking timer 619, the driver assigned (none for the moment) and distance from target 621, special instructions pertaining to the order 622 and timing information 623.

Figure 7:
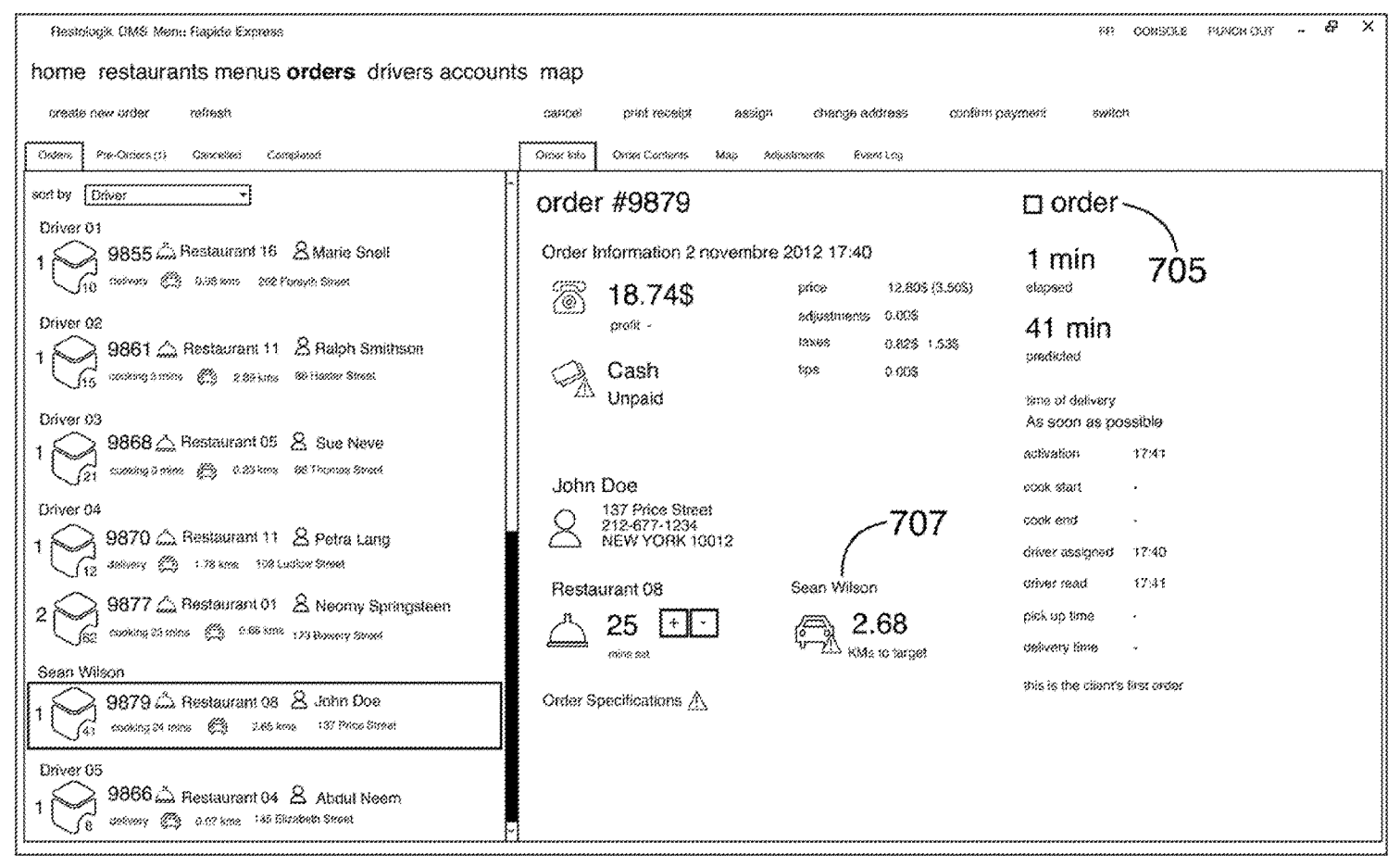

FIG. 7 shows the order promoted to "Order" 705 and the order assigned to driver Sean Wilson 707.

Figure 8:
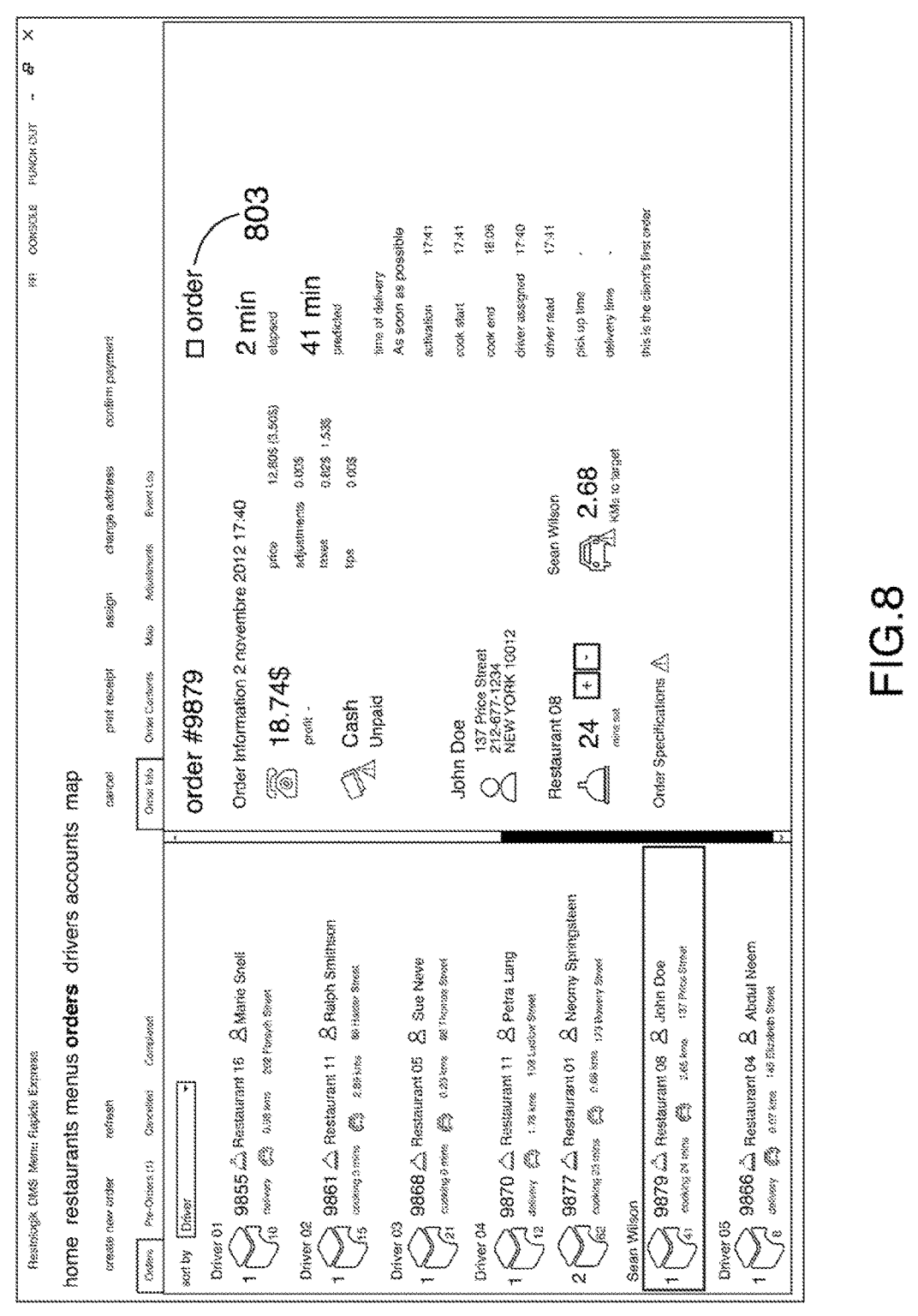

FIG. 8 shows the order acknowledged by the Restaurant operator and promoted to "Cooking" 803.

Figure 9:
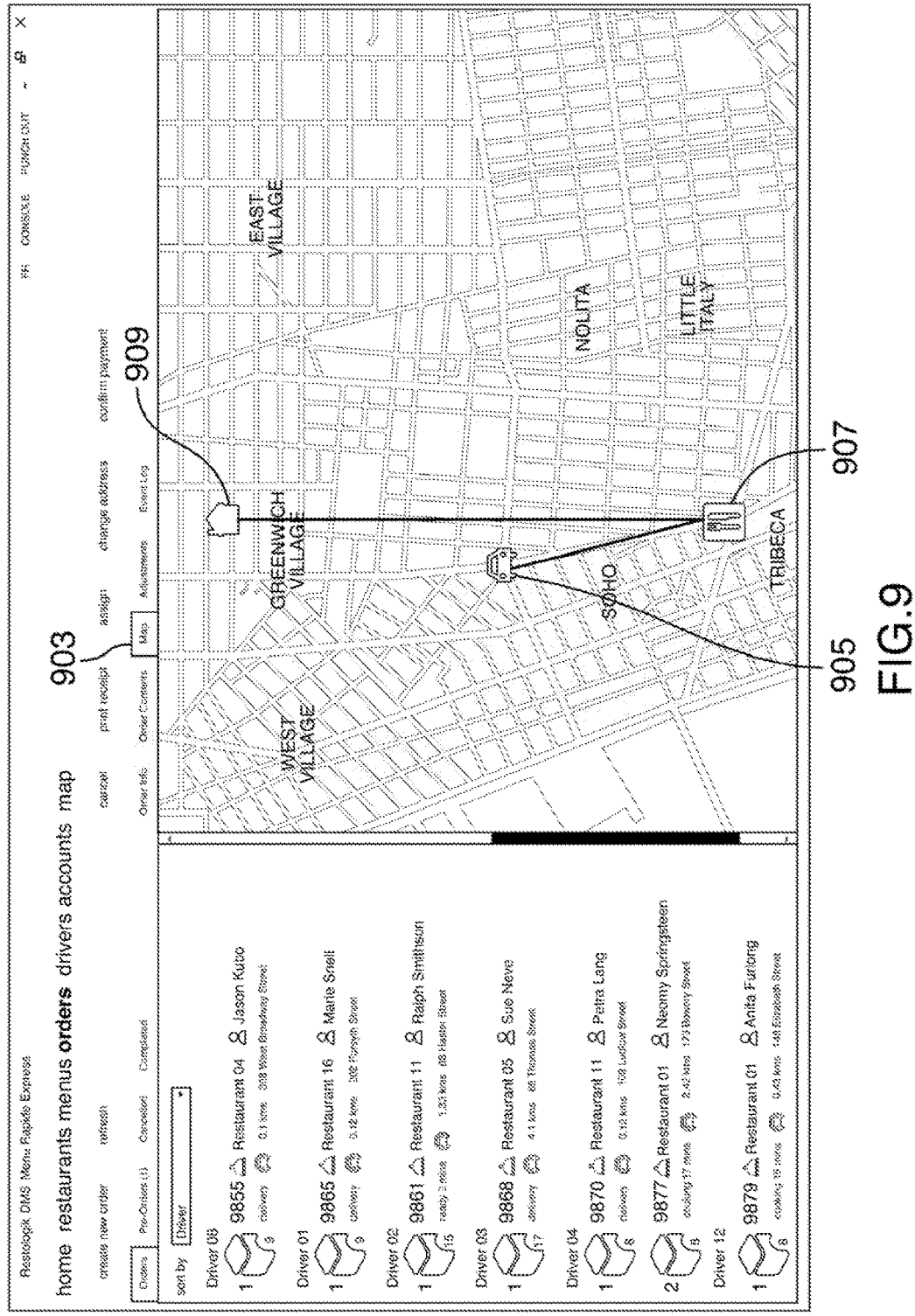
FIG. 9 is an example user interface of the main delivery management system software tool, showing a geographical map for an order in the "Cooking" state.

FIG. 9 shows the "Map" subtab 903 almost at the same time as shown in FIG. 8. Shown on the map are the location of the driver 905, the location of the restaurant 907 and the location of the customer 909. Straight lines are shown in the example to suggest the sequence of driver displacement. Alternative representations where itineraries are drawn on the streets are also possible.

Figure 10:
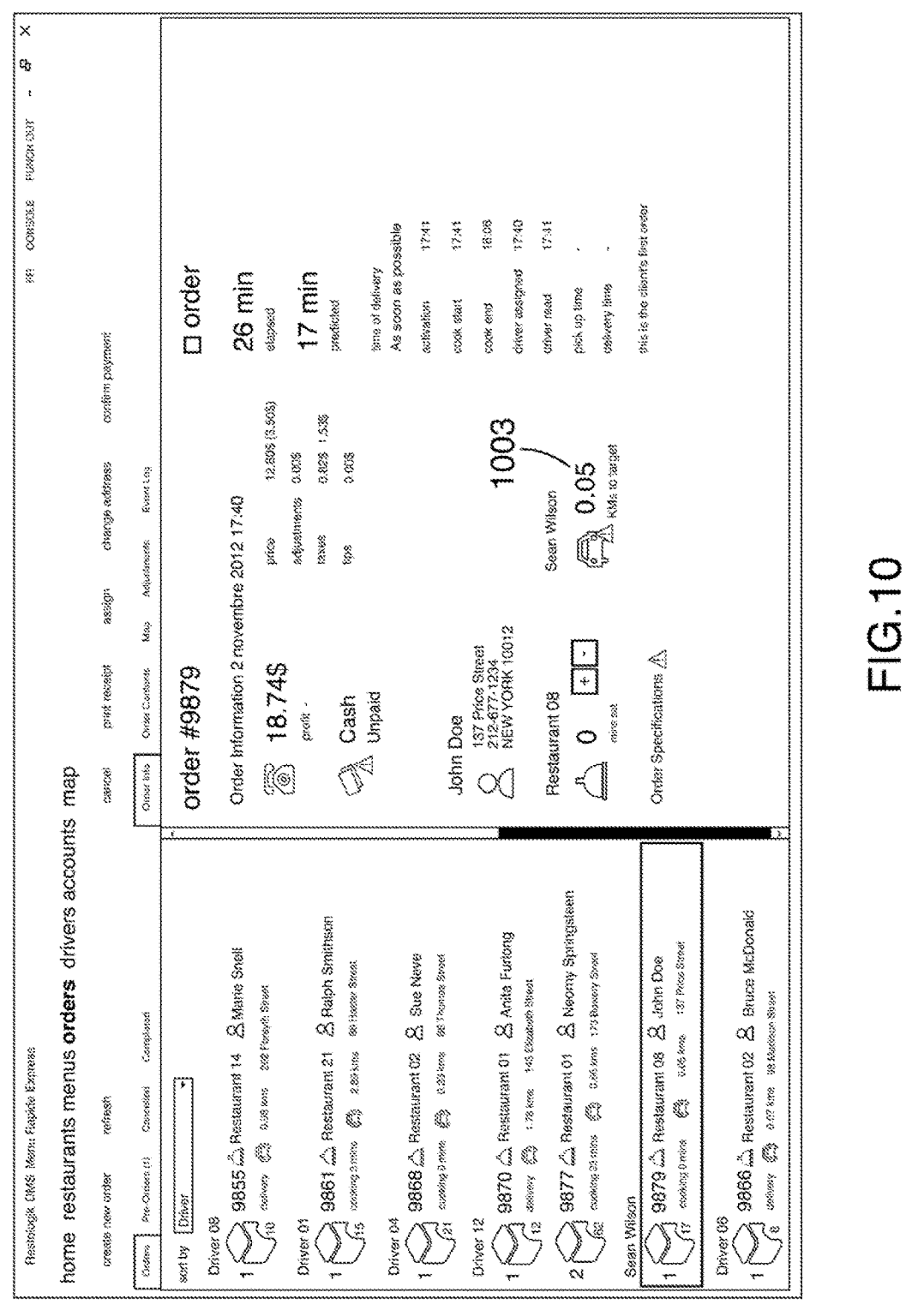

FIG. 10 shows the "Order info" subtab 606 after the driver has arrived at the restaurant. This is visible since the driver distance from target 1003 is very small.

Figure 11:
FIG. 11 is an example user interface of the main delivery management system software tool, showing an information list for an order in the "Ready" state.

FIG. 11 shows that the cooking timer has run out and the order status has been promoted to "Ready" 1103.

Figure 12:
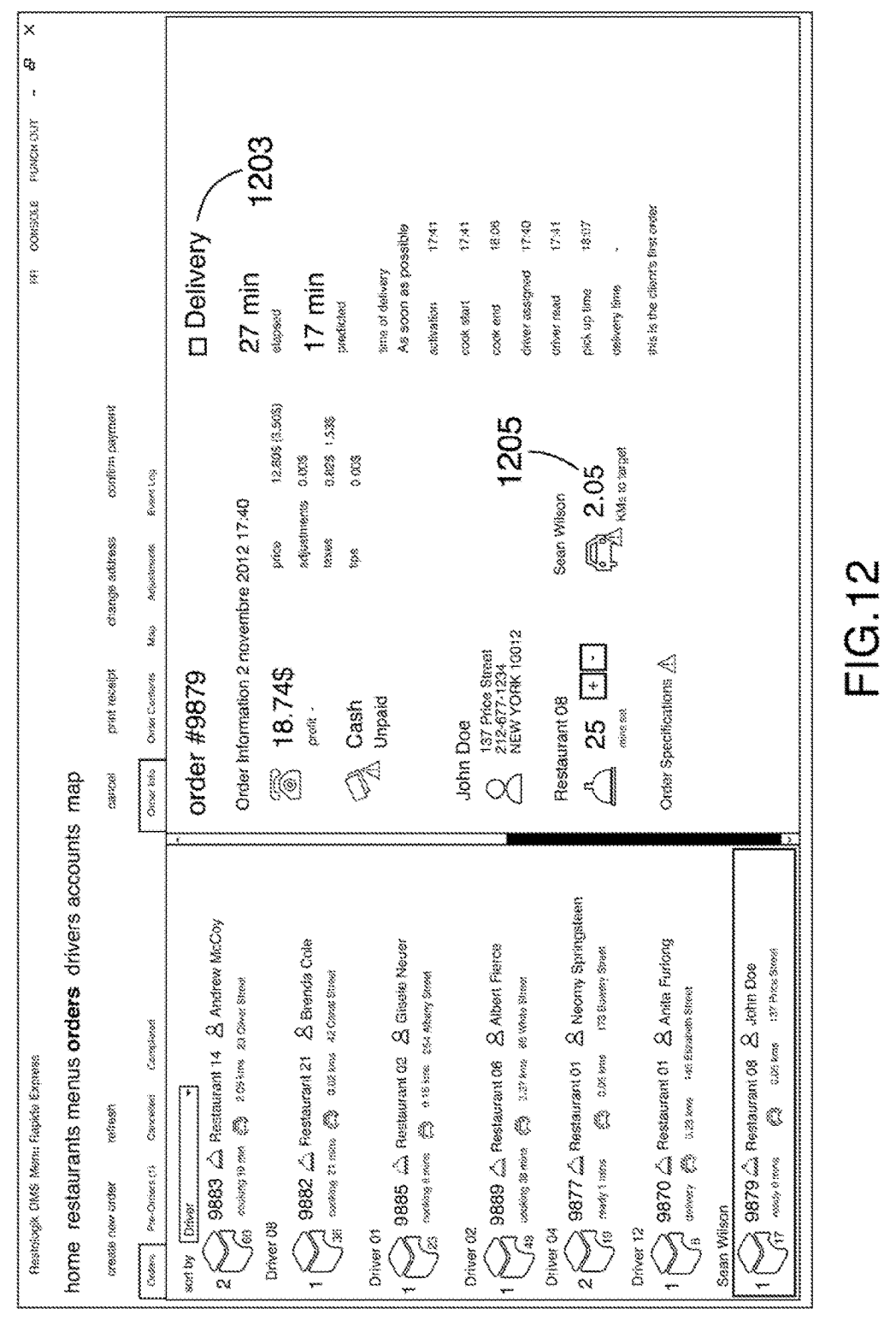

FIG. 12 shows the order status being promoted to "Delivery" 1203 because the driver accepted the order and the new target distance 1205 (to the customer home) being updated.

Figure 13:
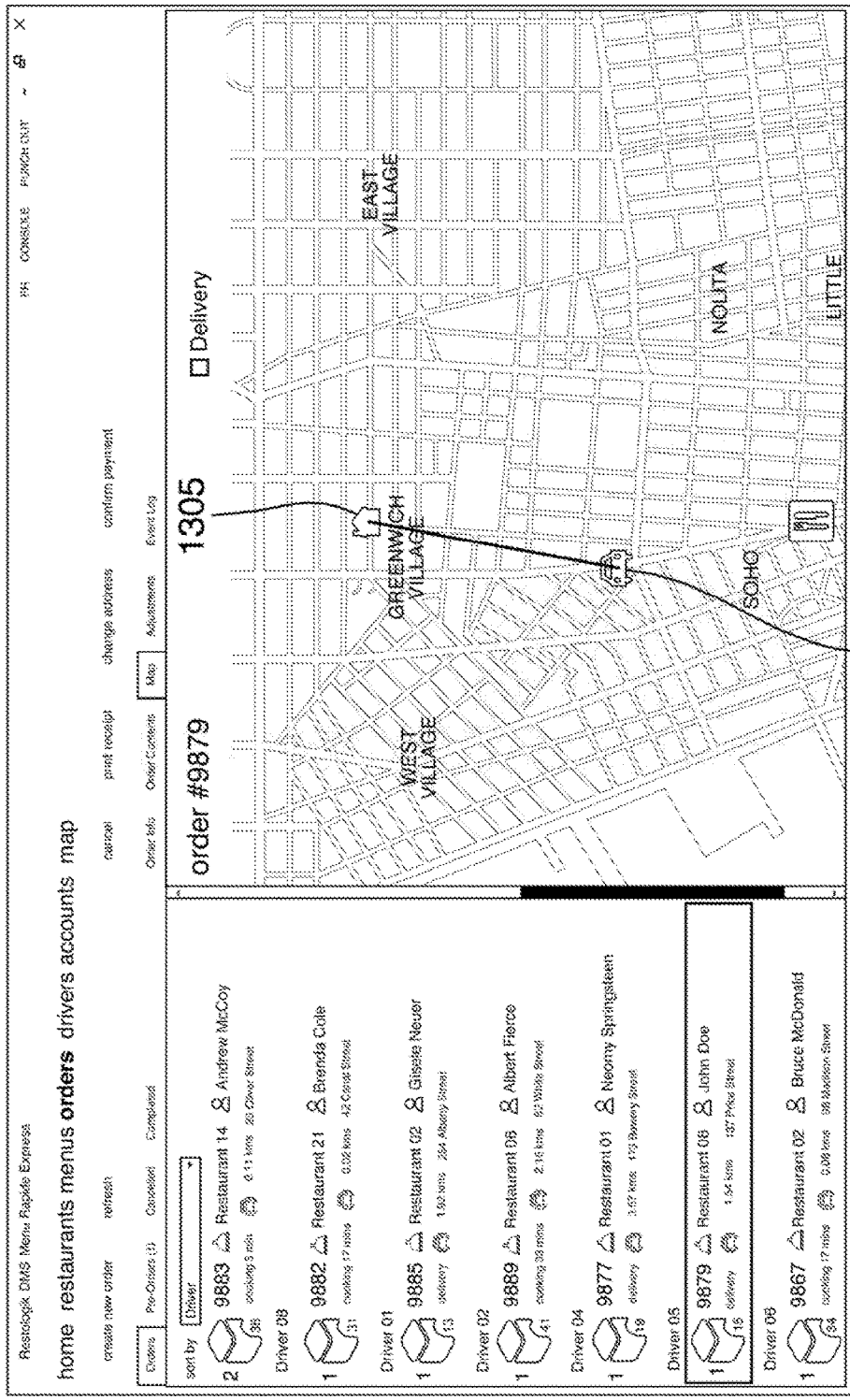
FIG. 13 is an example user interface of the main delivery management system software tool, showing a geographical map for an order in the "Delivery" state.

FIG. 13 shows the "Map" subtab 903 while the driver 1303 is on his/her way to the customer location 1305.

FIG. 14 shows the driver being assigned a new delivery 1405 while still on his/her way to the customer home for the delivery of "order 9879" 1406. A new trajectory 1407 appears on the map in addition to the current order 1409 for visual information.

Figure 15:
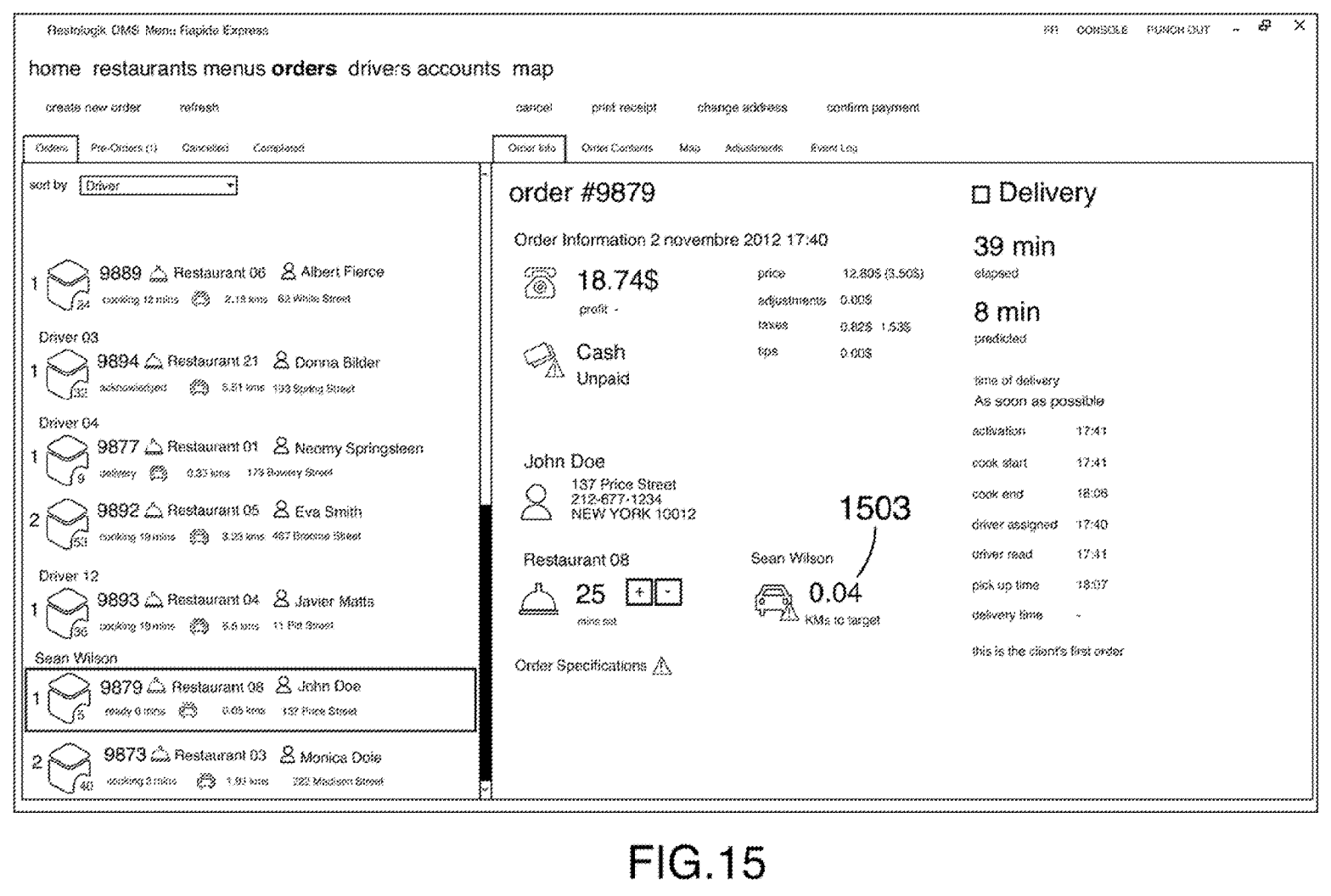

FIG. 15 shows the driver arrived at customer location for the delivery of "order 9879", as indicated by the distance from target 1503 being very small.

Figure 16:
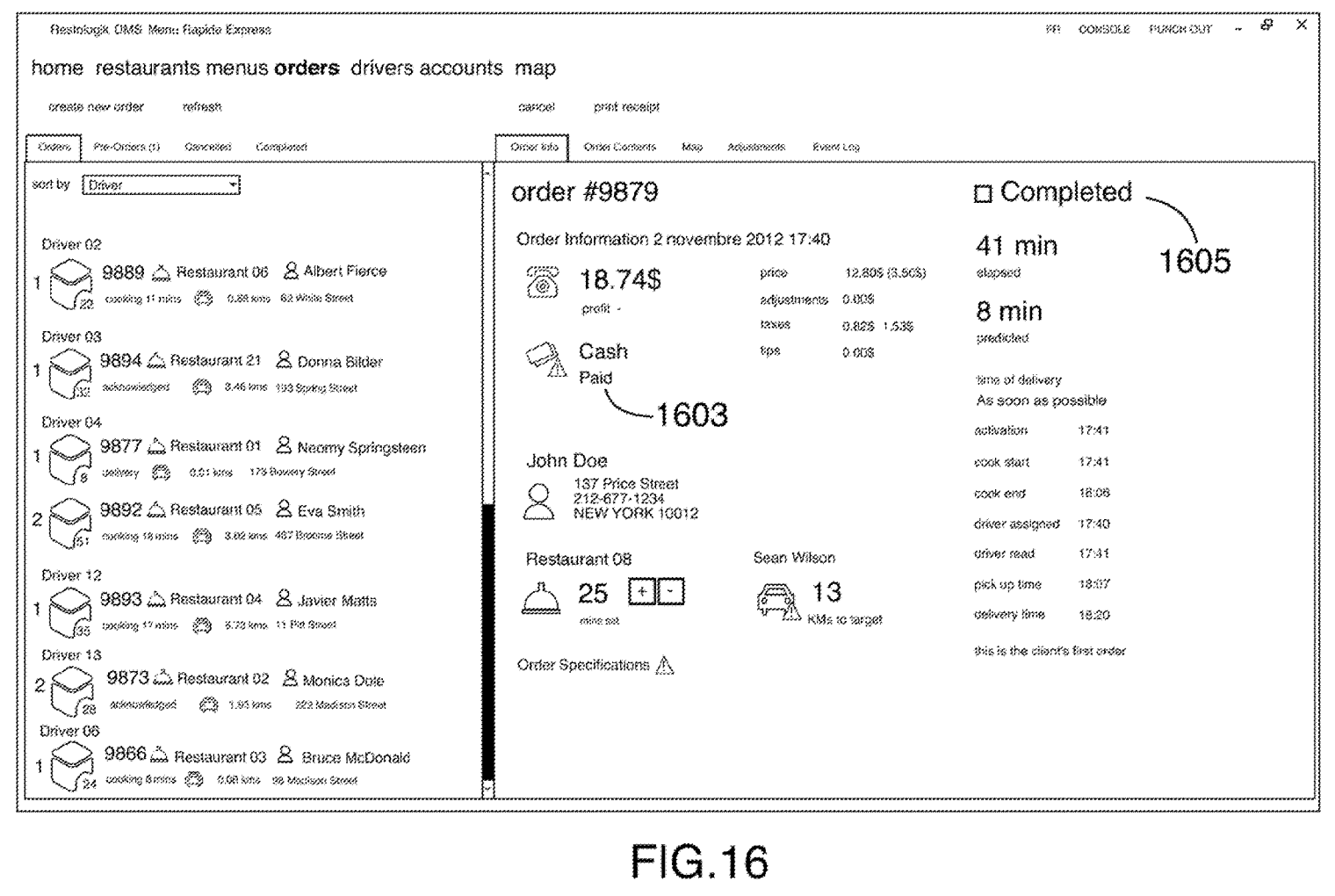

FIG. 16 shows the bill being "paid" 1603 and order status being promoted to "Completed" 1605 by the driver interaction with the Delivery Management System driver interface 311.

Figure 17:
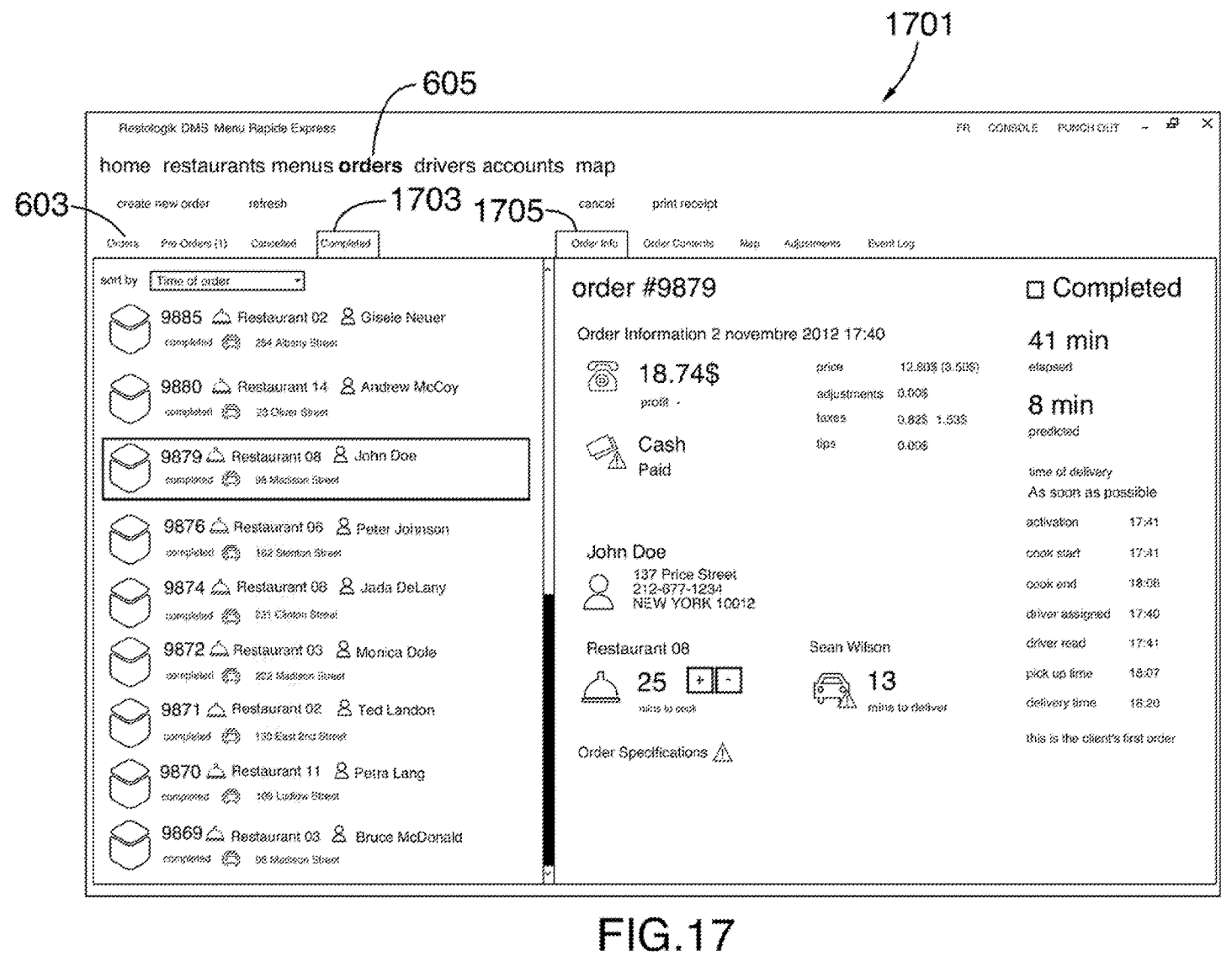

FIG. 17 shows the "Completed" tab 1703 and the "Order info" subtab 1705 in the "Orders" menu item 605 from an example main Delivery Management System interface 1701. This is the place where the users can find past orders and associated information for reference. When they are completed, the orders are automatically moved from the "Orders" tab 603 to the "Completed" tab 1703 in order to lower the clutter of the "Orders" tab 603 which is used for dispatching and working.

FIG. 18 shows several views 1801 of an example DMS driver tool. In this embodiment, the main screen 1803 shown in FIG. 18A displays one order 1805 currently assigned to the driver. When multiple orders are present, they appear as a scrollable list in the main screen 1803.

By pressing on the order 1805, the tool displays the useful information about the order. By selecting the "info" tab 1807, basic information is displayed about the order as shown in FIG. 18B. The order status, remaining time, and restaurant information is displayed at the upper portion 1809 of the page. Special order or delivery instructions 1811 are shown to enable the driver to verify the order content or to find the customer. The price of the order is also shown at the lower portion 1813 of the page.

As shown in FIG. 18C, by selecting the "resto" tab 1815 the driver can visualize the path 1817 to the restaurant 1819. ("Resto" is an abbreviation for restaurant.) This feature is useful to assist the driver in taking the most optimal route during delivery. The "resto" tab 1815 also displays the name of the restaurant 1821 and its address 1823. A speed dial button 1825 is presented for the driver to contact the restaurant to inquire about the order, if he/she has difficulty with the restaurant location or any other question related to the restaurant.

In an example embodiment, the driver is presented with a "Correct position" button that can be pressed when the driver is at the location of the restaurant (or the customer) while the DMS information indicates otherwise. This feature can provide a useful correction to the geographical position of restaurants (and customers) directly in the database in order to benefit future orders from the same restaurants (or to the same customers). Alternatively these corrections can be added into a request list that can be reviewed and accepted by an administrator in order to contribute to avoid erroneous entries. In any case, the previous locations can be retained in the database for later inspection and possibly be reverted.

In the example embodiment, buttons 1827 and 1829 shown in FIG. 18C are provided to help with road navigation. The "retrace" button 1827 allows the user to see the complete path travelled for this order. The "car view" button 1829 centers the map on the car position. The user can also zoom and scroll in the map using the appropriate interface interaction, including either finger motions or other means.

Once the driver has arrived at the restaurant and has picked up the order, he/she can press an "I picked-up the order" button 1831, causing the order status to be promoted to "Delivery" in the DMS.

The next task of the driver is to deliver the order to the customer as soon as possible. Here again the driver DMS tool can help in this task. By selecting the "client" tab 1903 (visible in FIG. 18C), the user accesses text and graphical information that is similar to the "resto" tab 1815 shown in FIG. 18C. Customer name 1905, address 1907 and speed dial telephone button 1909 are presented as shown in FIG. 19A. The optimized path 1911 to the customer location 1913 is also presented on a scrollable and zoomable map 1915. The "retrace" button 1917 and the "car view" button 1919 are also presented to help navigate with the map 1915, as presented above.

In this example embodiment of the driver DMS tool, the status of the order in the "info" tab 1921 shown in FIG. 19B has changed to "Delivery" upon the driver pressing the "I picked-up the order" button 1831 shown in FIG. 18B. The information summary 1923 shown in FIG. 19B displays the "Delivery" icon, distance and address. The top button "I delivered this order" 1925 is used when the order is delivered to the customer. If the method of payment is cash 1926, the interface shows a button 1927 that the driver can press after receiving the payment from the customer, thus informing the DMS system that the transaction is complete.

The DMS driver tool also provides management functions in the "servers" tab 1929 of the application top level, as shown in FIG. 19C. From this level it is possible to specify the IP address of the DMS central server by pressing the "Manage" button 1931. The "activate" button 1933, informs the central DMS system that the driver is signed in and available for deliveries. The dispatcher can confirm that the driver is supposed to be working and currently active. Alternatively, the driver can be considered to be working upon the dispatching of its first delivery after signing in. This feature allows the system to automatically count the working hours of its driver staff.

FIG. 20 shows an example interface 2001 for the DMS restaurant operator tool. In the "Orders" tab 2003, we see the list 2005 of submitted orders. Selecting one order 2007, such as order 11883 as shown in FIG. 20, allows displaying relevant information in an information panel 2009.

Status and timer information 2011 appears in the top area of the information panel 2009. The orders first appear in the list 2005 in the "Order" status. When the restaurant operator or restaurant personnel press the "Start cooking" button 2013, the order status changes to "cooking" as illustrated for order 11883 in FIG. 20. Upon the pressing of the "Start cooking" button 2013 also, the default duration for the order appear in the timer 2015. This countdown timer provides timing cues to the cooking staff.

In an example embodiment, the restaurant operator is allowed to add time to the order "Cooking" cycle timer in order to communicate the information that there is an expected delay (for example the presence of a large volume of orders at this particular moment) in his/her operations preventing him/her from meeting the nominal cooking time. In this case, increment 2017 and decrement 2019 buttons are provided for the cooking staff to correct the preparation time for the order. Other equivalent methods for correcting the default preparation time can also be used including numerical entry and slider. This information can allow an optimization of the global management of deliveries. For example in some cases this information may allow an assigned driver to "squeeze" another delivery before the delayed order is ready, thus increasing productivity.

In an example embodiment, the default cooking times are programmable by the restaurant owner. Another approach is to have default times according to the content of the order. Alternatively, the information provided by the Delivery Management System can be used to adjust the default times based on historical cooking times for similar orders.

Instead of providing a numerical timer 2015, progress bars can alternatively be used to provide a more visual display of the remaining time for each order.

The information panel 2009 of the example restaurant operator DMS tool shown in FIG. 20 also provides order content 2021, customer name and phone number 2023, pricing information 2025, number of guests in the order 2027 (which indicates the number of sets of utensils to provide with the order), as well as special instructions associated with the order 2029, such as allergies and dietary preferences.

In an example embodiment, the restaurant Delivery Management System includes a printer in order to print the customer and the restaurant bills. The DMS can automatically generate and store bill information for each order based on the order content and the fee structure for the delivery service. The information panel 2009 of the example restaurant operator DMS tool shown in FIG. 20 provides a button 2031 to print the customer bill and a button 2033 to print the restaurant bill. The customer bill is normally attached to the order for the customer. The restaurant bill is used for administrative purposes and may show the amounts due to the restaurant by the delivery operation. The delivery operation can charge the restaurant fees for delivery in a number of ways including a flat fee, a fee proportional to amount of the order, a fee proportional to the distance traveled for delivery or a combination of these fees. The restaurant bill charges the agreed food prices while the customer bill charges the food prices and the delivery fees.

The example restaurant operator DMS tool shown in FIG. 20 also provides a "future orders" tab 2035 where pre-orders are listed. These pre-orders are often large orders booked more than 1 hour before delivery time to allow the restaurant to plan accordingly, for instance order ingredients. A "history" tab 2037 can also be provided to maintain a historical record of completed orders for reference.

The sequence from FIG. 21 to FIG. 37 show an example interface 2101 for the customer DMS tool. It is understood that the interface can be implemented otherwise. The customer DMS tool can be accessed using an account name and password.

Figure 21:
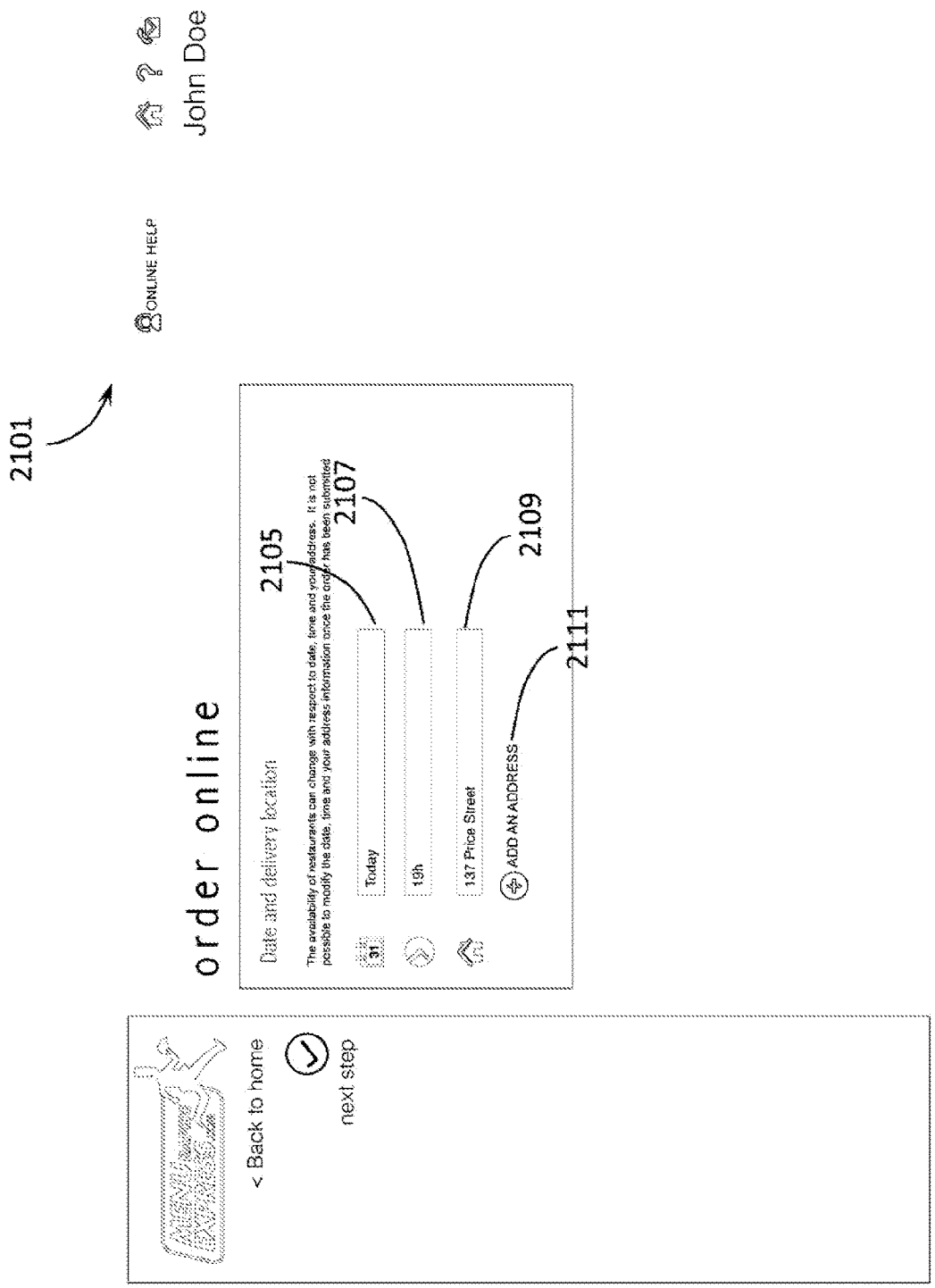
FIG. 21 is an example user interface of the delivery management system software tool used by the customer, requesting time and location information for the order.

FIG. 21 shows the first step of the ordering process where the delivery location and time are specified. The customer selects a date 2105 and time 2107 for the order. It is possible to place an order long time in advance, in which case the order is placed in a pre-order list as discussed earlier. The customer selects the delivery location 2109 from a list of location defined by the user, for example his/her home and his/her office. The customer can also define a new location using the "Add new address" button 2111.

Figure 22:
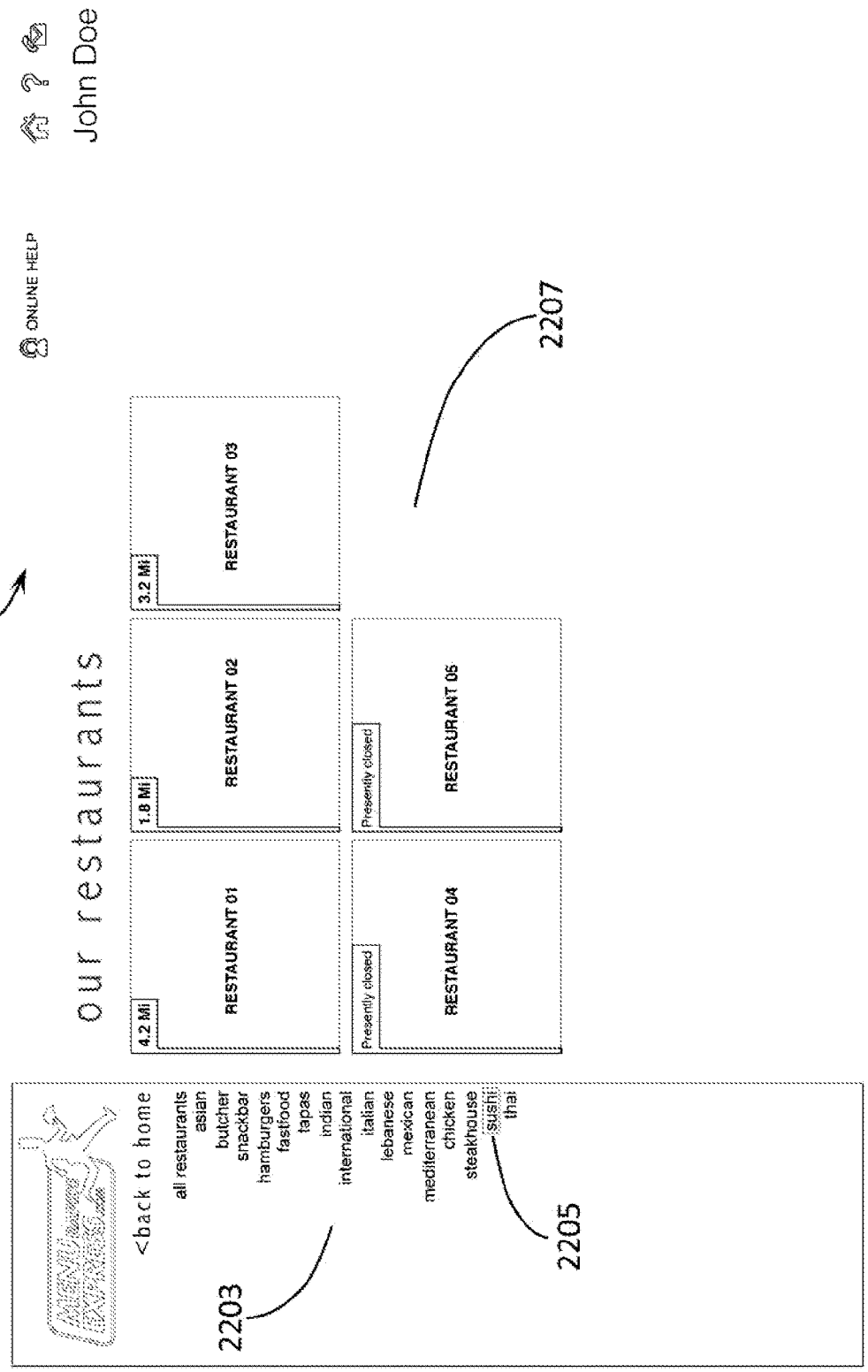
FIG. 22 is an example user interface of the delivery management system software tool used by the customer, showing a list of restaurants.

After having pressed the "Place an order" button, the customer is presented with a list of restaurants as shown in FIG. 22. In order to simplify the task of choosing the restaurant of interest, the user can use filter categories 2203. The selected filter category 2205, causes the restaurant list 2207 to only display restaurants from the selected category, here Sushi restaurants in the example of FIG. 22.

The present centralized, realtime intelligent Delivery Management System can allow the efficient management of orders submitted to a restaurant chain. In this case, the customer does not have to pick the branch from which the order will come from. The Delivery Management System can automatically assign the order to the branch closest to the customer or alternatively to the branch that can prepare the food faster, so the total waiting time is shorter for the customer. The reason for a shorter cooking time could be being less busy, a more efficient staff or any other reasons.

Figure 23:
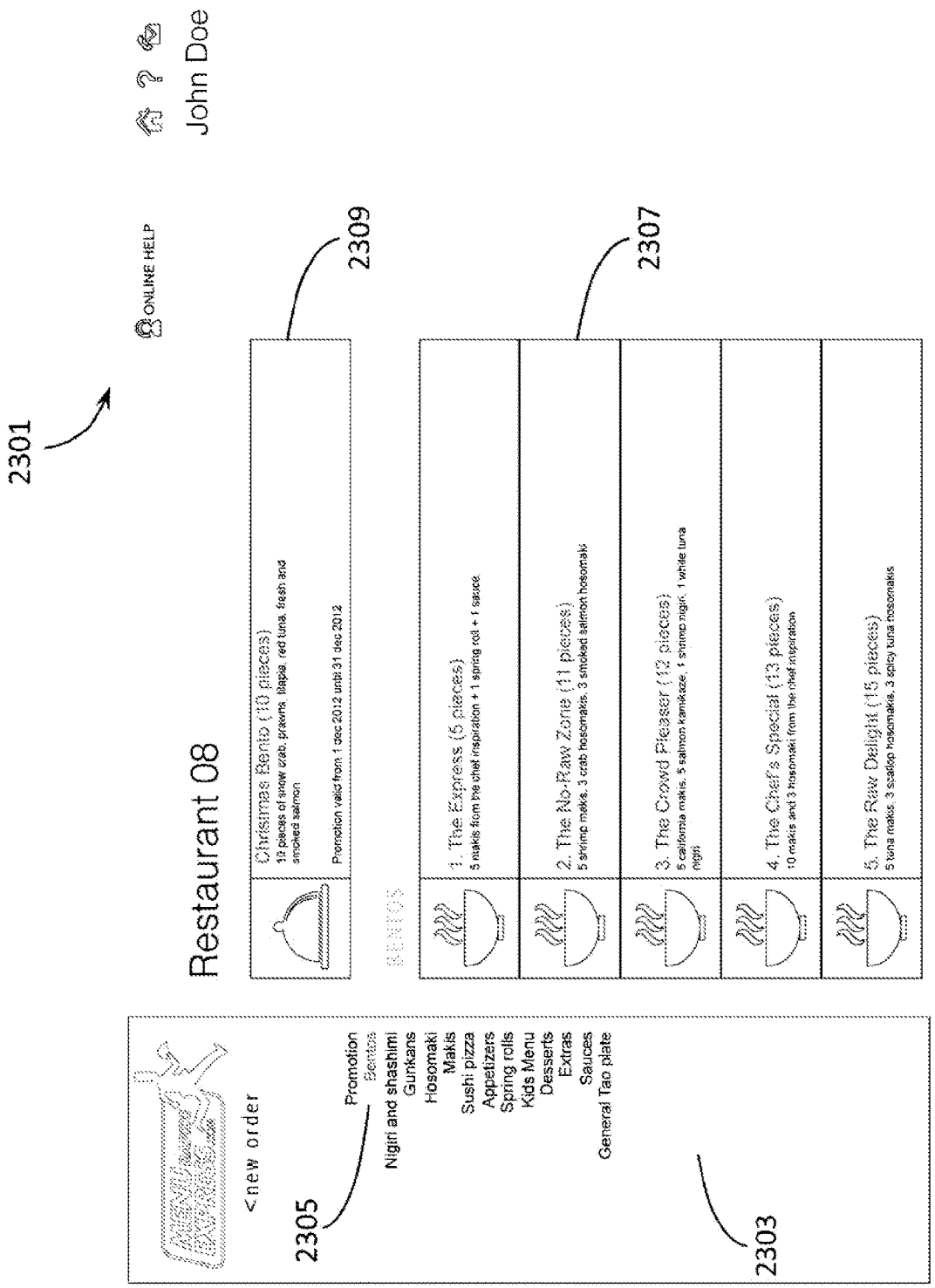
FIG. 23 is an example user interface of the delivery management system software tool used by the customer, showing a list of menu items from a restaurant.

After having selected a restaurant, the customer is presented with a list of menu items that can be selected as shown in FIG. 23. In order to simplify the task of choosing the menu items, the user can use filter categories 2303. The selected filter category 2305, causes the restaurant list 2307 to only display the menu items from the selected category, here Sushi boxes. Optionally, the restaurant operators can choose to define promotional items 2309 and display them at the top of the list.

Figure 24:
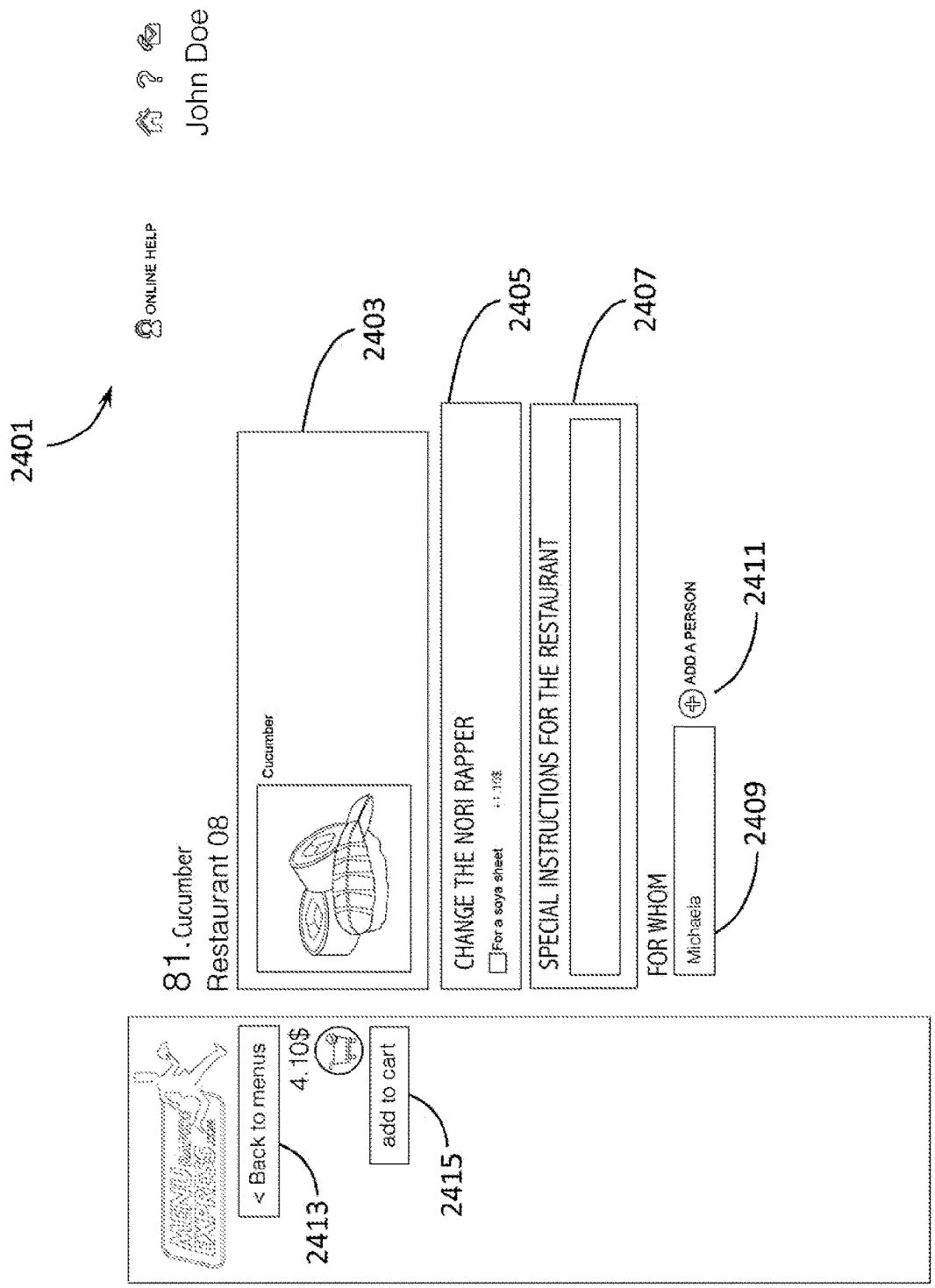
FIG. 24 is an example user interface of the delivery management system software tool used by the customer, showing a list of information about one menu item from a restaurant.

FIG. 24 shows the information displayed after having selected an item from the list, here a cucumber hosomaki. The customer can see a picture and description of the item 2403. Optional items 2405 are displayed below, here an option to change the nori wrapper by a soya wrapper. Special instructions can be provided by the customer about this item in a field 2407.

The customer can define multiple persons and assign the various menu items to the names of these persons in order to simplify a multi-party order. An example embodiment allows printing a breakdown of the total order cost per person on the bill to simplify the process of splitting the cost among users. A person can be added using an "Add a person" button 2411. Alternatively a list of person can be maintained (created, edited and deleted) in the user profile.

The price 2413 for the item can be displayed as shown in FIG. 24. If the customer is satisfied with this item and its price, he can order the item by placing it in its shopping cart using an "Add to cart" button 2415.

The interface can provide additional information to guide the customer. The customer can be shown if he ordered this item in the past. Alternatively he can be shown how many times he ordered the item. The customer can also rate his experience with an ordered item. After order, the customer is sent a poll (via email, text message or a link to a web site) asking him/her about each item in the order. The user can give his/her rating of the item according to taste, freshness, presentation, etc. and optionally allowing him/her to input freeform comments. The scores can be made private, public, or accessible only to a group of individuals selected using social network lists or lists of users of the DMS tool.

Figure 25:
FIG. 25 is an example user interface of the delivery management system software tool used by the customer, showing a list of menu items from a restaurant and a shopping cart with one item.
Figure 26:
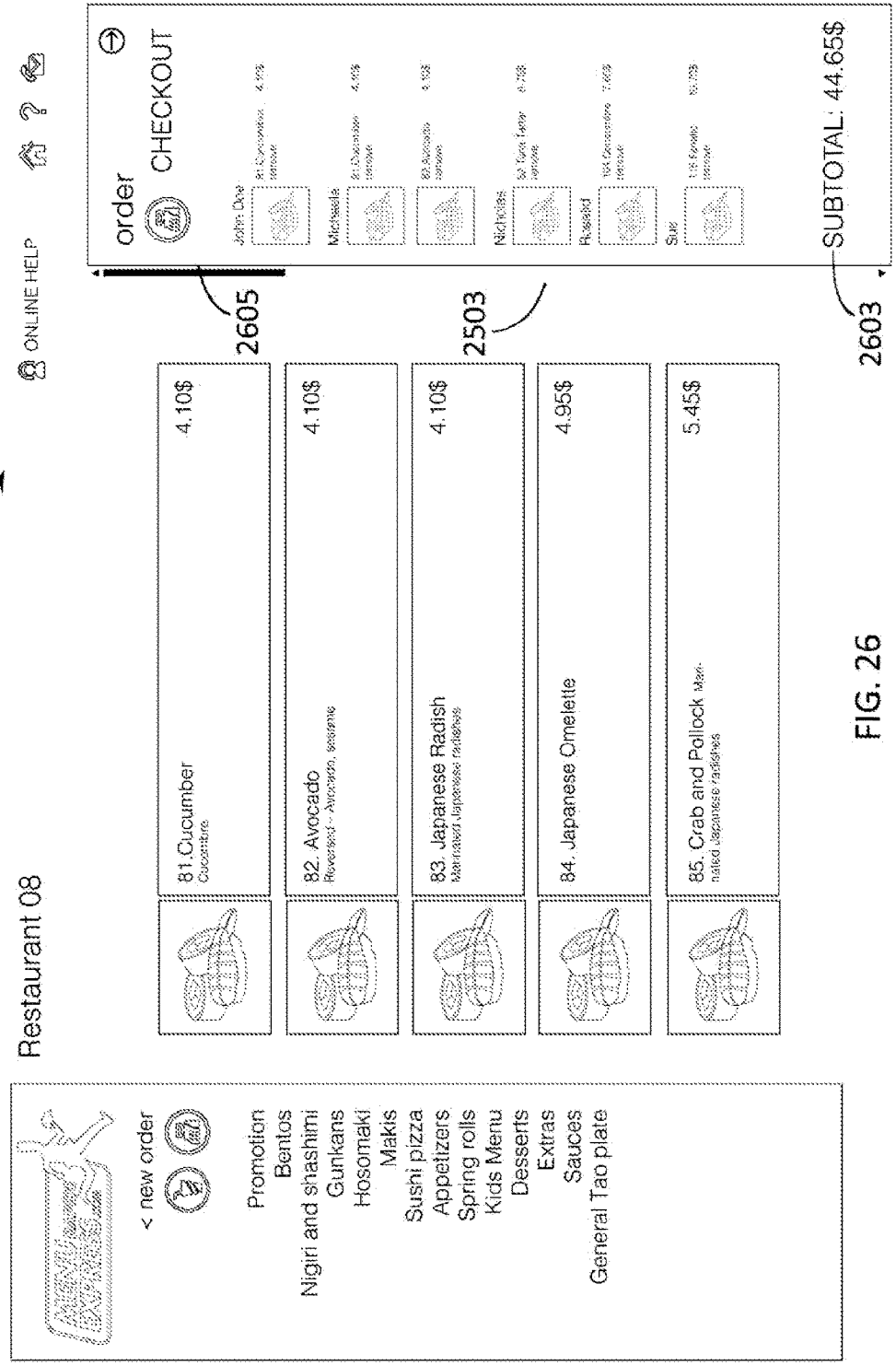
FIG. 26 is an example user interface of the delivery management system software tool used by the customer, showing a list of menu items from a restaurant and a shopping cart with several items.

Once placed in the shopping cart, the menu item appears in the order list 2503 as shown in FIG. 25. As items are added to the order list 2503, a sub-total 2603 is calculated as shown in FIG. 26. Note that the menu items in the order list 2503 can be presented per person as illustrated in FIG. 26. Once satisfied with the content of the order the customer proceeds to checkout using an appropriate button 2605.

Figure 27:
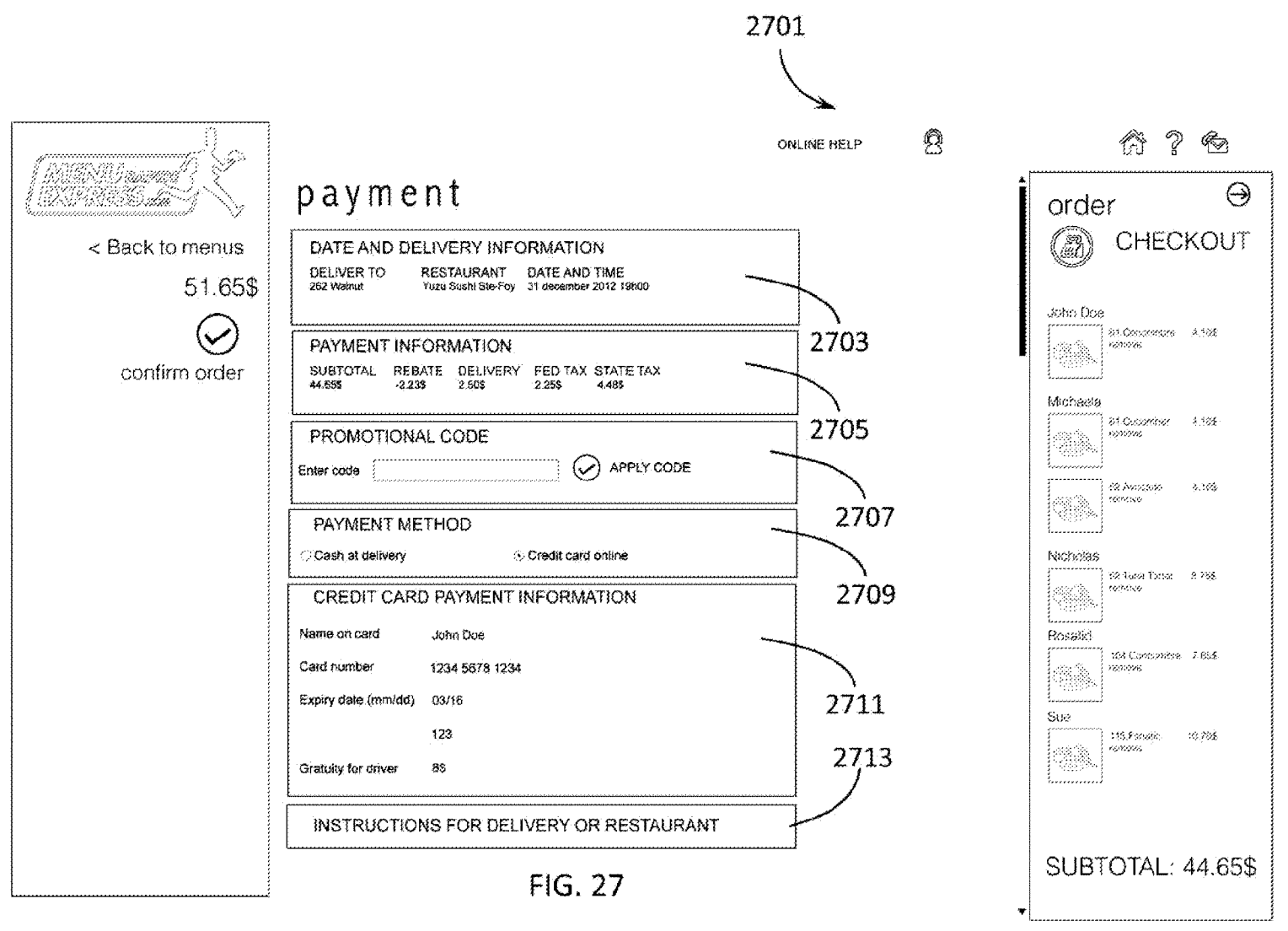

The check-out interface presents the customer with the information illustrated in FIG. 27. This includes the order summary 2703, the price information 2705 (order price, delivery fee, discounts and taxes), promotional coupons 2707, mode of payment 2709 (either cash or credit card), credit card information 2711 and finally special instructions for the orders 2713, for example dietary or allergy information and request for napkins, etc.

Figure 28:
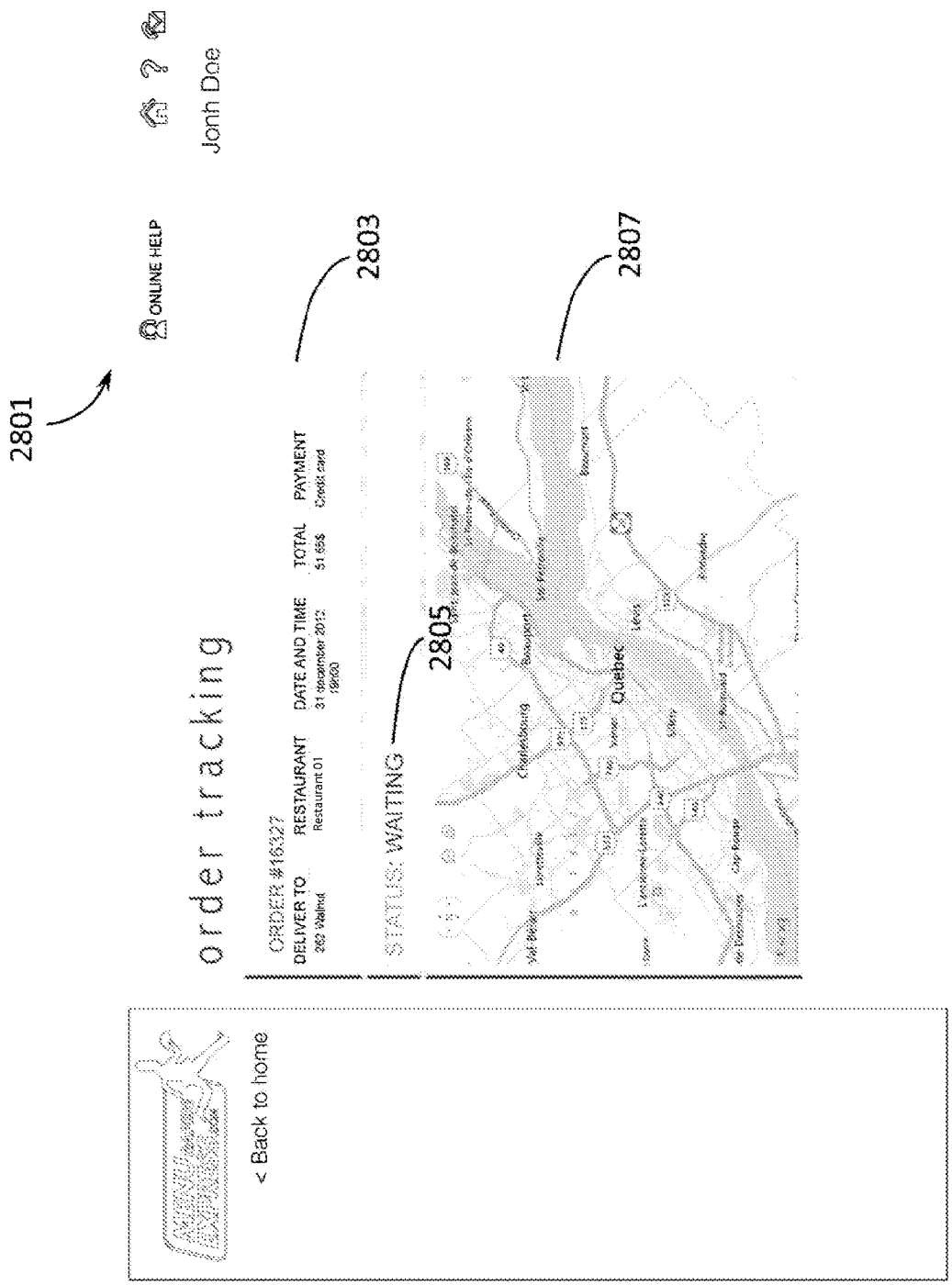
FIG. 28 is an example user interface of the delivery management system software tool used by the customer, showing an order tracking page while the order is in the "Waiting" state.

In an example embodiment, the customer can be provided with advanced tracking information. FIG. 28 illustrates an example tracking interface presented to the customer. This interface includes summary information 2803 about the order, the order status 2805 and geographical map 2807. In FIG. 28 the order has just been submitted by the customer and is in the "waiting" state.

Figure 29:
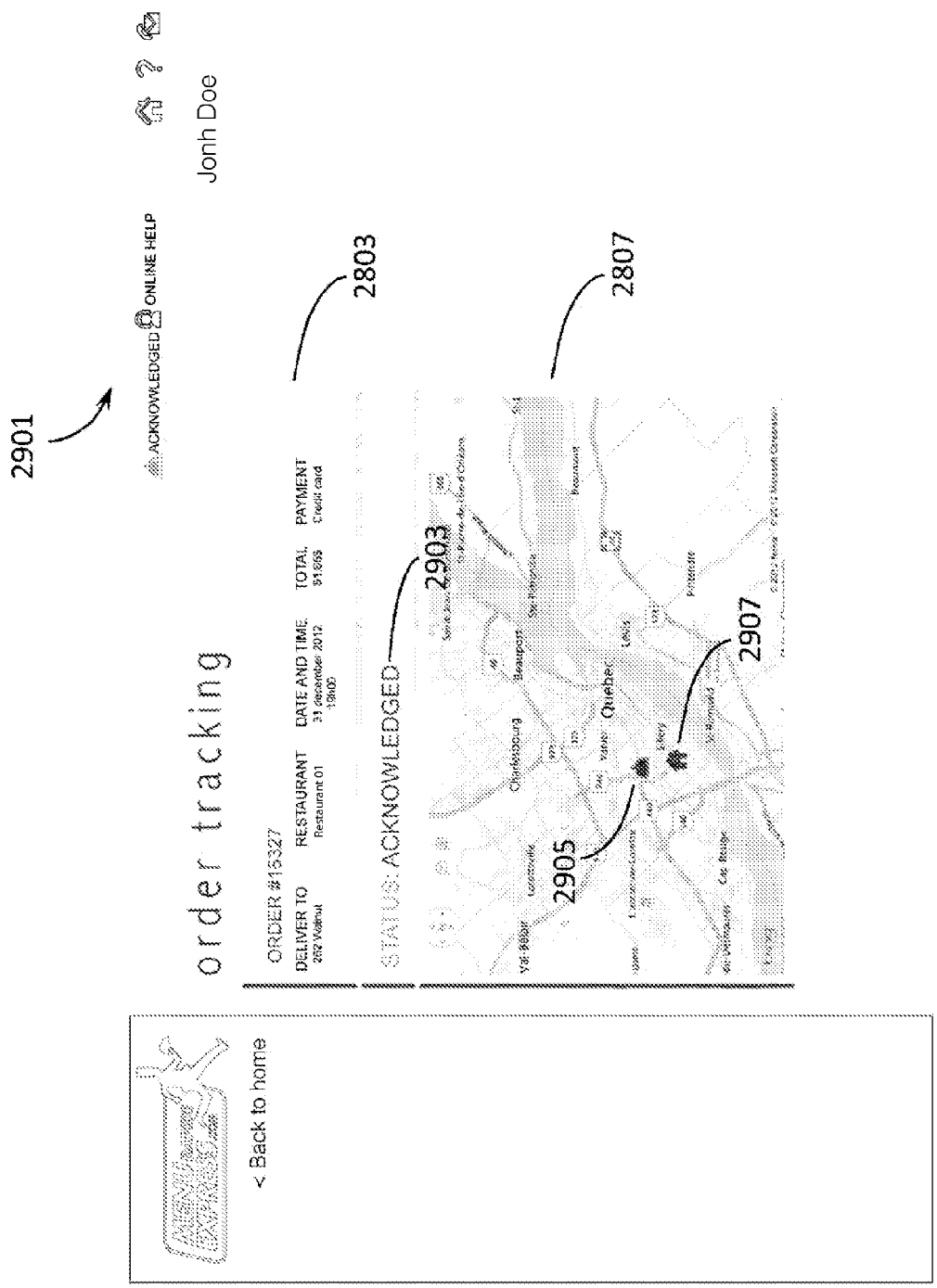
FIG. 29 is an example user interface of the delivery management system software tool used by the customer, showing an order tracking page while the order is in the "Acknowledged" state.

FIG. 29 shows the order promoted to the "Acknowledged" state 2903 by the dispatcher. The geographical map 2807 now displays the restaurant 2905 and the customer location 2907.

Figure 30:
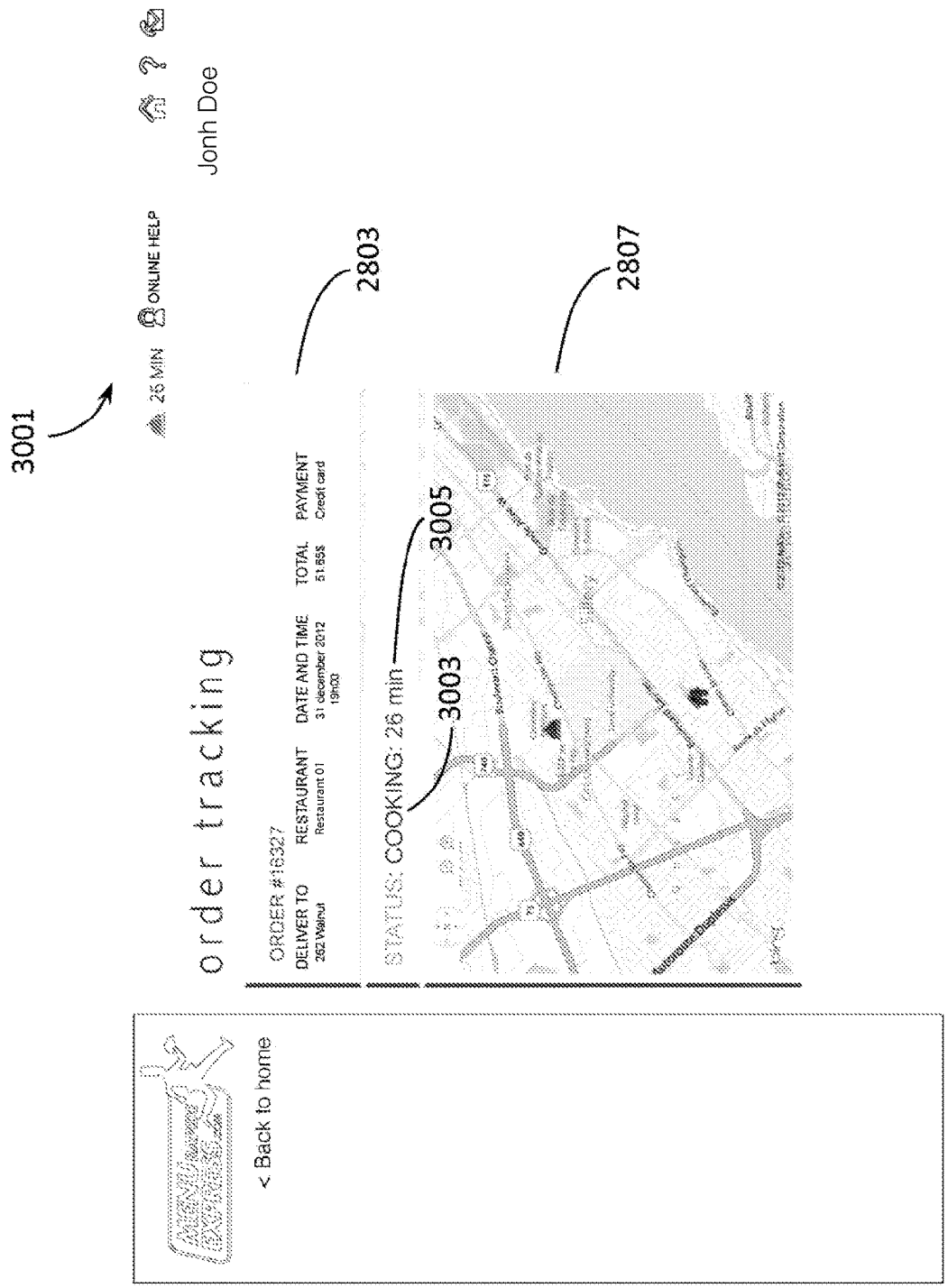
FIG. 30 is an example user interface of the delivery management system software tool used by the customer, showing an order tracking page while the order is in the "Cooking" state.
Figure 31:
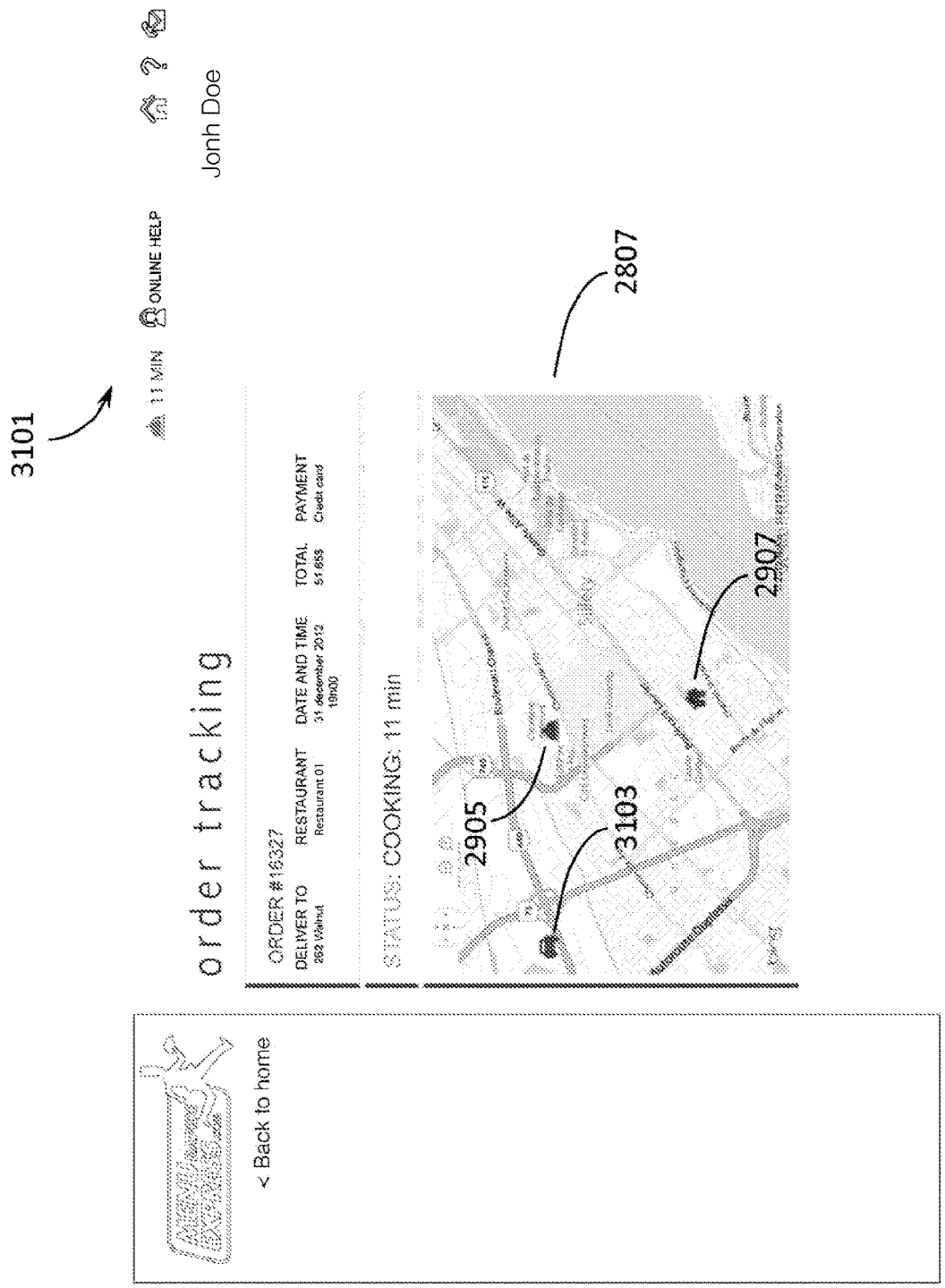
FIG. 31 is an example user interface of the delivery management system software tool used by the customer, showing an order tracking page while the order is in the "Cooking" state and showing the delivery car approaching the restaurant.

FIG. 30 shows the order promoted to the "Cooking" state 3003 by the restaurant operator. A preparation timer 3005 is displayed to inform the customer of the progress. A few minutes later, the delivery car 3103 appears on the geographical map 2807 as seen in FIG. 31, as it travels towards the restaurant 2905.

Figure 32:
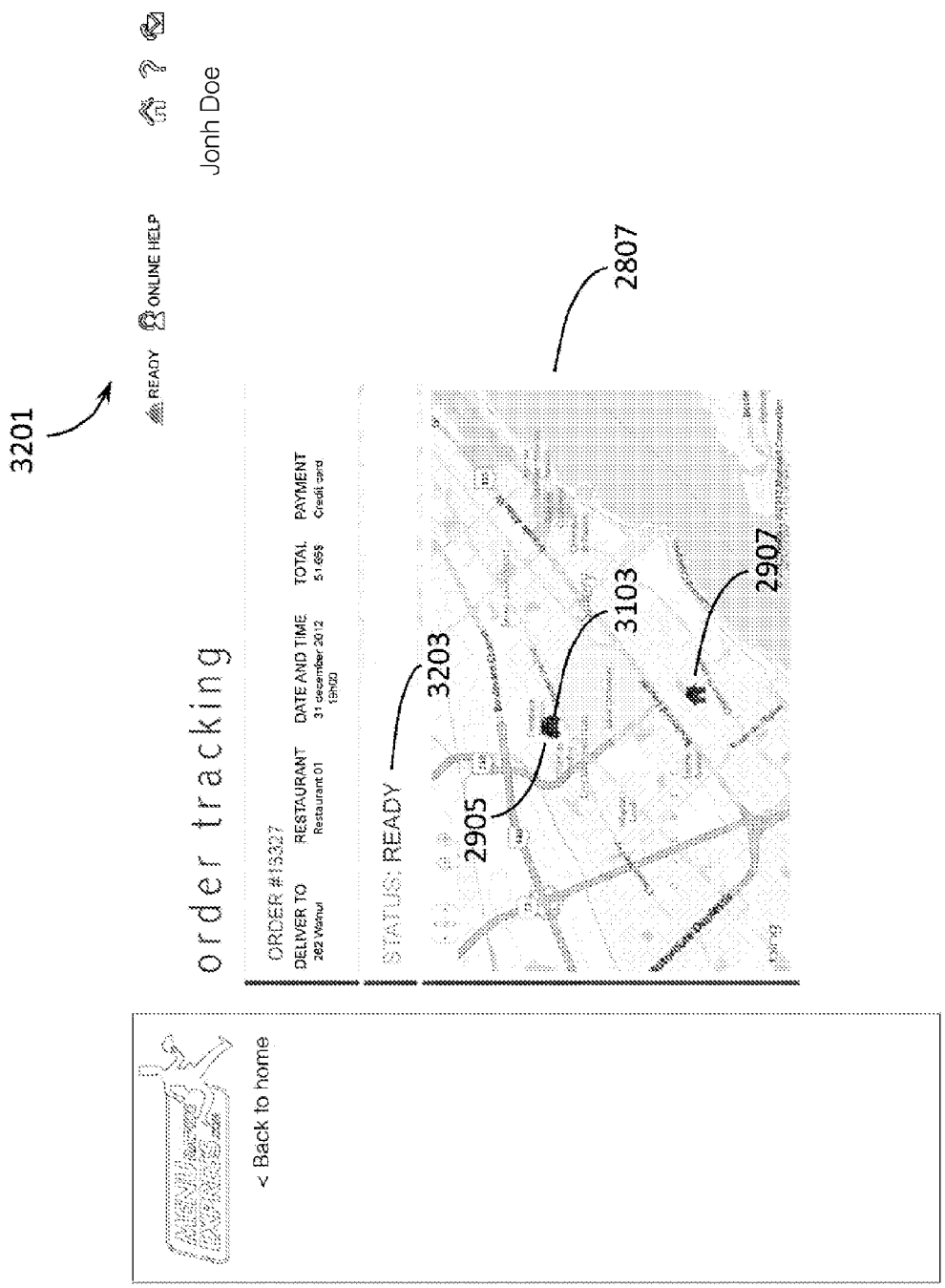
FIG. 32 is an example user interface of the delivery management system software tool used by the customer, showing an order tracking page while the order is in the "Ready" state.

FIG. 32 shows the order promoted to the "Ready" state 3203. The timer has run out of time or the restaurant operator has reduced the time to zero.

Figure 33:
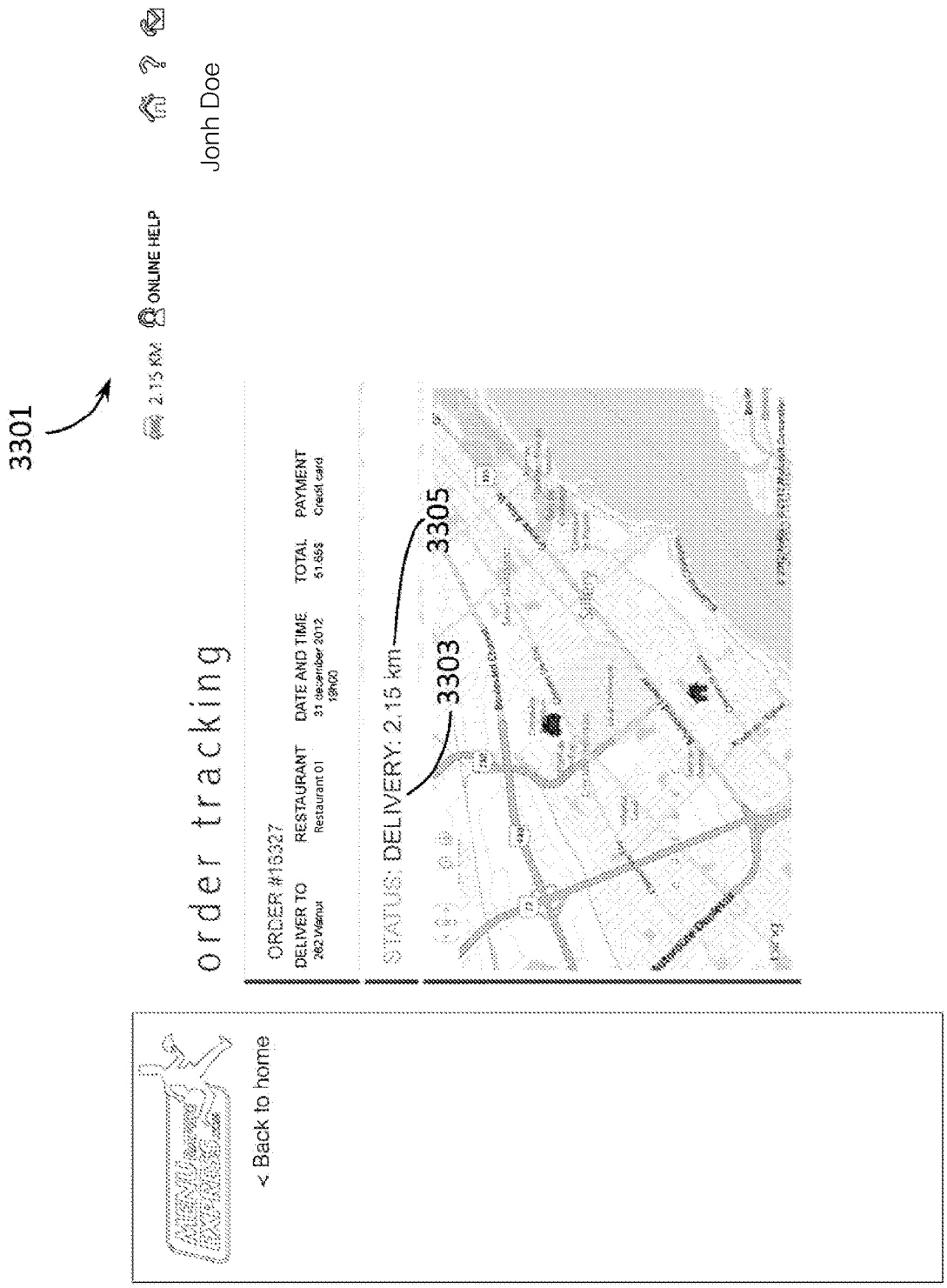
FIG. 33 is an example user interface of the delivery management system software tool used by the customer, showing an order tracking page while the order is in the "Delivery" state.
Figure 34:
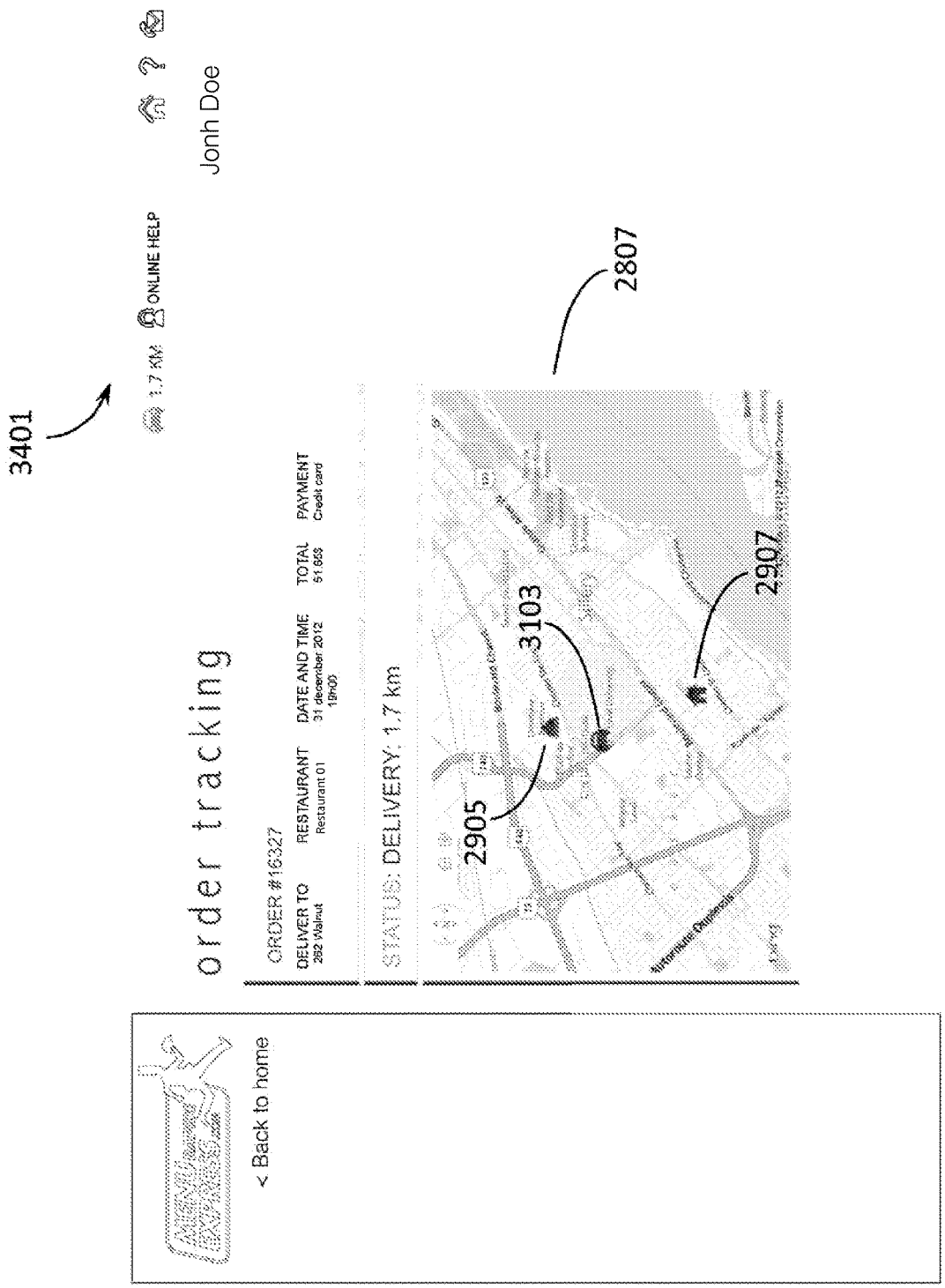
FIG. 34 is an example user interface of the delivery management system software tool used by the customer, showing an order tracking page while the order is in the "Delivery" state at a later time.

FIG. 33 shows the order promoted to the "Delivery" state 3303 (by the delivery car driver). A distance indicator 3305 is displayed to inform the customer of the delivery progress. Additionally as shown in FIG. 34, the customer can see the delivery car pictogram 3103 move on the map 2807 and getting closer to the customer point of delivery 2907.

Figure 35:
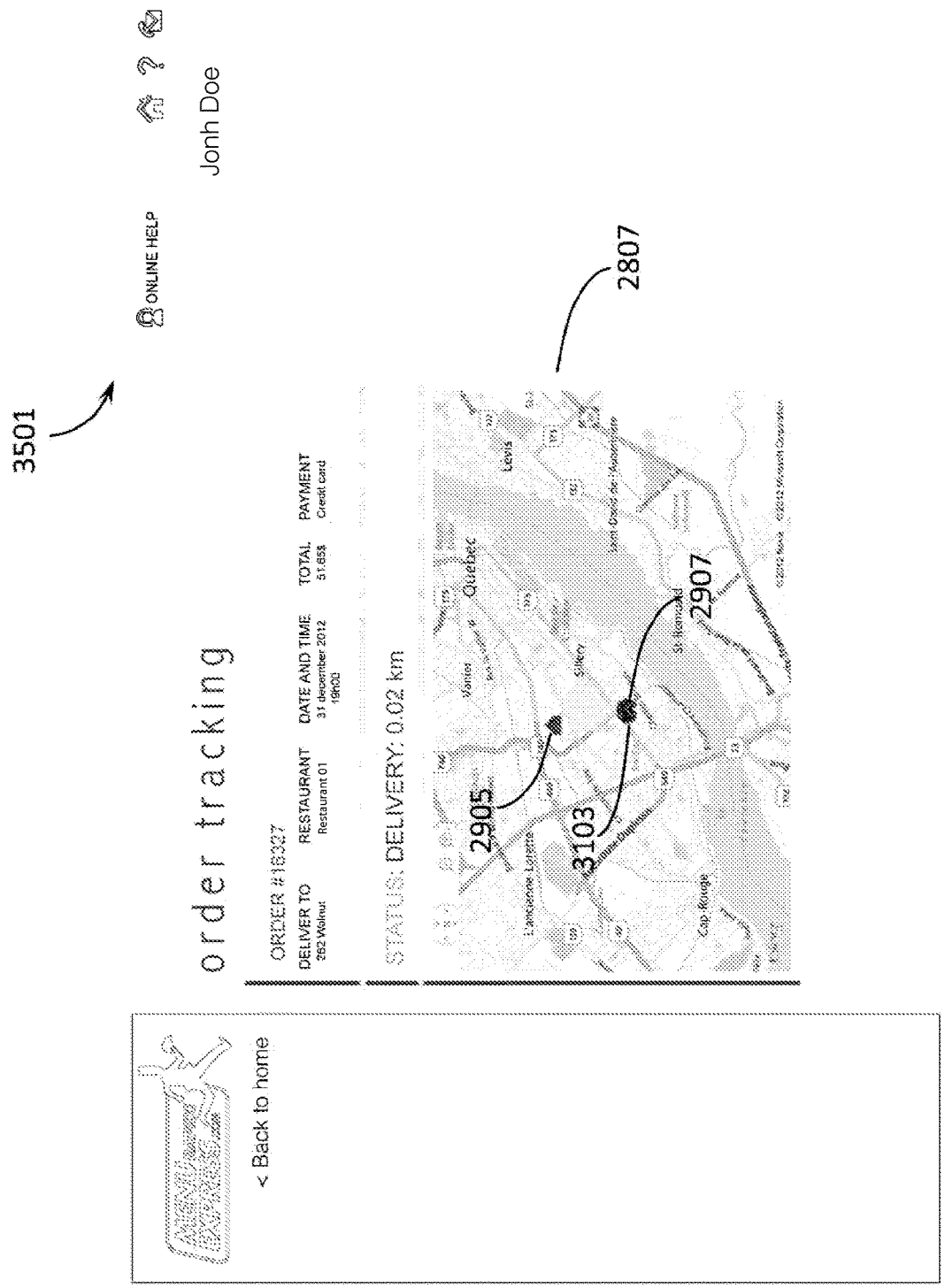
FIG. 35 is an example user interface of the delivery management system software tool used by the customer, showing an order tracking page while the order is in the "Delivery" state and the delivery person is at the customer location.
Figure 38:
FIG. 38 is an example user interface of the delivery management system software tool used by the customer, showing the locations information of the management panel.

FIG. 35 shows the delivery car 3103 arrived at the customer point of delivery 2907 and delivering the order to the customer.

To enhance the customer experience, the Delivery Management System customer interface can feature a number of additional progress indicators. In an example embodiment, the customer interface provides sound cues in addition to the visual or graphical cues. For example once the order is ready, a hotel desk-type bell sound can be heard on the DMS customer web or mobile interface. When the delivery car is within a short distance from the home, say 100 m, a car horn or drum roll can be sounded to warn of the imminence of the delivery. This sound cue is used for informing the customer of the progress of the delivery and increase customer satisfaction and also provides an efficiency improvement to the delivery system. The customer will stop his/her current activity and will get prepared for the delivery and payment (if required), thus speeding up the completion of the delivery cycle. Similarly, another sound such as a braking sound can be added when the delivery car actually stops in front of the customer house to enhance the feedback experience.

The customer experience can be further enhanced by the use of cameras and realtime video streaming on the customer DMS tool. Cameras can be installed in strategic locations in the kitchen of the restaurant where the meal is being prepared. While his/her order is in the "cooking" status, the customer can have the satisfaction of associating the activity in the restaurant kitchen with his/her order. For large kitchens, the broadcast can use several cameras. The customer can be presented with multiple video streams or a single video stream which can cycle between multiple locations in the restaurant. Alternatively, the customer can be given the control to choose which camera is streaming. Predictive algorithms and image processing algorithms can be used to highlight the customer order in the video streams using overlaid frames or color/contrast adjustments to draw the attention of the customer on a particular feature or action in the video streams.

When the driver has picked up the order, a "driver's view" can be broadcasted from a camera installed inside the delivery car facing the windshield in order to show what the driver sees while he is driving towards the customer. Finally a miniature camera installed on the delivery person shoulder, uniform pocket or in a similar position, can be used to show the customer what the delivery person is seeing while the delivery person is physically walking to the customer precise location with the order. This camera can be the mobile device used for the DMS driver tool.

Since the customer can obtain realtime feedback about the delivery progress during car and foot delivery of the order, it can be useful to enable a chat-like conversation between the delivery person and the customer. This conversation can increase customer satisfaction as well as the efficiency of the delivery since the customer can inform the delivery person of obstacles in the driving path or footpath, for example unpublished road construction or vicious dogs in the neighborhood. This conversation can be performed in a safe manner with voice chatting while the delivery person is driving. Text message can also be accepted from the customer, and can be converted to a real-time voice message for the driver. Conversely, voice messages from the driver can be converted to text messages if the customer prefers this means of communication.

In an example embodiment, the delivery car sign is illuminated and changes color according to proximity of delivery path in order to enhance the commercial experience.

In another example embodiment the delivery car is equipped with an external light-emitting display that pedestrian, other car drivers and onlookers can see when looking at the delivery car. This display can show a map of the city and the path of the car from restaurant to the customer (optionally without showing customer exact location for privacy concerns), mirroring the customer experience on the web DMS customer tool. Alternatively, the light-emitting display can be utilized to displaying publicity for the restaurant being served. A slogan such as "Currently delivering the best Sushi in town from Restaurant 01" can appear as a way to strengthen the brand of the delivery service and of its restaurant customers.

In an example embodiment, the delivery car sign can show the temperature of the food being delivered. Temperature sensors can be installed inside the delivery containers used to maintain the food at an adequate temperature during the delivery process. This temperature information can also be displayed on the order tracking interface of the customer DMS tool.

In another example embodiment, food traceability information can be presented to the customer using the customer DMS tool. In one embodiment, the customer can browse the traceability information of ingredients composing the meal being prepared including, the geographical location and time of food production, transformation and transportation. The traceability chain can include for example in the case of a steak order, the farms where the beef were raised, the plants where they were slaughtered, the plants where they were transformed and processed and the delivery to the restaurant. Similar information can be provided for fruits, vegetable, dairy, cereals, beverages, condiments, etc. Temperature and other relevant information such as humidity and pressure can also be provided to the customer as part of the end-to-end traceability data.

In an example embodiment, the Delivery Management System is not only used to manage delivery monetary fluxes, but also the payroll of the delivery employees.

During the course of his/her deliveries each driver can accumulate cash payments. At the end of a work shift or more frequently, the Delivery Management System can output a report of what the driver owes the delivery company. The DMS can also manage the tips that are assigned on credit card transactions. It cumulates the amounts due to the restaurants, which can be paid at previously agreed time interval, for example every two weeks. The DMS can also calculate the salary of the drivers based on an hourly rate or per mileage, or a combination of both. Since each employee whether a dispatcher, an operator or a driver log in the system at the beginning of their work shift, the system can automatically calculate the hours worked and thus can calculate the salaries.

Since the DMS cumulates the relevant information in a central database, a number of interesting reports can be generated. A driver performance report can be created and used to analyze the performance of drivers, by calculating the average speed, average distance travelled per delivery, average distance travelled per working day, average tip, average customer satisfaction score, etc. A customer quality index can also be calculated using a number of available indicators including number of orders per month, average order amount, average tip, number of cancelled orders, disputes and problems, etc.

Over time the system builds a wealth of data that can be analyzed and exploited for marketing purposes. Interesting geographical reports can also be created to show where orders for a particular restaurant come from and whether there exists regional biases.

Another capability of the system is the ability to predict future level of activity and revenues. This predicting function is based on historical volume of transactions, taking into account weekly, seasonal and yearly patterns in addition to special events (for example the Super Bowl™) and financial and economic trends.

In summary, there is provided a method for tracking of a delivery of a menu item. The method includes receiving an order for the menu item from a customer interface, the order identifying a selected menu item and an address for the delivery; sending a request for preparation of the menu item; identifying an available delivery vehicle among a plurality of delivery vehicles; receiving a preparation completion notification indicating that preparation of the menu item has ended; dispatching the order for delivery, including an identification of the available delivery vehicle and the address; receiving a displacement notification indicating that the menu item is being displaced by the available delivery vehicle; retrieving geopositional data representing a geographical position of the available delivery vehicle; sending a displacement notification to the customer interface including an indication of the geographical position of the available delivery vehicle.

There is also provided a system for tracking of a delivery of a menu item. The system includes a customer order receiver for receiving an order for the menu item from a customer interface, the order identifying a selected menu item and an address for the delivery; a restaurant order dispatcher for sending a request for preparation of the menu item and receiving a preparation completion notification indicating that preparation of the menu item has ended; a driver assignment dispatcher for identifying an available delivery vehicle among a plurality of delivery vehicles, dispatching the order for delivery, including an identification of the available delivery vehicle and the address and receiving a displacement notification indicating that the menu item is being displaced by the available delivery vehicle; a driver geoposition reporter for retrieving geopositional data representing a geographical position of the available delivery vehicle; a customer feedback provider for sending a displacement notification to the customer interface including an indication of the geographical position of the available delivery vehicle.

In one embodiment, the method includes sending a menu item preparation completion notification to the customer interface including the indication that preparation of the menu items has ended.

In one embodiment, the method includes receiving a preparation beginning notification indicating that preparation of the menu item has begun and sending a menu item preparation beginning notification to the customer interface including the indication that preparation of the menu item has begun.

In one embodiment, sending the request for preparation of the menu item further comprises triggering a video capture of the preparation of the menu item and transmitting the video capture to the customer interface.

In one embodiment, the method includes receiving an identification of food components used in the preparation of the menu item and storing the identification of food components for traceability purposes.

In one embodiment, the method includes determining a preparation estimated delay, the preparation estimated delay representing a time delay estimated for the preparation of the menu item.

In one embodiment, the method includes receiving an estimate update notification representing an updated preparation estimated delay for the preparation of the menu item.

In one embodiment, sending a request for preparation of the menu item includes indicating the preparation estimated delay and the method further comprising triggering a food preparation interface to display a countdown using the preparation estimated delay.

In one embodiment, the order further identifies a time for the delivery, wherein the sending a request for preparation further includes the time for the delivery.

In one embodiment, the order further identifies a time for the delivery, the method further comprising determining a recommended order preparation beginning time using the time for the delivery and the preparation estimated delay and wherein the sending a request for preparation one of includes the order preparation beginning time and is timed with the recommended order preparation beginning time.

In one embodiment, the method includes determining a pick-up estimated delay, the pick-up estimated delay representing a time delay estimated for the arrival of the available delivery vehicle for pick-up of the menu item after preparation, the method further comprising determining a recommended order preparation beginning time using the pick-up estimated delay and the preparation estimated delay and wherein the sending a request for preparation is one of timed with the recommended order preparation beginning time and includes the order preparation beginning time.

In one embodiment, retrieving the geopositional data representing the geographical position of the available delivery vehicle begins one of before the identifying the available delivery vehicle, after the identifying the available delivery vehicle, after the receiving the preparation completion notification, after the dispatching the order for delivery and after the receiving the displacement notification indication.

In one embodiment, the method includes obtaining a trajectory for the available delivery vehicle between the geographical position and the address, determining a delivery delay determined using the trajectory, the delivery delay including at least one of a distance to the address, an estimated displacement time and an estimated time of arrival and sending the delivery delay to the customer interface.

In one embodiment, the method includes triggering the customer interface to at least one of display a delivery delay countdown using the delivery delay, emit a sound when the available delivery vehicle is within a predetermined range of the address, emit a sound when the displacement notification is sent.

In one embodiment, the order further identifies a provider for the menu item, wherein the sending a request for preparation of the menu item further includes sending the request to the provider identified in the order and wherein the dispatching the order for delivery further includes an identification of the provider.

In one embodiment, dispatching the order for delivery further comprises triggering a video capture of a displacement of the available delivery vehicle and transmitting the video capture to the customer interface.

In one embodiment, receiving an order further comprises receiving a request to chat during displacement of the available delivery vehicle and a chat identification number, wherein the dispatching the order further includes the chat identification number, wherein the available delivery vehicle is adapted to be able to chat about the order using the chat identification number.

In one embodiment, the method includes obtaining a temperature of the menu item in the available delivery vehicle and wherein the sending the displacement notification further includes the temperature of the menu item.

In one embodiment, receiving the order further comprising receiving an electronic payment for the order.

In one embodiment, receiving the order further includes an identification of at least two customers for the order, the electronic payment combining individual electronic payment from each of the at least two customers.

In one embodiment, the method includes receiving a payment notification indicating that the order was paid for.

In one embodiment, the method includes receiving a delivery completion notification indicating that the order was delivered to the address.

In one embodiment, the method includes updating a status of the available delivery vehicle to be awaiting assignment.

In one embodiment, dispatching the order further comprises triggering a display provided on an exterior of the available delivery vehicle to display an advertisement, the advertisement being selected using the order.

In one embodiment, retrieving the geopositional data representing the geographical position of the available delivery vehicle begins before the identifying the available delivery vehicle, wherein the identifying the available delivery vehicle includes using the geopositional data to determine a closest delivery vehicle to a pick-up location for the prepared menu item.

In one embodiment, identifying the available delivery vehicle further includes using the address of a current delivery made by the available delivery vehicle to determine a closest delivery vehicle to a pick-up location for the prepared menu item.

In one embodiment, the method includes determining an estimated time of delivery completion, wherein the identifying the available delivery vehicle further includes using the address of a current delivery made by the available delivery vehicle and the estimated time of delivery completion to determine the available delivery vehicle to be dispatched to a pick-up location for the prepared menu item.

The applications of the system and method are numerous. The applications include restaurant order delivery, medication order delivery, beverage order delivery, auto parts delivery, etc.

The embodiments described above are intended to be exemplary only.

The invention claimed is:

1. A method, performed by a first computer, for tracking of a delivery of a menu item, the method including:
   at the first computer, receiving, over the Internet, an order for said menu item from a customer interface on a second computer, said order identifying a selected menu item and an address for said delivery;
   at the first computer, sending, over the Internet to a third computer, a request for preparation of said menu item;
   at the first computer, identifying an available delivery vehicle among a plurality of delivery vehicles;
   at the first computer, over the Internet, receiving a preparation completion notification indicating that preparation of said menu item has ended;
   at the first computer, dispatching, over the Internet, said order for delivery, including an identification of said available delivery vehicle and said address;
   at the first computer, receiving, over the Internet, a displacement notification indicating that said menu item is being displaced by said available delivery vehicle; and
   at the first computer, retrieving geopositional data representing a geographical position of said available delivery vehicle; and
   at the first computer, sending, over the Internet, a displacement notification to said customer interface on the second computer, the displacement notification including an indication of said geographical position of said available delivery vehicle.

2. The method as claimed in claim 1, further comprising sending a menu item preparation completion notification to said customer interface including said indication that preparation of said menu items has ended.

3. The method as claimed in claim 1, further comprising receiving a preparation beginning notification indicating that preparation of said menu item has begun and sending a menu item preparation beginning notification to said customer interface including said indication that preparation of said menu item has begun.

4. The method as claimed in claim 1, wherein said sending said request for preparation of said menu item further comprises triggering a video capture of said preparation of said menu item and transmitting said video capture to said customer interface.

5. The method as claimed in claim 1, further comprising receiving an identification of food components used in said preparation of said menu item and storing said identification of food components for traceability purposes.

6. The method as claimed in claim 1, further comprising determining a preparation estimated delay, said preparation estimated delay representing a time delay estimated for the preparation of said menu item.

7. The method as claimed in claim 6, further comprising receiving an estimate update notification representing an updated preparation estimated delay for the preparation of said menu item.

8. The method as claimed in claim 6, wherein said sending a request for preparation of said menu item includes indicating said preparation estimated delay and the method further comprising triggering a food preparation interface to display a countdown using said preparation estimated delay.

9. The method as claimed in claim 6, wherein said order further identifies a time for said delivery, wherein said sending a request for preparation further includes said time for said delivery.

10. The method as claimed in claim 6, wherein said order further identifies a time for said delivery, the method further comprising determining a recommended order preparation beginning time using said time for said delivery and said preparation estimated delay and wherein said sending a request for preparation one of includes said order preparation beginning time and is timed with said recommended order preparation beginning time.

11. The method as claimed in claim 6, further comprising determining a pick-up estimated delay, said pick-up estimated delay representing a time delay estimated for the arrival of said available delivery vehicle for pick-up of said menu item after preparation, the method further comprising determining a recommended order preparation beginning time using said pick-up estimated delay and said preparation estimated delay and wherein said sending a request for preparation is one of timed with said recommended order preparation beginning time and includes said order preparation beginning time.

12. The method as claimed in claim 1, wherein said retrieving said geopositional data representing said geographical position of said available delivery vehicle begins one of before said identifying said available delivery vehicle, after said identifying said available delivery vehicle, after said receiving said preparation completion notification, after said dispatching said order for delivery and after said receiving said displacement notification indication.

13. The method as claimed in claim 1, further comprising obtaining a trajectory for said available delivery vehicle between said geographical position and said address, determining a delivery delay determined using said trajectory, said delivery delay including at least one of a distance to said address, an estimated displacement time and an estimated time of arrival and sending said delivery delay to said customer interface.

14. The method as claimed in claim 13, further comprising triggering said customer interface to at least one of display a delivery delay countdown using said delivery delay, emit a sound when said available delivery vehicle is within a predetermined range of said address, emit a sound when said displacement notification is sent.

15. The method as claimed in claim 1, wherein said order further identifies a provider for said menu item, wherein said sending a request for preparation of said menu item further includes sending said request to said provider identified in said order and wherein said dispatching said order for delivery further includes an identification of said provider.

16. The method as claimed in claim 1, wherein said dispatching said order for delivery further comprises triggering a video capture of a displacement of said available delivery vehicle and transmitting said video capture to said customer interface.

17. The method as claimed in claim 1, wherein said receiving an order further comprises receiving a request to chat during displacement of the available delivery vehicle and a chat identification number, wherein said dispatching said order further includes said chat identification number, wherein said available delivery vehicle is adapted to be able to chat about said order using said chat identification number.

18. The method as claimed in claim 1, further comprising obtaining a temperature of said menu item in said available delivery vehicle and wherein said sending said displacement notification further includes said temperature of said menu item.

19. The method as claimed in claim 1, wherein said receiving said order further comprising receiving an electronic payment for said order.

20. The method as claimed in claim 19, wherein said receiving said order further includes an identification of at least two customers for said order, said electronic payment combining individual electronic payment from each of said at least two customers.

21. The method as claimed in claim 1, further comprising receiving a payment notification indicating that said order was paid for.

22. The method as claimed in claim 1, further comprising receiving a delivery completion notification indicating that said order was delivered to said address.

23. The method as claimed in claim 22, further comprising updating a status of said available delivery vehicle to be awaiting assignment.

24. The method as claimed in claim 1, wherein said dispatching said order further comprises triggering a display provided on an exterior of said available delivery vehicle to display an advertisement, said advertisement being selected using said order.

25. The method as claimed in claim 1, wherein retrieving said geopositional data representing said geographical position of said available delivery vehicle begins before said identifying said available delivery vehicle, wherein said identifying said available delivery vehicle includes using said geopositional data to determine a closest delivery vehicle to a pick-up location for said prepared menu item.

26. The method as claimed in claim 1, wherein said identifying said available delivery vehicle further includes using said address of a current delivery made by said available delivery vehicle to determine a closest delivery vehicle to a pick-up location for said prepared menu item.

27. The method as claimed in claim 1, further comprising determining an estimated time of delivery completion, wherein said identifying said available delivery vehicle further includes using said address of a current delivery made by said available delivery vehicle and said estimated time of delivery completion to determine said available delivery vehicle to be dispatched to a pick-up location for said prepared menu item.

28. A first computer for tracking of a delivery of a menu item, the first computer including:
 a customer order receiver for receiving, at the first computer, over the Internet, an order for said menu item from a customer interface on a second computer, said order identifying a selected menu item and an address for said delivery;
 a restaurant order dispatcher for sending, over the Internet to a third computer, a request for preparation of said menu item and receiving a preparation completion notification indicating that preparation of said menu item has ended;
 a driver assignment dispatcher for identifying an available delivery vehicle among a plurality of delivery vehicles, dispatching said order for delivery, including an identification of said available delivery vehicle and said address and receiving a displacement notification indicating that said menu item is being displaced by said available delivery vehicle; and
 a driver geoposition reporter for retrieving geopositional data representing a geographical position of said available delivery vehicle; and
 a customer feedback provider for sending, over the Internet, a displacement notification to said customer interface on the second computer, the displacement notification including an indication of said geographical position of said available delivery vehicle.

* * * * *